(12) United States Patent
Sakagawa et al.

(10) Patent No.: US 12,275,495 B2
(45) Date of Patent: Apr. 15, 2025

(54) ELECTRICAL DEVICE AND SYSTEM FOR HUMAN-POWERED VEHICLE

(71) Applicant: SHIMANO INC., Sakai (JP)

(72) Inventors: Yuki Sakagawa, Sakai (JP); Toyoto Shirai, Sakai (JP); Noor Ashyikkin Binti Mohd Noor, Sakai (JP); Akihiro Nozaki, Sakai (JP); Satoshi Shahana, Sakai (JP); Hitoshi Takayama, Sakai (JP)

(73) Assignee: SHIMANO INC., Sakai (JP)

( * ) Notice: Subject to any disclaimer, the term of this patent is extended or adjusted under 35 U.S.C. 154(b) by 589 days.

(21) Appl. No.: 17/481,254

(22) Filed: Sep. 21, 2021

(65) Prior Publication Data

US 2023/0089903 A1 Mar. 23, 2023

(51) Int. Cl.
*B62M 9/132* (2010.01)
*B60L 3/00* (2019.01)
*H04W 12/50* (2021.01)
*H04W 84/20* (2009.01)

(52) U.S. Cl.
CPC ........... *B62M 9/132* (2013.01); *B60L 3/0084* (2013.01); *H04W 12/50* (2021.01); *H04W 84/20* (2013.01); *B60L 2200/12* (2013.01)

(58) Field of Classification Search
CPC ...... B62M 9/132; B62M 9/122; B62M 25/08; B60L 3/0084; B60L 2200/12; B60L 3/0092; B60L 3/12; B60L 50/20; H04W 12/50; H04W 84/20; B62J 45/20; B62J 2001/085; G05B 2219/1215; G05B 2219/2231; G05B 2219/2237; G05B 2219/2238; G05B 2219/2228; G05B 2219/40399; G05B 2219/40406
See application file for complete search history.

(56) References Cited

U.S. PATENT DOCUMENTS

| 5,285,443 | A | * | 2/1994 | Patsiokas | H04J 3/0682 |
| | | | | | 455/88 |
| 7,730,803 | B2 | | 6/2010 | Takamoto | |
| 2002/0184410 | A1 | * | 12/2002 | Apel | G06F 11/2017 |
| | | | | | 710/5 |
| 2006/0221856 | A1 | * | 10/2006 | Quiroz | H04W 84/20 |
| | | | | | 370/254 |
| 2007/0266198 | A1 | * | 11/2007 | Bousis | G06F 3/0653 |
| | | | | | 711/112 |
| 2008/0284252 | A1 | * | 11/2008 | Jones | H02J 3/40 |
| | | | | | 307/82 |
| 2011/0040859 | A1 | * | 2/2011 | Tazzari | H04L 41/12 |
| | | | | | 709/222 |

(Continued)

*Primary Examiner* — Rami R Okasha
(74) *Attorney, Agent, or Firm* — MORI & WARD, LLP

(57) ABSTRACT

An electrical device for a system of a human-powered vehicle comprises a controller. The controller is configured to selectively act, based on reference information relating to the system, as each of a master controller and a slave controller. The master controller is configured to transmit a first control signal to a different slave controller of a different electrical device of the system. The different slave controller is configured to be operated in response to the first control signal. The slave controller is configured to be operated in response to a second control signal transmitted from a different master controller of a different electrical device of the system.

21 Claims, 19 Drawing Sheets

(56) References Cited

U.S. PATENT DOCUMENTS

| | | | |
|---|---|---|---|
| 2012/0059605 A1* | 3/2012 | Chimanbhai | H04B 3/46 |
| | | | 702/57 |
| 2012/0253606 A1* | 10/2012 | Takamoto | B60L 50/20 |
| | | | 701/48 |
| 2014/0254214 A1* | 9/2014 | Balakrishnan | H02M 3/335 |
| | | | 363/21.15 |
| 2015/0180517 A1* | 6/2015 | Abe | H04B 1/04 |
| | | | 455/99 |
| 2015/0309784 A1 | 10/2015 | Molin et al. | |
| 2019/0152561 A1* | 5/2019 | Chuang | F16H 61/0204 |
| 2019/0241236 A1* | 8/2019 | Lin | B62M 9/132 |
| 2020/0252987 A1* | 8/2020 | Inoue | H04W 76/15 |
| 2022/0129402 A1* | 4/2022 | Li | G06F 11/2033 |
| 2023/0080622 A1* | 3/2023 | Chis | G05B 19/4185 |
| | | | 700/83 |

* cited by examiner

ELECTRICAL DEVICE AND SYSTEM FOR HUMAN-POWERED VEHICLE

BACKGROUND

Technical Field

The present invention relates to an electrical device and a system for a human-powered vehicle.

Background Information

A human-powered vehicle includes an electric unit configured to control a component in a system. For example, the electric unit acts as a master unit or a slave unit. The electric unit controls a slave electric unit if the electric unit acts as a master unit. The electric unit is controlled by a master electric unit if the electric unit acts as a slave unit. To improve flexibility of a system including the electric unit, it is preferable that the electric unit can apply to different systems and can act in cooperation with different master or slave electric units in the different systems.

SUMMARY

In accordance with a first aspect of the present invention, an electrical device for a system of a human-powered vehicle comprises a controller. The controller is configured to selectively act, based on reference information relating to the system, as each of a master controller and a slave controller. The master controller is configured to transmit a first control signal to a different slave controller of a different electrical device of the system. The different slave controller is configured to be operated in response to the first control signal. The slave controller is configured to be operated in response to a second control signal transmitted from a different master controller of a different electrical device of the system.

With the electrical device according to the first aspect, it is possible to apply, based on the reference information, the controller to each of a system including the different slave controller and a system including the different master controller. Thus, it is possible to apply the electrical device to different systems.

In accordance with a second aspect of the present invention, the electrical device according to the first aspect is configured so that the reference information includes at least one of a hardware configuration of the system, a state of the hardware configuration of the system, and an input transmitted from an external device.

With the electrical device according to the second aspect, it is possible to reliably apply the controller to different systems based on the reference information.

In accordance with a third aspect of the present invention, the electrical device according to the first or second aspect is configured so that the controller is configured to act as the slave controller if the reference information indicates that the system includes the different master controller. The controller is configured to act as the master controller if the reference information indicates that the system does not include the different master controller.

With the electrical device according to the third aspect, it is possible to reliably apply the controller to different systems based on the reference information.

In accordance with a fourth aspect of the present invention, the electrical device according to any one of the first to third aspects is configured so that the controller is configured to detect, as the reference information, whether the system includes the different master controller or not.

With the electrical device according to the fourth aspect, it is possible to reliably apply the controller to different systems based on the reference information.

In accordance with a fifth aspect of the present invention, the electrical device according to any one of the first to fourth aspects is configured so that the controller is configured to act as the slave controller if the reference information indicates at least one of that the slave controller is selected by a user, that the master controller is not selected by the user, and that the different master controller is selected by the user. The controller is configured to act as the master controller if the reference information indicates at least one of that the master controller is selected by the user, that the slave controller is not selected by the user, and that the different slave controller is selected by the user.

With the electrical device according to the fifth aspect, it is possible to reliably apply the controller to different systems based on the reference information.

In accordance with a sixth aspect of the present invention, the electrical device according to any one of the first to fifth aspects is configured so that the controller is configured to communicate with at least one of the different slave controller and the different master controller via a wireless communication channel.

With the electrical device according to the sixth aspect, it is possible to omit an electric cable connecting the controller and the at least one of the different slave controller and the different master controller from the system.

In accordance with a seventh aspect of the present invention, the electrical device according to any one of the first to sixth aspects is configured so that the controller is configured to communicate with at least one of the different slave controller and the different master controller via a wired communication channel.

With the electrical device according to the seventh aspect, it is possible to execute a communication between the controller and the at least one of the different slave controller and the different master controller without cross talk.

In accordance with an eighth aspect of the present invention, the electrical device according to the sixth or seventh aspect is configured so that the controller includes a user interface configured to receive a user input. The controller has a pairing mode in which the controller executes pairing between the controller and one of the different slave controller and the different master controller. The controller is configured to enter the pairing mode in response to the user input received by the user interface.

With the electrical device according to the eighth aspect, it is possible to execute the pairing mode based on the user's intention.

In accordance with a ninth aspect of the present invention, the electrical device according to the eighth aspect is configured so that the controller is configured to act as the slave controller if the controller detects a master signal transmitted from the different master controller in the pairing mode.

With the electrical device according to the ninth aspect, it is possible to operate the controller to act as the slave controller based on the master controller.

In accordance with a tenth aspect of the present invention, the electrical device according to any one of the first to ninth aspects is configured so that the controller is configured to transmit the first control signal to the different slave controller in response to an operating signal transmitted from an operating device if the controller acts as the master controller.

With the electrical device according to the tenth aspect, it is possible to operate the different slave controller in cooperation with the controller.

In accordance with an eleventh aspect of the present invention, the electrical device according to the tenth aspect is configured so that the controller is configured to be operated in response to the second control signal transmitted from the different master controller without transmitting the first control signal to the different slave controller if the controller acts as the slave controller.

With the electrical device according to the eleventh aspect, it is possible to operate the controller in cooperation with the different master controller.

In accordance with a twelfth aspect of the present invention, the electrical device according to any one of the first to eleventh aspects is configured so that the controller is configured to act as the master controller on behalf of the different master controller if the reference information indicates that the different master controller is in an abnormal state.

With the electrical device according to the twelfth aspect, it is possible to maintain the operation of the controller and other different slave controllers if the different master controller cannot correctly act due to the abnormal state.

In accordance with a thirteenth aspect of the present invention, the electrical device according to the twelfth aspect is configured so that the abnormal state includes at least one of a failure of the different master controller and unresponsiveness of the different master controller.

With the electrical device according to the thirteenth aspect, the controller can detect the abnormal state of the different master controller based on the at least one of the failure and the unresponsiveness of the different master controller.

In accordance with a fourteenth aspect of the present invention, the electrical device according to the thirteenth aspect is configured so that the controller is configured to detect a communication signal transmitted from the different master controller. The controller is configured to conclude that the different master controller is not in the abnormal state if the controller detects the communication signal within a state determination time. The controller is configured to conclude that the different master controller is in the abnormal state if the controller does not detect the communication signal within the state determination time.

With the electrical device according to the fourteenth aspect, it is possible to reliably determine whether the different master controller is in the abnormal state using the communication signal.

In accordance with a fifteenth aspect of the present invention, the electrical device according to any one of the first to fourteenth aspects is configured so that the controller is configured to transmit the first control signal to the different slave controller to control an additional actuator of the different electrical device if the controller acts as the master controller.

With the electrical device according to the fifteenth aspect, it is possible to operate the additional actuator of the different electrical device via the controller and the different slave controller.

In accordance with a sixteenth aspect of the present invention, the electrical device according to any one of the first to fifteenth aspects further comprises an actuator configured to generate actuating force. The controller is configured to control the actuator in response to the second control signal transmitted from the different master controller if the controller acts as the slave controller.

With the electrical device according to the sixteenth aspect, it is possible to operate the actuator via the controller based on the second control signal transmitted from the different master controller.

In accordance with a seventeenth aspect of the present invention, the electrical device according to the fifteenth or sixteenth aspect further comprises a base member and a movable member movable relative to the base member. The actuator is configured to move the movable member relative to the base member in response to the second control signal.

With the electrical device according to the seventeenth aspect, it is possible to move the movable member using the actuator and the controller.

In accordance with an eighteenth aspect of the present invention, a system for a human-powered vehicle comprises the electrical device according to any one of the first to seventeenth aspects and at least one of a slave electrical device including the different slave controller and a master electrical device including the different master controller.

With the electrical device according to the eighteenth aspect, it is possible to apply the electrical device including the controller to the system including the at least one of the slave electrical device and the master electrical device. Thus, it is possible to apply the electrical device to different systems.

In accordance with a nineteenth aspect of the present invention, the electrical device according to the eighteenth aspect is configured so that the at least one of the slave electrical device and the master electrical device includes an additional base member, an additional movable member movable relative to the additional base member, and an additional actuator configured to move the additional movable member relative to the additional base member.

With the electrical device according to the nineteenth aspect, it is possible to move the additional movable member using the additional actuator and at least one of the different slave controller and the different master controller.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
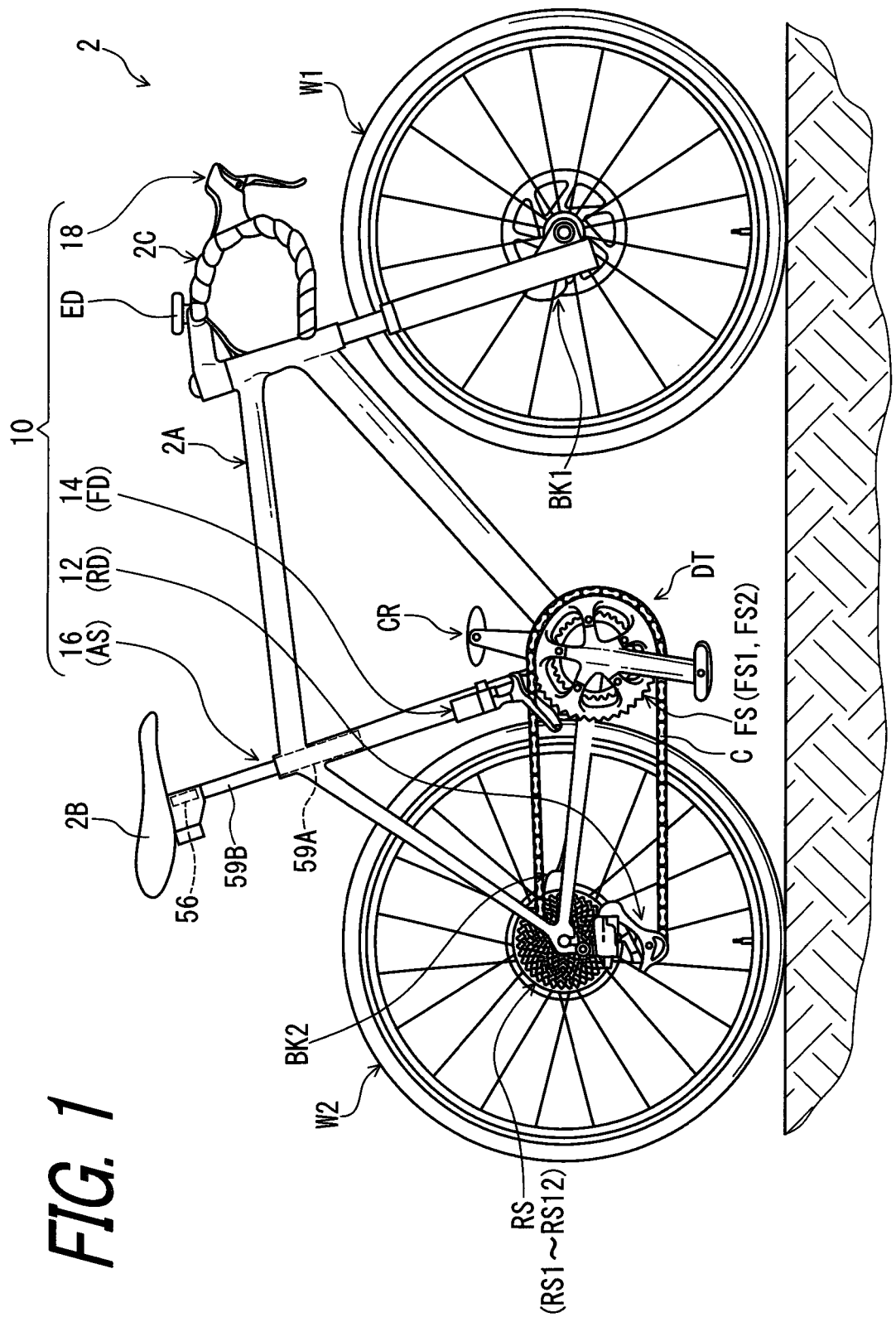
FIG. 1 is a side elevational view of a human-powered vehicle in accordance with an embodiment.

The embodiment(s) will now be described with reference to the accompanying drawings, wherein like reference numerals designate corresponding or identical elements throughout the various drawings.

As seen in FIG. 1, a human-powered vehicle 2 includes a system 10. The system 10 for the human-powered vehicle 2 comprises an electrical device 12. The system 10 for the human-powered vehicle 2 comprises an electrical device 14. The system 10 for the human-powered vehicle 2 comprises an electrical device 16. The system 10 for the human-powered vehicle 2 further comprises an operating device 18. The system 10 includes an external device ED. Examples of the external device ED include a smartphone, a tablet computer, and a cycle computer.

In the present application, a human-powered vehicle is a vehicle to travel with a motive power including at least a human power of a user who rides the human-powered vehicle (i.e., rider). The human-powered vehicle includes a various kind of bicycles such as a mountain bike, a road bike, a city bike, a cargo bike, a hand bike, and a recumbent bike. Furthermore, the human-powered vehicle includes an electric bike (E-bike). The electric bike includes an electrically assisted bicycle configured to assist propulsion of a vehicle with an electric motor. However, a total number of wheels of the human-powered vehicle is not limited to two. For example, the human-powered vehicle includes a vehicle having one wheel or three or more wheels. Especially, the human-powered vehicle does not include a vehicle that uses only an internal-combustion engine as motive power. Generally, a light road vehicle, which includes a vehicle that does not require a driver's license for a public road, is assumed as the human-powered vehicle.

The human-powered vehicle 2 further includes a vehicle body 2A, a saddle 2B, a handlebar 2C, a drive train DT, a wheel W1, a wheel W2, a brake device BK1, and a brake device BK2. The operating device 18 is configured to be mounted to the handlebar 2C. The operating device 18 is configured to be connected to the brake device BK1 via a mechanical cable or a hydraulic hose. The operating device 18 is configured to be connected to the brake device BK2 via a mechanical cable or a hydraulic hose.

The drive train DT includes a crank CR, a front sprocket assembly FS, a rear sprocket assembly RS, and a chain C. The front sprocket assembly FS is secured to the crank CR. The rear sprocket assembly RS is rotatably mounted to the vehicle body 2A. The chain C is engaged with the front sprocket assembly FS and the rear sprocket assembly RS. The front sprocket assembly FS includes a plurality of front sprockets FS1 and FS2. The rear sprocket assembly RS includes a plurality of rear sprockets RS1 to RS12. However, the total number of the front sprockets is not limited to two. The total number of the rear sprockets is not limited to twelve.

The electrical device 12 is configured to be mounted to the vehicle body 2A. The electrical device 12 is configured to shift the chain C relative to the plurality of rear sprockets RS1 to RS12 of the rear sprocket assembly RS to change a gear position of the human-powered vehicle 2. The electrical device 12 includes a derailleur RD configured to shift the chain C relative to the plurality of rear sprockets RS1 to RS12 of the rear sprocket assembly RS to change a gear position of the human-powered vehicle 2.

The electrical device 14 is configured to be mounted to the vehicle body 2A. The electrical device 14 is configured to shift the chain C relative to the plurality of front sprockets FS1 and FS2 of the front sprocket assembly FS to change the gear position of the human-powered vehicle 2. The electrical device 14 includes a derailleur FD configured to shift the chain C relative to the plurality of front sprockets FS1 and FS2 of the front sprocket assembly FS to change the gear position of the human-powered vehicle 2. The electrical device 14 can be omitted from the system 10 if needed and/or desired. In such an embodiment, the front sprocket assembly FS includes only a single front sprocket.

The electrical device 16 is configured to be mounted to the vehicle body 2A. The electrical device 16 is configured to change a height of the saddle 2B relative to the vehicle body 2A. The electrical device 16 includes an adjustable seatpost AS configured to change a height of the saddle 2B relative to the vehicle body 2A.

Each of the electrical devices 12, 14, and 16 is configured to be operated using the operating device 18. In the first embodiment, each of the electrical devices 12, 14, and 16 is configured to be electrically connected to the operating device 18 through a wireless communication channel. However, at least one of the electrical devices 12, 14, and 16 can be configured to be electrically connected to the operating device 18 through an electrical cable constituting a wired communication channel. Furthermore, at least one of the electrical devices 12, 14, and 16 can be automatically operated in an automatic shifting mode. Thus, in a case where the human-powered vehicle 2 has only the automatic shifting mode, shifter units configured to operate the electrical devices 12 and 14 can be omitted from the operating device 18, and a seatpost operating unit configured to operate the electrical device 16 can be omitted from the operating device 18. Furthermore, in a case where the electrical device 14 is omitted from the system 10, the shifter unit for the electrical device 14 can be omitted from the operating device 18.

In the present application, the following directional terms "front," "rear," "forward," "rearward," "left," "right," "transverse," "upward" and "downward" as well as any other similar directional terms refer to those directions which are determined on the basis of a user (e.g., a rider) who is in the user's standard position (e.g., on the saddle 2B or a seat) in the human-powered vehicle 2 with facing the handlebar 2C. Accordingly, these terms, as utilized to describe the electrical devices 12, 14, and 16 or other components, should be interpreted relative to the human-powered vehicle 2 equipped with the electrical devices 12, 14, and 16 as used in an upright riding position on a horizontal surface.

Figure 2:
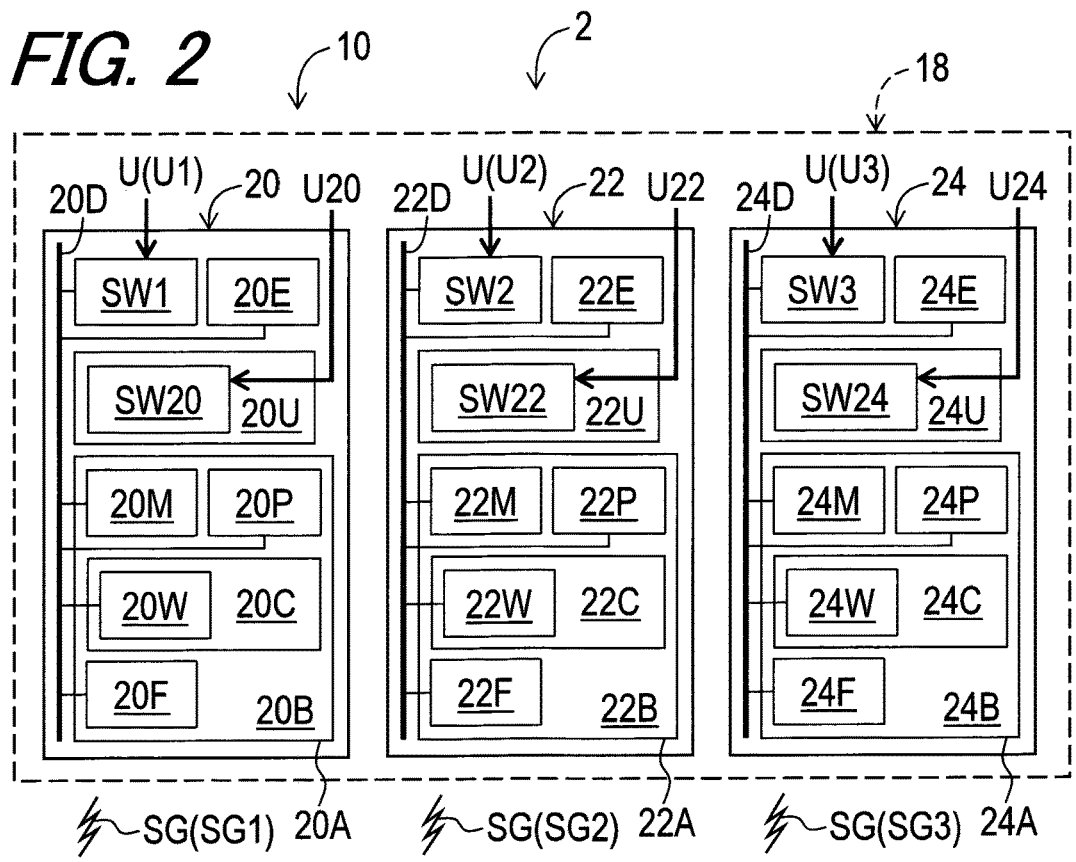
FIG. 2 is a schematic block diagram of a system of the human-powered vehicle illustrated in FIG. 1.
Figure 2:
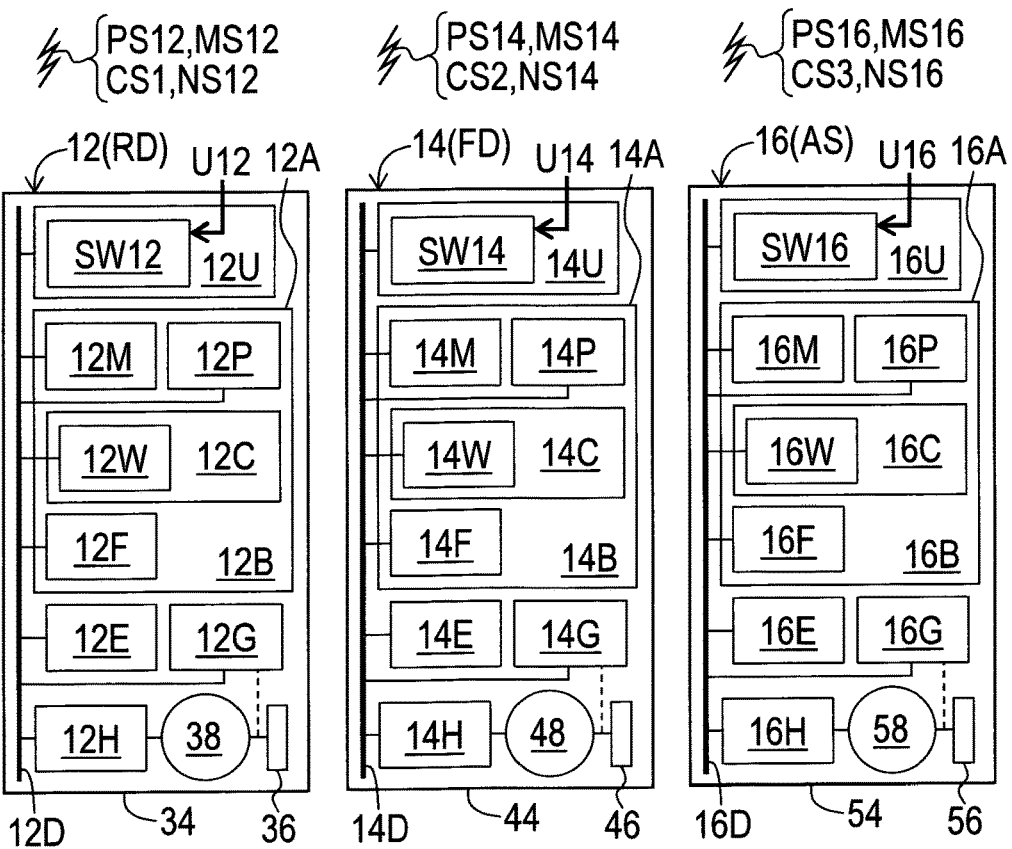

As seen in FIG. 2, the operating device 18 is configured to receive a user operating input U. The operating device 18 is configured to generate an operating signal SG in response to the user operating input U. The user operating input U includes a first user operating input U1, a second user operating input U2, and a third user operating input U3. The operating signal SG includes a first operating signal SG1, a second operating signal SG2, and a third operating signal SG3. The operating device 18 is configured to receive the first user operating input U1, the second user operating input U2, and the third user operating input U3. The operating device 18 is configured to generate a first operating signal SG1 in response to the first user operating input U1. The operating device 18 is configured to output a second operating signal SG2 in response to the second user operating input U2. The operating device 18 is configured to output a third operating signal SG3 in response to the third user operating input U3.

In the present embodiment, the operating device 18 includes a first operating device 20, a second operating device 22, and a third operating device 24. The first operating device 20, the second operating device 22, and the third operating device 24 are separate devices from each other. Each of the first operating device 20, the second operating device 22, and the third operating device 24 is configured to be mounted to the handlebar 2C (see e.g., FIG. 1). The first operating device 20 is configured to receive a first user operating input U1. The first operating device 20 is configured to output the first operating signal SG1 in response to the first user operating input U1. The second operating device 22 is configured to receive a second user operating input U2. The second operating device 22 is configured to output the second operating signal SG2 in response to the second user operating input U2. The third operating device 24 is configured to receive a third user operating input U3. The third operating device 24 is configured to output the third operating signal SG3 in response to the third user operating input U3.

The operating device 18 includes a first switch SW1, a second switch SW2, and a third switch SW3. The first switch SW1 is configured to receive the first user operating input U1. The second switch SW2 is configured to receive the second user operating input U2. The third switch SW3 is configured to receive the third user operating input U3. In the present embodiment, each of the first switch SW1, the second switch SW2, and the third switch SW3 includes a push-button switch. However, at least one of the first switch SW1, the second switch SW2, and the third switch SW3 can include other switches. The operating device 18 can include structures other than switches.

In the present embodiment, each of the first user operating input U1 and the first operating signal SG1 indicates upshifting of the derailleur RD of the electrical device 12. Each of the second user operating input U2 and the second operating signal SG2 indicates downshifting of the derailleur RD of the electrical device 12. A substantially simultaneous input of the first user operating input U1 and the second user operating input U2 indicates upshifting or downshifting of the derailleur FD of the electrical device 14. Each of the third user operating input U3 and the third operating signal SG3 indicates a change of a state of the adjustable seatpost AS of the electrical device 16 from a locked state to an adjustable state. However, the first user operating input U1, the second user operating input U2, the third user operating input U3, the first operating signal SG1, the second operating signal SG2, the third operating signal SG3 can indicate other actions if needed and/or desired.

As seen in FIG. 2, the electrical device 12 for the system 10 of the human-powered vehicle 2 comprises a controller 12A. The controller 12A is configured to selectively act, based on reference information relating to the system 10, as each of a master controller and a slave controller. The reference information will be described later. The electrical device 12 acts as a master electrical device if the controller 12A acts as the master controller. The electrical device 12 acts as a slave electrical device if the controller 12A acts as the slave controller.

The electrical device 12 further comprises a base member 34 and a movable member 36. The electrical device 12 further comprises an actuator 38. The base member 34 is configured to be mounted to the vehicle body 2A (see e.g., FIG. 1) of the human-powered vehicle 2. The movable member 36 is movable relative to the base member 34. The actuator 38 is configured to generate actuating force. The actuator 38 is configured to apply the actuating force to the movable member 36 to move the movable member 36 relative to the base member 34. The controller 12A is configured to control the actuator 38 to move the movable member 36 relative to the base member 34. In the present embodiment, the actuator 38 includes a motor configured to generate the actuating force. However, the actuator 38 can include other components such as a hydraulic unit if needed and/or desired.

The base member 34 can also be referred to as an additional base member 34. The movable member 36 can also be referred to as an additional movable member 36. The actuator 38 can also be referred to as an additional actuator 38. Thus, the additional movable member 36 is movable relative to the additional base member 34. The additional actuator 38 is configured to move the additional movable member 36 relative to the additional base member 34.

In the present embodiment, the movable member 36 is contactable with the chain C (see e.g., FIG. 1) to shift the chain C relative to the rear sprocket assembly RS (see e.g., FIG. 1). However, the movable member 36 can include other members.

The electrical device 12 includes an electric power source 12E. The electric power source 12E is configured to supply electricity to the controller 12A and the actuator 38. The electric power source 12E is configured to be electrically connected to the controller 12A and the actuator 38. Examples of the electric power source 12E include a battery and a capacitor. The electric power source 12E is mounted to at least one of the base member 34, the movable member 36, and the actuator 38. However, the electric power source 12E can be mounted to other devices. A shared electric power source can be electrically connected to the electrical device 12 via a wired communication structure if needed and/or desired.

The controller 12A includes a position detector 12G and an actuator driver 12H. The actuator 38 is electrically connected to the position detector 12G and the actuator driver 12H. The position detector 12G is configured to sense a current gear position of the electrical device 12 (e.g., a current position of the movable member 36). Examples of the position detector 12G include a potentiometer and a rotary encoder. The position detector 12G is configured to sense an absolute rotational position of an output part of the actuator 38 as the current gear position of the electrical device 12. The actuator driver 12H is configured to control the actuator 38 based on a control signal and the current gear position sensed by the position detector 12G.

The electrical device 14 for the system 10 of the human-powered vehicle 2 comprises a controller 14A. The controller 14A is configured to selectively act, based on the reference information relating to the system 10, as each of a master controller and a slave controller. The electrical device 14 acts as a master electrical device if the controller 14A acts as the master controller. The electrical device 14 acts as a slave electrical device if the controller 14A acts as the slave controller.

The electrical device 14 further comprises a base member 44 and a movable member 46. The electrical device 14 further comprises an actuator 48. The base member 44 is configured to be mounted to the vehicle body 2A (see e.g., FIG. 1) of the human-powered vehicle 2. The movable member 46 is movable relative to the base member 44. The actuator 48 is configured to generate actuating force. The actuator 48 is configured to apply the actuating force to the movable member 46 to move the movable member 46 relative to the base member 44. The controller 14A is configured to control the actuator 48 to move the movable member 46 relative to the base member 44. In the present embodiment, the actuator 48 includes a motor configured to generate the actuating force. However, the actuator 48 can include other components such as a hydraulic unit if needed and/or desired.

The base member 44 can also be referred to as an additional base member 44. The movable member 46 can also be referred to as an additional movable member 46. The actuator 48 can also be referred to as an additional actuator 48. Thus, the additional movable member 46 is movable relative to the additional base member 44. The additional actuator 48 is configured to move the additional movable member 46 relative to the additional base member 44.

In the present embodiment, the movable member 46 is contactable with the chain C to shift the chain C relative to the front sprocket assembly FS (see e.g., FIG. 1). However, the movable member 46 can include other members.

The electrical device 14 includes an electric power source 14E. The electric power source 14E is configured to supply electricity to the controller 14A and the actuator 48. The electric power source 14E is configured to be electrically connected to the controller 14A and the actuator 48. Examples of the electric power source 14E include a battery and a capacitor. The electric power source 14E is mounted to at least one of the base member 44, the movable member 46, and the actuator 48. However, the electric power source 14E can be mounted to other devices. A shared electric power source can be electrically connected to the electrical device 14 via a wired communication structure if needed and/or desired.

The controller 14A includes a position detector 14G and an actuator driver 14H. The actuator 48 is electrically connected to the position detector 14G and the actuator driver 14H. The position detector 14G is configured to sense a current gear position of the electrical device 14 (e.g., a current position of the movable member 46). Examples of the position detector 14G include a potentiometer and a rotary encoder. The position detector 14G is configured to sense an absolute rotational position of an output part of the actuator 48 as the current gear position of the electrical device 14. The actuator driver 14H is configured to control the actuator 48 based on a control signal and the current gear position sensed by the position detector 14G.

The electrical device 16 for the system 10 of the human-powered vehicle 2 comprises a controller 16A. The controller 16A is configured to selectively act, based on the reference information relating to the system 10, as each of a master controller and a slave controller. The electrical device 16 acts as a master electrical device if the controller 16A acts as the master controller. The electrical device 16 acts as a slave electrical device if the controller 16A acts as the slave controller.

The electrical device 16 further comprises a base member 54 and a movable member 56. The electrical device 16 further comprises an actuator 58. The base member 54 is configured to be mounted to the vehicle body 2A of the human-powered vehicle 2. The movable member 56 is movable relative to the base member 54. The actuator 58 is configured to generate actuating force. The actuator 58 is configured to apply the actuating force to the movable member 56 to move the movable member 56 relative to the base member 54. The controller 16A is configured to control the actuator 58 to move the movable member 56 relative to the base member 54. In the present embodiment, the actuator 58 includes a motor configured to generate the actuating force. However, the actuator 58 can include other components such as a hydraulic device if needed and/or desired.

The base member 54 can also be referred to as an additional base member 54. The movable member 56 can also be referred to as an additional movable member 56. The actuator 58 can also be referred to as an additional actuator 58. Thus, the additional movable member 56 is movable relative to the additional base member 54. The additional actuator 58 is configured to move the additional movable member 56 relative to the additional base member 54.

In the present embodiment, as seen in FIG. 1, the electrical device 16 includes a first longitudinal member 59A and a second longitudinal member 59B. The second longitudinal member 59B is movably coupled to the first longitudinal member 59A to change a position of the saddle 2B. The electrical device 16 includes a hydraulic valve unit configured to change a state of the electrical device 16 between a lock state and an adjustable state. In the lock state, a relative movement between the first longitudinal member 59A and the second longitudinal member 59B is restricted. In the adjustable state, the relative movement between the first longitudinal member 59A and the second longitudinal member 59B is allowed. For example, the movable member 56 includes a valve configured to change the state of the electrical device 16 between the lock state and the adjustable state. However, the movable member 56 can include other members.

The electrical device 16 includes an electric power source 16E. The electric power source 16E is configured to supply electricity to the controller 16A and the actuator 58. The electric power source 16E is configured to be electrically connected to the controller 16A and the actuator 58. Examples of the electric power source 16E include a battery and a capacitor. The electric power source 16E is mounted to at least one of the base member 54, the movable member 56, and the actuator 58. However, the electric power source 16E can be mounted to other devices. A shared electric power source can be electrically connected to the electrical device 16 via a wired communication structure if needed and/or desired.

The controller 16A includes a position detector 16G and an actuator driver 16H. The actuator 58 is electrically connected to the position detector 16G and the actuator driver 16H. The position detector 16G is configured to sense a current gear position of the electrical device 16 (e.g., a current position of the movable member 56). Examples of the position detector 16G include a potentiometer and a rotary encoder. The position detector 16G is configured to sense an absolute rotational position of an output part of the actuator 58 as the current gear position of the electrical device 16. The actuator driver 16H is configured to control the actuator 58 based on a control signal and the current gear position sensed by the position detector 16G.

The controller 12A includes a processor 12P, a memory 12M, a circuit board 12B, and a system bus 12D. The processor 12P and the memory 12M are electrically mounted on the circuit board 12B. The processor 12P includes a central processing unit (CPU) and a memory controller. The memory 12M is electrically connected to the processor 12P. The memory 12M includes a read only memory (ROM) and a random-access memory (RAM). The memory 12M includes storage areas each having an address in the ROM and the RAM. The processor 12P is configured to control the memory 12M to store data in the storage areas of the memory 12M and reads data from the storage areas of the memory 12M. The memory 12M (e.g., the ROM) stores at least one program. The at least one program is read into the processor 12P, and thereby algorithm of the controller 12A is executed based on the at least one program. For example, the controller 12A is configured to act as a master controller and to act as a slave controller based on the at least one program. The controller 12A can also be referred to as a control circuit or circuitry 12A.

The controller 14A includes a processor 14P, a memory 14M, a circuit board 14B, and a system bus 14D. The processor 14P and the memory 14M are electrically mounted on the circuit board 14B. The processor 14P includes a CPU and a memory controller. The memory 14M is electrically connected to the processor 14P. The memory 14M includes a ROM and a RAM. The memory 14M includes storage areas each having an address in the ROM and the RAM. The processor 14P is configured to control the memory 14M to store data in the storage areas of the memory 14M and reads data from the storage areas of the memory 14M. The memory 14M (e.g., the ROM) stores at least one program. The at least one program is read into the processor 14P, and thereby algorithm of the controller 14A is executed based on the at least one program. For example, the controller 14A is configured to act as a master controller and to act as a slave controller based on the at least one program. The controller 14A can also be referred to as a control circuit or circuitry 14A.

The controller 16A includes a processor 16P, a memory 16M, a circuit board 16B, and a system bus 16D. The processor 16P and the memory 16M are electrically mounted on the circuit board 16B. The processor 16P includes a CPU and a memory controller. The memory 16M is electrically connected to the processor 16P. The memory 16M includes a ROM and a RAM. The memory 16M includes storage areas each having an address in the ROM and the RAM. The processor 16P is configured to control the memory 16M to store data in the storage areas of the memory 16M and reads data from the storage areas of the memory 16M. The memory 16M (e.g., the ROM) stores at least one program. The at least one program is read into the processor 16P, and thereby algorithm of the controller 16A is executed based on the at least one program. For example, the controller 16A is configured to act as a master controller and to act as a slave controller based on the at least one program. The controller 16A can also be referred to as a control circuit or circuitry 16A.

The first operating device 20 includes a first controller 20A. The first controller 20A includes a processor 20P, a memory 20M, a circuit board 20B, and a system bus 20D. The processor 20P and the memory 20M are electrically mounted on the circuit board 20B. The processor 20P includes a CPU and a memory controller. The memory 20M is electrically connected to the processor 20P. The memory 20M includes a ROM and a RAM. The memory 20M includes storage areas each having an address in the ROM and the RAM. The processor 20P is configured to control the memory 20M to store data in the storage areas of the memory 20M and reads data from the storage areas of the memory 20M. The memory 20M (e.g., the ROM) stores at least one program. The at least one program is read into the processor 20P, and thereby algorithm of the first controller 20A is executed based on the at least one program. For example, the first controller 20A is configured to act as a slave controller based on the at least one program. The first controller 20A can also be referred to as a first control circuit or circuitry 20A. The first controller 20A can also be referred to as a controller 20A.

The first operating device 20 includes an electric power source 20E. The electric power source 20E is configured to supply electricity to the first controller 20A. The electric power source 20E is configured to be electrically connected to the first controller 20A. Examples of the electric power source 20E include a battery and a capacitor. However, the electric power source 20E can be mounted to other devices. A shared electric power source can be electrically connected to the first operating device 20 via a wired communication structure if needed and/or desired.

The second operating device 22 includes a second controller 22A. The second controller 22A includes a processor 22P, a memory 22M, a circuit board 22B, and a system bus 22D. The processor 22P and the memory 22M are electrically mounted on the circuit board 22B. The processor 22P includes a CPU and a memory controller. The memory 22M is electrically connected to the processor 22P. The memory 22M includes a ROM and a RAM. The memory 22M includes storage areas each having an address in the ROM and the RAM. The processor 22P is configured to control the memory 22M to store data in the storage areas of the memory 22M and reads data from the storage areas of the memory 22M. The memory 22M (e.g., the ROM) stores at least one program. The at least one program is read into the processor 22P, and thereby algorithm of the second controller 22A is executed based on the at least one program. For example, the second controller 22A is configured to act as a slave controller based on the at least one program. The second controller 22A can also be referred to as a second control circuit or circuitry 22A. The second controller 22A can also be referred to as a controller 22A.

The second operating device 22 includes an electric power source 22E. The electric power source 22E is configured to supply electricity to the second controller 22A. The electric power source 22E is configured to be electrically connected to the second controller 22A. Examples of the electric power source 22E include a battery and a capacitor. However, the electric power source 22E can be mounted to other devices. A shared electric power source can be electrically connected to the second operating device 22 via a wired communication structure if needed and/or desired.

The third operating device 24 includes a third controller 24A. The third controller 24A includes a processor 24P, a memory 24M, a circuit board 24B, and a system bus 24D. The processor 24P and the memory 24M are electrically mounted on the circuit board 24B. The processor 24P includes a CPU and a memory controller. The memory 24M is electrically connected to the processor 24P. The memory 24M includes a ROM and a RAM. The memory 24M includes storage areas each having an address in the ROM and the RAM. The processor 24P is configured to control the memory 24M to store data in the storage areas of the memory 24M and reads data from the storage areas of the memory 24M. The memory 24M (e.g., the ROM) stores at least one program. The at least one program is read into the processor 24P, and thereby algorithm of the third controller 24A is executed based on the at least one program. For example, the third controller 24A is configured to act as a slave controller based on the at least one program. The third controller 24A can also be referred to as a third control circuit or circuitry 24A. The third controller 24A can also be referred to as a controller 24A.

The third operating device 24 includes an electric power source 24E. The electric power source 24E is configured to supply electricity to the third controller 24A. The electric power source 24E is configured to be electrically connected to the third controller 24A. Examples of the electric power source 24E include a battery and a capacitor. However, the electric power source 24E can be mounted to other devices. A shared electric power source can be electrically connected to the third operating device 24 via a wired communication structure if needed and/or desired.

The controller 12A includes a communicator 12C. The controller 14A includes a communicator 14C. The controller 16A includes a communicator 16C. The first controller 20A includes a first communicator 20C. The second controller 22A includes a second communicator 22C. The third controller 24A includes a third communicator 24C.

The communicator 12C is configured to communicate with at least one of the communicator 14C, the communicator 16C, the first communicator 20C, the second communicator 22C, and the third communicator 24C. In the present embodiment, the communicator 12C is configured to communicate with each of the communicator 14C, the communicator 16C, the first communicator 20C, the second communicator 22C, and the third communicator 24C. However, the communicator 12C can be configured to communicate with at least one of the communicator 14C, the communicator 16C, the first communicator 20C, the second communicator 22C, and the third communicator 24C if needed and/or desired.

The communicator 14C is configured to communicate with at least one of the communicator 12C, the communicator 16C, the first communicator 20C, the second communicator 22C, and the third communicator 24C. In the present embodiment, the communicator 14C is configured to communicate with each of the communicator 12C, the communicator 16C, the first communicator 20C, the second communicator 22C, and the third communicator 24C. However, the communicator 14C can be configured to communicate with at least one of the communicator 12C, the communicator 16C, the first communicator 20C, the second communicator 22C, and the third communicator 24C if needed and/or desired.

The communicator 16C is configured to communicate with at least one of the communicator 12C, the communicator 14C, the first communicator 20C, the second communicator 22C, and the third communicator 24C. In the present embodiment, the communicator 16C is configured to communicate with each of the communicator 12C, the communicator 14C, the first communicator 20C, the second communicator 22C, and the third communicator 24C. However, the communicator 16C can be configured to communicate with at least one of the communicator 12C, the communicator 14C, the first communicator 20C, the second communicator 22C, and the third communicator 24C if needed and/or desired.

The first communicator 20C is configured to communicate with at least one of the communicator 12C, the communicator 14C, and the communicator 16C. In the present embodiment, the first communicator 20C is configured to communicate with each of the communicator 12C, the communicator 14C, and the communicator 16C. However, the communicator 20A can be configured to communicate with at least one of the communicator 12C, the communicator 14C, the communicator 16C, the second communicator 22C, and the third communicator 24C if needed and/or desired.

The second communicator 22C is configured to communicate with at least one of the communicator 12C, the communicator 14C, and the communicator 16C. In the present embodiment, the second communicator 22C is configured to communicate with each of the communicator 12C, the communicator 14C, and the communicator 16C. However, the communicator 20A can be configured to communicate with at least one of the communicator 12C, the communicator 14C, the communicator 16C, the first communicator 20C, and the third communicator 24C if needed and/or desired.

The third communicator 24C is configured to communicate with at least one of the communicator 12C, the communicator 14C, and the communicator 16C. In the present embodiment, the third communicator 24C is configured to communicate with each of the communicator 12C, the communicator 14C, and the communicator 16C. However, the communicator 20A can be configured to communicate with at least one of the communicator 12C, the communicator 14C, the communicator 16C, the first communicator 20C, and the second communicator 22C if needed and/or desired.

In the present embodiment, the communicator 12C includes a wireless communicator 12W. The communicator 14C includes a wireless communicator 14W. The communicator 16C includes a wireless communicator 16W. The first communicator 20C includes a first wireless communicator 20W. The second communicator 22C includes a second wireless communicator 22W. The third communicator 24C includes a third wireless communicator 24W.

The wireless communicator 12W is configured to communicate with at least one of the wireless communicator 14W, the wireless communicator 16W, the first wireless communicator 20W, the second wireless communicator 22W, and the third wireless communicator 24W via a wireless communication channel. The wireless communicator 12W is configured to communicate with each of the wireless communicator 14W, the wireless communicator 16W, the first wireless communicator 20W, the second wireless communicator 22W, and the third wireless communicator 24W via a wireless communication channel. However, the wireless communicator 12W can be configured to communicate with at least one of the wireless communicator 14W, the wireless communicator 16W, the first wireless communicator 20W, the second wireless communicator 22W, and the third wireless communicator 24W via a wireless communication channel if needed and/or desired.

The wireless communicator 14W is configured to communicate with at least one of the wireless communicator 12W, the wireless communicator 16W, the first wireless communicator 20W, the second wireless communicator 22W, and the third wireless communicator 24W via a wireless communication channel. The wireless communicator 14W is configured to communicate with each of the wireless communicator 12W, the wireless communicator 16W, the first wireless communicator 20W, the second wireless communicator 22W, and the third wireless communicator 24W via a wireless communication channel. However, the wireless communicator 14W can be configured to communicate with at least one of the wireless communicator 12W, the wireless communicator 16W, the first wireless communicator 20W, the second wireless communicator 22W, and the third wireless communicator 24W via a wireless communication channel if needed and/or desired.

The wireless communicator 16W is configured to communicate with at least one of the wireless communicator 12W, the wireless communicator 14W, the first wireless communicator 20W, the second wireless communicator 22W, and the third wireless communicator 24W via a wireless communication channel. The wireless communicator 16W is configured to communicate with each of the wireless communicator 12W, the wireless communicator 14W, the first wireless communicator 20W, the second wireless communicator 22W, and the third wireless communicator 24W via a wireless communication channel. However, the wireless communicator 16W can be configured to communicate with at least one of the wireless communicator 12W, the wireless communicator 14W, the first wireless communicator 20W, the second wireless communicator 22W, and the third wireless communicator 24W via a wireless communication channel if needed and/or desired.

The first wireless communicator 20W is configured to communicate with at least one of the wireless communicator 12W, the wireless communicator 14W, and the wireless communicator 16W via a wireless communication channel. The first wireless communicator 20W is configured to communicate with each of the wireless communicator 12W, the wireless communicator 14W, and the wireless communicator 16W via a wireless communication channel. However, the first wireless communicator 20W can be configured to communicate with at least one of the wireless communicator 12W, the wireless communicator 14W, the wireless communicator 16W, the second wireless communicator 22W, and the third wireless communicator 24W via a wireless communication channel if needed and/or desired.

The second wireless communicator 22W is configured to communicate with at least one of the wireless communicator 12W, the wireless communicator 14W, and the wireless communicator 16W via a wireless communication channel. The second wireless communicator 22W is configured to communicate with each of the wireless communicator 12W, the wireless communicator 14W, and the wireless communicator 16W via a wireless communication channel. However, the second wireless communicator 22W can be configured to communicate with at least one of the wireless communicator 12W, the wireless communicator 14W, the wireless communicator 16W, the first wireless communicator 20W, and the third wireless communicator 24W via a wireless communication channel if needed and/or desired.

The third wireless communicator 24W is configured to communicate with at least one of the wireless communicator 12W, the wireless communicator 14W, and the wireless communicator 16W via a wireless communication channel. The third wireless communicator 24W is configured to communicate with each of the wireless communicator 12W, the wireless communicator 14W, and the wireless communicator 16W via a wireless communication channel. However, the third wireless communicator 24W can be configured to communicate with at least one of the wireless communicator 12W, the wireless communicator 14W, the wireless communicator 16W, the first wireless communicator 20W, and the second wireless communicator 22W via a wireless communication channel if needed and/or desired.

The wireless communicator 12W is electrically mounted on the circuit board 12B. The wireless communicator 12W is electrically connected to the processor 12P and the memory 12M with the circuit board 12B and the system bus 12D. The wireless communicator 12W includes a signal transmitting circuit or circuitry, a signal receiving circuit or circuitry, and an antenna. Thus, the wireless communicator 12W can also be referred to as a wireless communicator circuit or circuitry 12C.

The wireless communicator 12W is configured to superimpose digital signals on carrier wave using a predetermined wireless communication protocol to wirelessly transmit signals. In the first embodiment, the wireless communicator 12W is configured to encrypt signals using a cryptographic key to generate encrypted wireless signals.

The wireless communicator 12W is configured to receive wireless signals via the antenna. In the first embodiment, the wireless communicator 12W is configured to decode the wireless signals to recognize signals transmitted from other wireless communicators such as the wireless communicator 14W, the wireless communicator 16W, the first wireless communicator 20W, the second wireless communicator 22W, and the third wireless communicator 24W. The wireless communicator 12W is configured to decrypt the wireless signals using the cryptographic key.

The wireless communicator 14W is electrically mounted on the circuit board 14B. The wireless communicator 14W is electrically connected to the processor 14P and the memory 14M with the circuit board 14B and the system bus 14D. The wireless communicator 14W includes a signal transmitting circuit or circuitry, a signal receiving circuit or circuitry, and an antenna. Thus, the wireless communicator 14W can also be referred to as a wireless communicator circuit or circuitry 14C.

The wireless communicator 14W is configured to superimpose digital signals on carrier wave using a predetermined wireless communication protocol to wirelessly transmit signals. In the first embodiment, the wireless communicator 14W is configured to encrypt signals using a cryptographic key to generate encrypted wireless signals.

The wireless communicator 14W is configured to receive wireless signals via the antenna. In the first embodiment, the wireless communicator 14W is configured to decode the wireless signals to recognize signals transmitted from other wireless communicators such as the wireless communicator 12W, the wireless communicator 16W, the first wireless communicator 20W, the second wireless communicator 22W, and the third wireless communicator 24W. The wireless communicator 14W is configured to decrypt the wireless signals using the cryptographic key.

The wireless communicator 16W is electrically mounted on the circuit board 16B. The wireless communicator 16W is electrically connected to the processor 16P and the memory 16M with the circuit board 16B and the system bus 16D. The wireless communicator 16W includes a signal transmitting circuit or circuitry, a signal receiving circuit or circuitry, and an antenna. Thus, the wireless communicator 16W can also be referred to as a wireless communicator circuit or circuitry 16C.

The wireless communicator 16W is configured to superimpose digital signals on carrier wave using a predetermined wireless communication protocol to wirelessly transmit signals. In the first embodiment, the wireless communicator 16W is configured to encrypt signals using a cryptographic key to generate encrypted wireless signals.

The wireless communicator 16W is configured to receive wireless signals via the antenna. In the first embodiment, the wireless communicator 16W is configured to decode the wireless signals to recognize signals transmitted from other wireless communicators such as the wireless communicator 12W, the wireless communicator 14W, the first wireless communicator 20W, the second wireless communicator 22W, and the third wireless communicator 24W. The wireless communicator 16W is configured to decrypt the wireless signals using the cryptographic key.

The first wireless communicator 20W is electrically mounted on the circuit board 20B. The first wireless communicator 20W is electrically connected to the processor 20P and the memory 20M with the circuit board 20B and the system bus 20D. The first wireless communicator 20W includes a signal transmitting circuit or circuitry, a signal receiving circuit or circuitry, and an antenna. Thus, the first wireless communicator 20W can also be referred to as a wireless communicator circuit or circuitry 20C.

The first wireless communicator 20W is configured to superimpose digital signals on carrier wave using a predetermined wireless communication protocol to wirelessly transmit signals. In the first embodiment, the first wireless communicator 20W is configured to encrypt signals using a cryptographic key to generate encrypted wireless signals.

The first wireless communicator 20W is configured to receive wireless signals via the antenna. In the first embodiment, the first wireless communicator 20W is configured to decode the wireless signals to recognize signals transmitted from other wireless communicators such as the wireless communicator 12W, the wireless communicator 14W, the wireless communicator 16W, the second wireless communicator 22W, and the third wireless communicator 24W. The first wireless communicator 20W is configured to decrypt the wireless signals using the cryptographic key.

The second wireless communicator 22W is electrically mounted on the circuit board 22B. The second wireless communicator 22W is electrically connected to the processor 22P and the memory 22M with the circuit board 22B and the system bus 22D. The second wireless communicator 22W includes a signal transmitting circuit or circuitry, a signal receiving circuit or circuitry, and an antenna. Thus, the second wireless communicator 22W can also be referred to as a wireless communicator circuit or circuitry 22C.

The second wireless communicator 22W is configured to superimpose digital signals on carrier wave using a predetermined wireless communication protocol to wirelessly transmit signals. In the second embodiment, the second wireless communicator 22W is configured to encrypt signals using a cryptographic key to generate encrypted wireless signals.

The second wireless communicator 22W is configured to receive wireless signals via the antenna. In the second embodiment, the second wireless communicator 22W is configured to decode the wireless signals to recognize signals transmitted from other wireless communicators such as the wireless communicator 12W, the wireless communicator 14W, the wireless communicator 16W, the first wireless communicator 20W, and the third wireless communicator 24W. The second wireless communicator 22W is configured to decrypt the wireless signals using the cryptographic key.

The third wireless communicator 24W is electrically mounted on the circuit board 24B. The third wireless communicator 24W is electrically connected to the processor 24P and the memory 24M with the circuit board 24B and the system bus 24D. The third wireless communicator 24W includes a signal transmitting circuit or circuitry, a signal receiving circuit or circuitry, and an antenna. Thus, the third wireless communicator 24W can also be referred to as a wireless communicator circuit or circuitry 24C.

The third wireless communicator 24W is configured to superimpose digital signals on carrier wave using a predetermined wireless communication protocol to wirelessly transmit signals. In the third embodiment, the third wireless communicator 24W is configured to encrypt signals using a cryptographic key to generate encrypted wireless signals.

The third wireless communicator 24W is configured to receive wireless signals via the antenna. In the third embodiment, the third wireless communicator 24W is configured to decode the wireless signals to recognize signals transmitted from other wireless communicators such as the wireless communicator 12W, the wireless communicator 14W, the wireless communicator 16W, the first wireless communicator 20W, and the second wireless communicator 22W. The third wireless communicator 24W is configured to decrypt the wireless signals using the cryptographic key.

The controller 12A includes a user interface 12U configured to receive a user input U12. The user interface 12U includes a switch SW12 configured to receive the user input U12. The switch SW12 includes a push-button switch. However, the switch can include other types of switches if needed and/or desired. The user interface 12U can include structures other than the switch.

The controller 12A has a pairing mode in which the controller 12A executes pairing between the controller 12A and one of the different slave controller 14A and/or 16A and the different master controller 14A and/or 16A. The controller 12A is configured to wirelessly transmit a pairing signal PS12 in the pairing mode. The pairing signal PS12 includes identifying information indicating the electrical device 12.

For example, the pairing signal PS12 includes an advertising signal PS12A, a scanning request signal PS12B, and a scanning response signal PS12C. The controller 12A is configured to wirelessly transmit the advertising signal PS12A to notice existence of the electrical device 12 to the different master controller. The advertising signal PS12A of the controller 12A includes the identifying information such as a Media Access Control (MAC) address of the electrical device 12. The controller 12A is configured to wirelessly transmit the scanning request signal PS12B to request the different slave electrical device to transmit a scanning response signal. The scanning request signal PS12B of the controller 12A includes the identifying information such as the MAC address of the master electrical device 12 and/or the identifying information such as a MAC address of the different slave electrical device. The controller 12A is configured to wirelessly transmit the scanning response signal PS12C to respond a scanning request signal transmitted from the different master controller. The scanning response signal PS12C of the controller 12A includes additional identifying information of the electrical device 12. The pairing signal PS12 of the controller 12A is not limited to the above signals.

The controller 12A is configured to wirelessly transmit a master signal MS12 in the pairing mode. The master signal MS12 includes identifying information such as the MAC address of the master electrical device 12. The master signal MS12 includes additional information indicating that the electrical device 12 acts as the master electrical device.

The controller 12A is configured to enter the pairing mode in response to the user input U12 received by the user interface 12U. The controller 12A is configured to enter the pairing mode in response to the user input U12 received by the switch SW12. In the present embodiment, for example, the controller 12A is configured to enter the pairing mode in response to a long press of the switch SW12. However, the user interface 12U can be used for other actions of the electrical device 12.

The controller 14A includes a user interface 14U configured to receive a user input U14. The user interface 14U includes a switch SW14 configured to receive the user input U14. The switch SW14 includes a push-button switch. However, the switch can include other types of switches if needed and/or desired. The user interface 14U can include structures other than the switch.

The controller 14A has a pairing mode in which the controller 14A executes pairing between the controller 14A and one of the different slave controller 12A and/or 16A and the different master controller 12A and/or 16A. The controller 14A is configured to wirelessly transmit a pairing signal PS14 in the pairing mode. The pairing signal PS14 includes identifying information indicating the electrical device 14.

For example, the pairing signal PS14 includes an advertising signal PS14A, a scanning request signal PS14B, and a scanning response signal PS14C. The controller 14A is configured to wirelessly transmit the advertising signal PS14A to notice existence of the electrical device 14 to the different master controller. The advertising signal PS14A of the controller 14A includes the identifying information such as a MAC address of the electrical device 14. The controller 14A is configured to wirelessly transmit the scanning request signal PS14B to request the different slave electrical device to transmit a scanning response signal. The scanning request signal PS14B of the controller 14A includes the identifying information such as the MAC address of the master electrical device 14 and/or the identifying information such as a MAC address of the different slave electrical device. The controller 14A is configured to wirelessly transmit the scanning response signal PS14C to respond a scanning request signal transmitted from the different master controller. The scanning response signal PS14C of the controller 14A includes additional identifying information of the electrical device 14. The pairing signal PS14 of the controller 14A is not limited to the above signals.

The controller 14A is configured to wirelessly transmit a master signal MS14 in the pairing mode. The master signal MS14 includes identifying information such as the MAC address of the master electrical device 14. The master signal MS14 includes additional information indicating that the electrical device 14 acts as the master electrical device.

The controller 14A is configured to enter the pairing mode in response to the user input U14 received by the user interface 14U. The controller 14A is configured to enter the pairing mode in response to the user input U14 received by the switch SW14. In the present embodiment, for example, the controller 14A is configured to enter the pairing mode in response to a long press of the switch SW14. However, the user interface 14U can be used for other actions of the electrical device 14.

The controller 16A includes a user interface 16U configured to receive a user input U16. The user interface 16U includes a switch SW16 configured to receive the user input U16. The switch SW16 includes a push-button switch. However, the switch can include other types of switches if needed and/or desired. The user interface 16U can include structures other than the switch.

The controller 16A has a pairing mode in which the controller 16A executes pairing between the controller 16A and one of the different slave controller 12A and/or 14A and the different master controller 12A and/or 14A. The controller 16A is configured to wirelessly transmit a pairing signal PS16 in the pairing mode. The pairing signal PS16 includes identifying information indicating the electrical device 16.

For example, the pairing signal PS16 includes an advertising signal PS16A, a scanning request signal PS16B, and a scanning response signal PS16C. The controller 16A is configured to wirelessly transmit the advertising signal PS16A to notice existence of the electrical device 16 to the different master controller. The advertising signal PS16A of the controller 16A includes the identifying information such as a MAC address of the electrical device 16. The controller 16A is configured to wirelessly transmit the scanning request signal PS16B to request the different slave electrical device to transmit a scanning response signal. The scanning request signal PS16B of the controller 16A includes the identifying information such as the MAC address of the master electrical device 16 and/or the identifying information such as a MAC address of the different slave electrical device. The controller 16A is configured to wirelessly transmit the scanning response signal PS16C to respond a scanning request signal transmitted from the different master controller. The scanning response signal PS16C of the controller 16A includes additional identifying information of the electrical device 16. The pairing signal PS16 of the controller 16A is not limited to the above signals.

The controller 16A is configured to wirelessly transmit a master signal MS16 in the pairing mode. The master signal MS16 includes identifying information such as the MAC address of the master electrical device 16. The master signal MS16 includes additional information indicating that the electrical device 16 acts as the master electrical device.

The controller 16A is configured to enter the pairing mode in response to the user input U16 received by the user interface 16U. The controller 16A is configured to enter the pairing mode in response to the user input U16 received by the switch SW16. In the present embodiment, for example, the controller 16A is configured to enter the pairing mode in response to a long press of the switch SW16. However, the user interface 16U can be used for other actions of the electrical device 16.

The first controller 20A includes a user interface 20U configured to receive a user input U20. The user interface 20U includes a switch SW20 configured to receive the user input U20. The switch SW20 includes a push-button switch. However, the switch can include other types of switches if needed and/or desired. The user interface 20U can include structures other than the switch.

The first controller 20A has a pairing mode in which the first controller 20A executes pairing between the first controller 20A and another controller. The first controller 20A is configured to wirelessly transmit a pairing signal PS20 in the pairing mode. The pairing signal PS20 includes identifying information indicating the first operating device 20.

For example, the pairing signal PS20 includes an advertising signal PS20A and a scanning response signal PS20C. The controller 20A is configured to wirelessly transmit the advertising signal PS20A to notice existence of the first operating device 20 to the other controller. The advertising signal PS20A of the controller 20A includes the identifying information such as a MAC address of the first operating device 20. The controller 20A is configured to wirelessly transmit the scanning response signal PS20C to respond a scanning request signal such as the scanning request signal PS12B, PS14B, or PS16B transmitted from another controller such as the controller 12A, 14A, or 16A. The scanning response signal PS20C of the controller 20A includes additional identifying information of the first operating device 20. The pairing signal PS20 of the controller 20A is not limited to the above signals.

The first controller 20A is configured to enter the pairing mode in response to the user input U20 received by the user interface 20U. The first controller 20A is configured to enter the pairing mode in response to the user input U20 received by the switch SW20. In the present embodiment, for example, the first controller 20A is configured to enter the pairing mode in response to a long press of the switch SW20. However, the user interface 20U can be used for other actions of the first operating device 20.

The second controller 22A includes a user interface 22U configured to receive a user input U22. The user interface 22U includes a switch SW22 configured to receive the user input U22. The switch SW22 includes a push-button switch. However, the switch can include other types of switches if needed and/or desired. The user interface 22U can include structures other than the switch.

The second controller 22A has a pairing mode in which the second controller 22A executes pairing between the second controller 22A and another controller. The second controller 22A is configured to wirelessly transmit a pairing signal PS22 in the pairing mode. The pairing signal PS22 includes identifying information indicating the second operating device 22.

For example, the pairing signal PS22 includes an advertising signal PS22A and a scanning response signal PS22C. The controller 22A is configured to wirelessly transmit the advertising signal PS22A to notice existence of the second operating device 22 to the other controller. The advertising signal PS22A of the controller 22A includes the identifying information such as a MAC address of the second operating device 22. The controller 22A is configured to wirelessly transmit the scanning response signal PS22C to respond a scanning request signal such as the scanning request signal PS12B, PS14B, or PS16B transmitted from another controller such as the controller 12A, 14A, or 16A. The scanning response signal PS22C of the controller 22A includes additional identifying information of the second operating device 22. The pairing signal PS22 of the controller 22A is not limited to the above signals.

The second controller 22A is configured to enter the pairing mode in response to the user input U22 received by the user interface 22U. The second controller 22A is configured to enter the pairing mode in response to the user input U22 received by the switch SW22. In the present embodiment, for example, the second controller 22A is configured to enter the pairing mode in response to a long press of the switch SW22. However, the user interface 22U can be used for other actions of the second operating device 22.

The third controller 24A includes a user interface 24U configured to receive a user input U24. The user interface 24U includes a switch SW24 configured to receive the user input U24. The switch SW24 includes a push-button switch. However, the switch can include other types of switches if needed and/or desired. The user interface 24U can include structures other than the switch.

The third controller 24A has a pairing mode in which the third controller 24A executes pairing between the third controller 24A and another controller. The third controller 24A is configured to wirelessly transmit a pairing signal PS24 in the pairing mode. The pairing signal PS24 includes identifying information indicating the third operating device 24.

For example, the pairing signal PS24 includes an advertising signal PS24A and a scanning response signal PS24C. The controller 24A is configured to wirelessly transmit the advertising signal PS24A to notice existence of the third operating device 24 to the other controller. The advertising signal PS24A of the controller 24A includes the identifying information such as a MAC address of the third operating device 24. The controller 24A is configured to wirelessly transmit the scanning response signal PS24C to respond a scanning request signal such as the scanning request signal PS12B, PS14B, or PS16B transmitted from another controller such as the controller 12A, 14A, or 16A. The scanning response signal PS24C of the controller 24A includes additional identifying information of the third operating device 24. The pairing signal PS24 of the controller 24A is not limited to the above signals.

The third controller 24A is configured to enter the pairing mode in response to the user input U24 received by the user interface 24U. The third controller 24A is configured to enter the pairing mode in response to the user input U24 received by the switch SW24. In the present embodiment, for example, the third controller 24A is configured to enter the pairing mode in response to a long press of the switch SW24. However, the user interface 24U can be used for other actions of the third operating device 24.

The electrical device 12 includes an informing unit 12F. The informing unit 12F is configured to inform the user of information relating to the electrical device 12. For example, the informing unit 12F is configured to inform the user of at least one of a status of the electrical device 12, a communication state of the communicator 12C, a status of the pairing mode of the controller 12A, and a remaining level of the electric power source 12E. The informing unit 12F includes a light emitter configured to emit light based on the information relating to the electrical device 12. Examples of the light emitter include a light emitting diode (LED). The informing unit 12F is electrically connected to the controller 12A and the electric power source 12E. The informing unit 12F is electrically mounted on the circuit board 12B of the controller 12A. The controller 12A is configured to control the informing unit 12F to inform the user of the information relating to the electrical device 12.

The electrical device 14 includes an informing unit 14F. The informing unit 14F is configured to inform the user of information relating to the electrical device 14. For example, the informing unit 14F is configured to inform the user of at least one of a status of the electrical device 14, a communication state of the communicator 14C, a status of the pairing mode of the controller 14A, and a remaining level of the electric power source 14E. The informing unit 14F includes a light emitter configured to emit light based on the information relating to the electrical device 14. Examples of the light emitter include a LED. The informing unit 14F is electrically connected to the controller 14A and the electric power source 14E. The informing unit 14F is electrically mounted on the circuit board 14B of the controller 14A. The controller 14A is configured to control the informing unit 14F to informs the user of the information relating to the electrical device 14.

The electrical device 16 includes an informing unit 16F. The informing unit 16F is configured to inform the user of information relating to the electrical device 16. For example, the informing unit 16F is configured to inform the user of at least one of a status of the electrical device 16, a communication state of the communicator 16C, a status of the pairing mode of the controller 16A, and a remaining level of the electric power source 16E. The informing unit 16F includes a light emitter configured to emit light based on the information relating to the electrical device 16. Examples of the light emitter include a LED. The informing unit 16F is electrically connected to the controller 16A and the electric power source 16E. The informing unit 16F is electrically mounted on the circuit board 16B of the controller 16A. The controller 16A is configured to control the informing unit 16F to inform the user of the information relating to the electrical device 16.

The first operating device 20 includes an informing unit 20F. The informing unit 20F is configured to inform the user of information relating to the first operating device 20. For example, the informing unit 20F is configured to inform the user of at least one of a status of the first operating device 20, a communication state of the communicator 20C, a status of the pairing mode of the first controller 20A, and a remaining level of the electric power source 20E. The informing unit 20F includes a light emitter configured to emit light based on the information relating to the first operating device 20. Examples of the light emitter include a LED. The informing unit 20F is electrically connected to the first controller 20A and the electric power source 20E. The informing unit 20F is electrically mounted on the circuit board 20B of the first controller 20A. The first controller 20A is configured to control the informing unit 20F to inform the user of the information relating to the first operating device 20.

The second operating device 22 includes an informing unit 22F. The informing unit 22F is configured to inform the user of information relating to the second operating device 22. For example, the informing unit 22F is configured to inform the user of at least one of a status of the second operating device 22, a communication state of the communicator 22C, a status of the pairing mode of the second controller 22A, and a remaining level of the electric power source 22E. The informing unit 22F includes a light emitter configured to emit light based on the information relating to the second operating device 22. Examples of the light emitter include a LED. The informing unit 22F is electrically connected to the second controller 22A and the electric power source 22E. The informing unit 22F is electrically mounted on the circuit board 22B of the second controller 22A. The second controller 22A is configured to control the informing unit 22F to inform the user of the information relating to the second operating device 22.

The third operating device 24 includes an informing unit 24F. The informing unit 24F is configured to inform the user of information relating to the third operating device 24. For example, the informing unit 24F is configured to inform the user of at least one of a status of the third operating device 24, a communication state of the communicator 24C, a status of the pairing mode of the third controller 24A, and a remaining level of the electric power source 24E. The informing unit 24F includes a light emitter configured to emit light based on the information relating to the third operating device 24. Examples of the light emitter include a LED. The informing unit 24F is electrically connected to the third controller 24A and the electric power source 24E. The informing unit 24F is electrically mounted on the circuit board 24B of the third controller 24A. The third controller 24A is configured to control the informing unit 24F to inform the user of the information relating to the third operating device 24.

Figure 3:
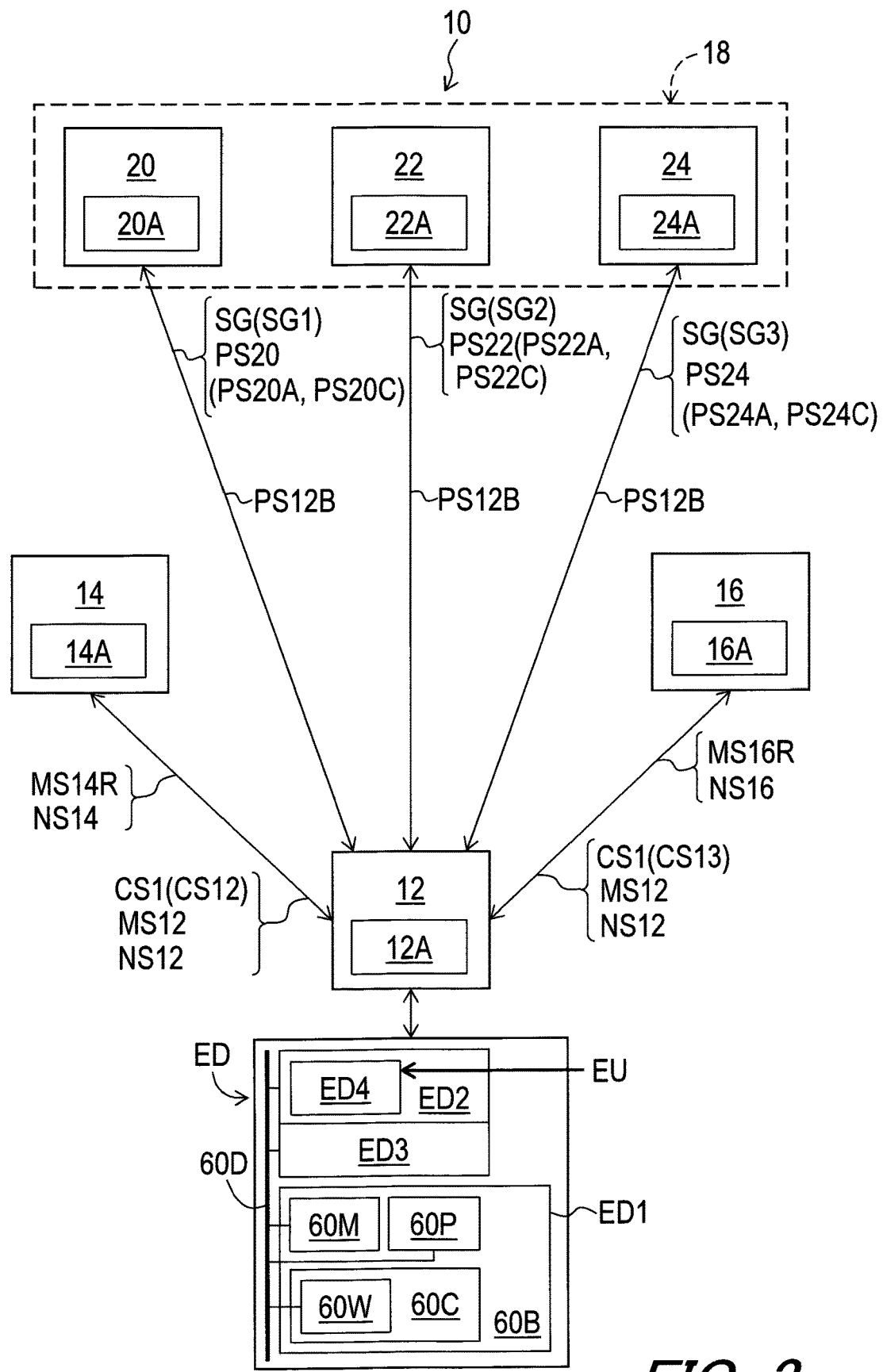
FIG. 3 is a schematic block diagram of the system illustrated in FIG. 2 in a case where one of electrical devices acts as a master electrical device.
Figure 4:
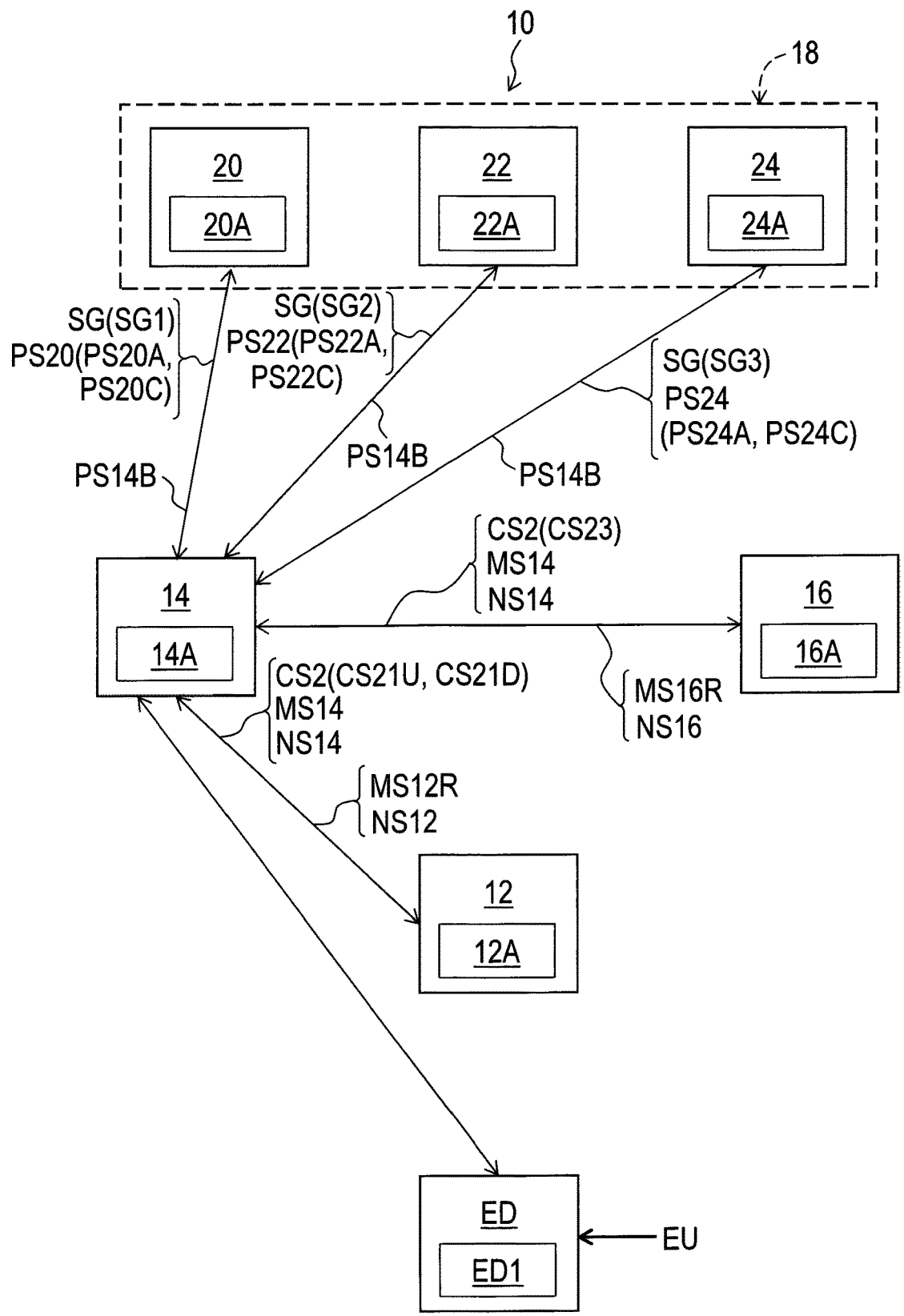
FIG. 4 is a schematic block diagram of the system illustrated in FIG. 2 in a case where another of electrical devices acts as a master electrical device.
Figure 5:
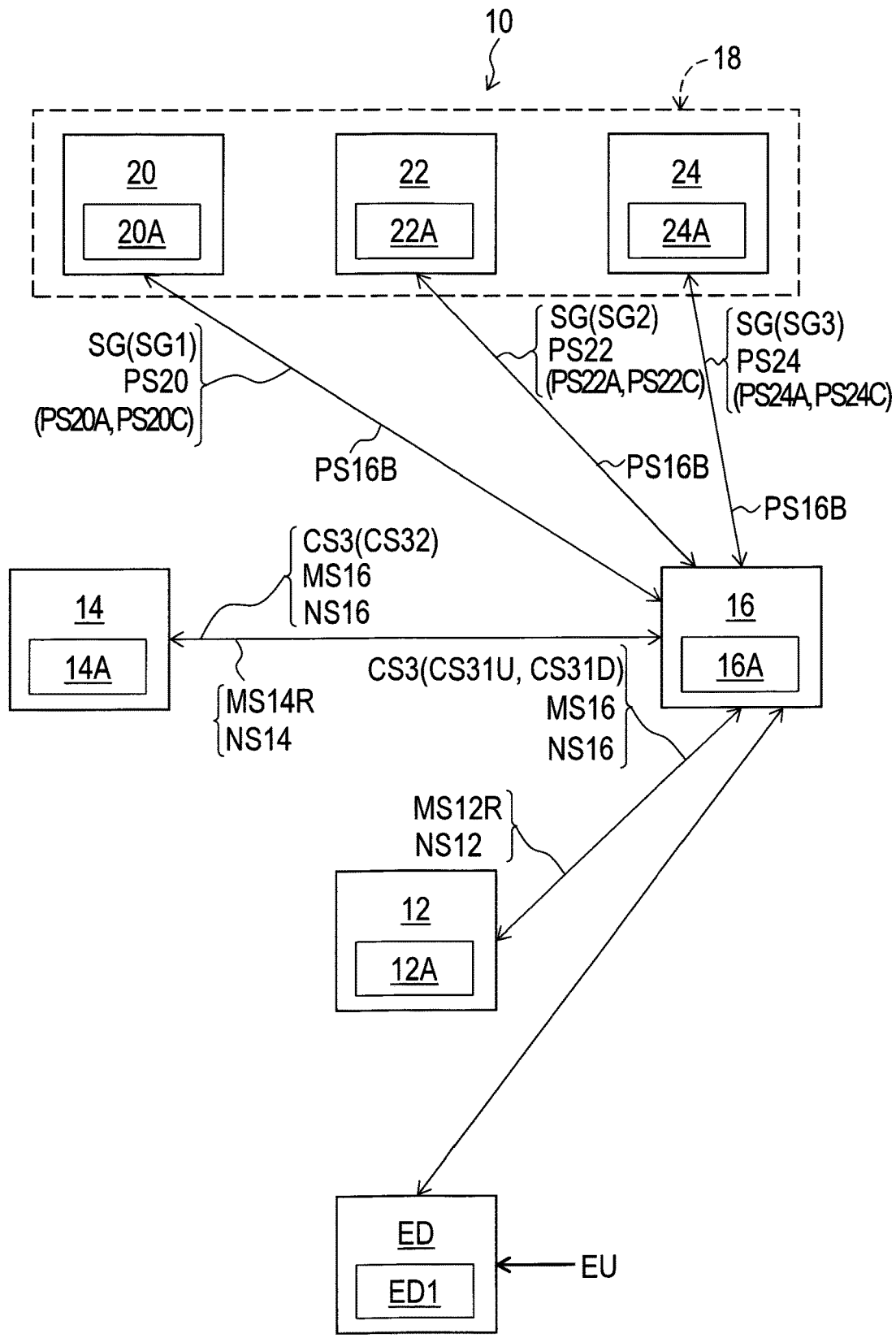
FIG. 5 is a schematic block diagram of the system illustrated in FIG. 2 in a case where another of electrical devices acts as a master electrical device.

As seen in FIGS. 3 to 5, the system 10 for the human-powered vehicle 2 comprises at least one of a slave electrical device and a master electrical device. As seen in FIG. 3, in a case where the electrical device 12 acts as the master electrical device, each of the electrical devices 14 and 16 act as the slave electrical device. In such an embodiment, the electrical device 12 can also be referred to as a master electrical device 12. The electrical device 14 can also be referred to as a slave electrical device 14. The electrical device 16 can also be referred to as a slave electrical device 16. Thus, the system 10 for the human-powered vehicle 2 comprises the slave electrical devices 14 and 16 and the master electrical device 12.

In a case where the electrical device 12 acts as the master electrical device, the controller 12A of the electrical device 12 can also be referred to as a master controller 12A or a different master controller 12A. In a case where each of the electrical devices 14 and 16 act as the slave electrical device, the controller 14A of the electrical device 14 can also be referred to as a slave controller 14A or a different slave controller 14A. The controller 16A of the electrical device 16 can also be referred to as a slave controller 16A or a different slave controller 16A. The electrical device 14 can also be referred to as a different electrical device 14. The electrical device 16 can also be referred to as a different electrical device 16. Thus, the master electrical device 12 includes the different master controller 12A. The slave electrical device 14 includes the different slave controller 14A. The slave electrical device 16 includes the different slave controller 16A.

As seen in FIG. 4, in a case where the electrical device 14 acts as the master electrical device, each of the electrical devices 12 and 16 act as the slave electrical device. In such an embodiment, the electrical device 14 can also be referred to as a master electrical device 14. The electrical device 12 can also be referred to as a slave electrical device 12. The electrical device 16 can also be referred to as a slave electrical device 16. Thus, the system 10 for the human-powered vehicle 2 comprises the slave electrical devices 12 and 16 and the master electrical device 14.

In a case where the electrical device 14 acts as the master electrical device, the controller 14A of the electrical device 14 can also be referred to as a master controller 14A or a different master controller 14A. In a case where the electrical device 14 acts as the master electrical device, each of the electrical devices 12 and 16 act as the slave electrical device, the controller 12A of the electrical device 12 can also be referred to as a slave controller 12A or a different slave controller 12A. The controller 16A of the electrical device 16 can also be referred to as a slave controller 16A or a different slave controller 16A. The electrical device 12 can also be referred to as a different electrical device 12. The electrical device 16 can also be referred to as a different electrical device 16. Thus, the master electrical device 14 includes the different master controller 14A. The slave electrical device 12 includes the different slave controller 12A. The slave electrical device 16 includes the different slave controller 16A.

As seen in FIG. 5, in a case where the electrical device 16 acts as the master electrical device, each of the electrical devices 12 and 14 act as the slave electrical device. In such an embodiment, the electrical device 16 can also be referred to as a master electrical device 16. The electrical device 12 can also be referred to as a slave electrical device 12. The electrical device 14 can also be referred to as a slave electrical device 14. Thus, the system 10 for the human-powered vehicle 2 comprises the slave electrical devices 12 and 14 and the master electrical device 16.

In a case where the electrical device 16 acts as the master electrical device, the controller 16A of the electrical device 16 can also be referred to as a master controller 16A or a different master controller 16A. In a case where each of the electrical devices 12 and 14 act as the slave electrical device, the controller 12A of the electrical device 12 can also be referred to as a slave controller 12A or a different slave controller 12A. The controller 14A of the electrical device 14 can also be referred to as a slave controller 14A or a different slave controller 14A. The electrical device 12 can also be referred to as a different electrical device 12. The electrical device 14 can also be referred to as a different electrical device 14. Thus, the master electrical device 16 includes the different master controller 16A. The slave electrical device 12 includes the different slave controller 12A. The slave electrical device 14 includes the different slave controller 14A.

As seen in FIG. 2, the at least one of the slave electrical device 12, 14, and/or 16 and the master electrical device 12, 14, and/or 16 includes an additional base member, an additional movable member, and an additional actuator.

In the present embodiment, the slave or master electrical device 12 includes the additional base member 34, the additional movable member 36, and the additional actuator 38. The slave or master electrical device 12 includes the additional base member 34, the additional movable member 36, and the additional actuator 38.

The slave or master electrical device 14 includes the additional base member 44, the additional movable member 46, and the additional actuator 48. The slave or master electrical device 14 includes the additional base member 44, the additional movable member 46, and the additional actuator 48.

The slave or master electrical device 16 includes the additional base member 54, the additional movable member 56, and the additional actuator 58. The slave or master electrical device 16 includes the additional base member 54, the additional movable member 56, and the additional actuator 58.

As seen in FIG. 3, in a case where the electrical device 12 acts as the master electrical device and the electrical devices 14 and 16 act as the slave electrical device, the master controller 12A is configured to transmit a first control signal CS1 to the different slave controller 14A and/or 16A of the different electrical device 14 and/or 16 of the system 10. The different slave controller 14A and/or 16A is configured to be operated in response to the first control signal CS1. The first control signal CS1 can also be referred to as a second control signal CS1 if each of the controllers 14A and 16A acts as the slave controller. The slave controller 14A and/or 16A is configured to be operated in response to the second control signal CS1 transmitted from the different master controller 12A of the different electrical device 12 of the system 10.

As seen in FIG. 4, in a case where the electrical device 14 acts as the master electrical device and the electrical devices 12 and 16 act as the slave electrical device, the master controller 14A is configured to transmit a first control signal CS2 to the different slave controller 12A and/or 16A of the different electrical device 12 and/or 16 of the system 10. The different slave controller 12A and/or 16A is configured to be operated in response to the first control signal CS2. The first control signal CS2 can also be referred to as a second control signal CS2 if each of the controllers 12A and 16A acts as the slave controller. The slave controller 12A and/or 16A is configured to be operated in response to the second control signal CS2 transmitted from the different master controller 14A of the different electrical device 14 of the system 10.

As seen in FIG. 5, in a case where the electrical device 16 acts as the master electrical device and the electrical devices 12 and 14 act as the slave electrical device, the master controller 16A is configured to transmit a first control signal CS3 to the different slave controller 12A and/or 14A of the different electrical device 12 and/or 14 of the system 10. The different slave controller 12A and/or 14A is configured to be operated in response to the first control signal CS3. The first control signal CS3 can also be referred to as a second control signal CS3 if each of the controllers 12A and 14A acts as the slave controller. The slave controller 12A and/or 14A is configured to be operated in response to the second control signal CS3 transmitted from the different master controller 16A of the different electrical device 16 of the system 10.

As seen in FIG. 3, in a case where the electrical device 12 acts as the master electrical device, the controller 12A is configured to be operated in response to the operating signal SG transmitted from the operating device 18. In the present embodiment, the controller 12A is configured to control the actuator 38 to move the movable member 36 in response to the first or second operating signal SG1 or SG2 transmitted from the first or second operating device 20 or 22 if the controller 12A acts as the master controller. For example, the controller 12A is configured to control the actuator 38 to move the movable member 36 in an upshifting direction in response to the first operating signal SG1 transmitted from the first operating device 20 if the controller 12A acts as the master controller. The controller 12A is configured to control the actuator 38 to move the movable member 36 in a downshifting direction in response to the second operating signal SG2 transmitted from the first operating device 20 if the controller 12A acts as the master controller.

The controller 12A is configured to transmit the first control signal CS1 to the different slave controller 14A and/or 16A in response to the operating signal SG transmitted from the operating device 18 if the controller 12A acts as the master controller. The controller 12A is configured to transmit the first control signal CS1 to the different slave controller 14A and/or 16A to control the additional actuator 48 and/or 58 of the different electrical device 14 and/or 16 if the controller 12A acts as the master controller.

The controller 14A is configured to be operated in response to the second control signal CS1 transmitted from the different master controller 12A without transmitting the first control signal CS2 to the different slave controller 12A and/or 16A if the controller 14A acts as the slave controller. The controller 14A is configured to control the actuator 48 in response to the second control signal CS1 transmitted from the different master controller 12A if the controller 14A acts as the slave controller. The actuator 48 is configured to move the movable member 46 relative to the base member 44 in response to the second control signal CS1.

The controller 16A is configured to be operated in response to the second control signal CS1 transmitted from the different master controller 12A without transmitting the first control signal CS3 to the different slave controller 12A and/or 14A if the controller 16A acts as the slave controller. The controller 16A is configured to control the actuator 48 in response to the second control signal CS1 transmitted from the different master controller 12A if the controller 16A acts as the slave controller. The actuator 58 is configured to move the movable member 56 relative to the base member 54 in response to the second control signal CS1.

In the present embodiment, the controller 12A is configured to transmit a first or second control signal CS12 to the different slave controller 14A in response to a substantially simultaneous input of the first and second operating signals SG1 and SG2 transmitted from the first and second operating devices 20 and 22 if the controller 12A acts as the master controller.

The controller 14A is configured to control the actuator 48 to move the movable member 46 in one of an upshifting direction and a downshifting direction in response to the second control signal CS12 if the controller 14A acts as the slave controller. For example, the controller 14A is configured to control the actuator 48 to move the movable member 46 in the upshifting direction in response to the second control signal CS12 in a state where the movable member 46 is in a low-gear position if the controller 14A acts as the slave controller. The controller 14A is configured to control the actuator 48 to move the movable member 46 in the downshifting direction in response to the second control signal CS12 in a state where the movable member 46 is in a low-gear position if the controller 14A acts as the master controller.

The controller 12A is configured to transmit a first or second control signal CS13 to the different slave controller 16A in response to the third operating signal SG3 transmitted from the third operating device 24 if the controller 12A acts as the master controller.

The controller 16A is configured to control the actuator 58 to move the movable member 56 in response to the second control signal CS13 if the controller 16A acts as the master controller. The controller 16A is configured to control the actuator 58 to keep the movable member 56 in a valve open position for a specific period of time after the controller 16A detects the second control signal CS13 if the controller 16A acts as the master controller. Thus, the electrical device 16 allows the user to change the position of the saddle 2B (see e.g., FIG. 1). The controller 16A can be configured to control the actuator 58 to keep the movable member 56 in the valve open position while the controller 16A detects the third operating signal SG3 if needed and/or desired.

As seen in FIG. 4, in a case where the electrical device 14 acts as the master electrical device, the controller 14A is configured to be operated in response to the operating signal SG transmitted from the operating device 18. In the present embodiment, the controller 14A is configured to control the actuator 48 to move the movable member 46 in response to a substantially simultaneous input of the first and second operating signals SG1 and SG2 transmitted from the first and second operating devices 20 and 22 if the controller 14A acts as the master controller. The controller 14A is configured to control the actuator 48 to move the movable member 46 in one of the upshifting direction and the downshifting direction in response to the substantially simultaneous input of the first and second operating signals SG1 and SG2 if the controller 14A acts as the master controller. For example, the controller 14A is configured to control the actuator 48 to move the movable member 46 in the upshifting direction in response to the substantially simultaneous input of the first and second operating signals SG1 and SG2 in the state where the movable member 46 is in the low-gear position if the controller 14A acts as the master controller. The controller 14A is configured to control the actuator 48 to move the movable member 46 in the downshifting direction in response to the substantially simultaneous input of the first and second operating signals SG1 and SG2 in the state where the movable member 46 is in the low-gear position if the controller 14A acts as the master controller.

The controller 14A is configured to transmit the first control signal CS2 to the different slave controller 12A and/or 16A in response to the operating signal SG transmitted from the operating device 18 if the controller 14A acts as the master controller. The controller 14A is configured to transmit the first control signal CS2 to the different slave controller 12A and/or 16A to control the additional actuator 38 and/or 58 of the different electrical device 12 and/or 16 if the controller 14A acts as the master controller.

The controller 12A is configured to be operated in response to the second control signal CS2 transmitted from the different master controller 14A without transmitting the first control signal CS1 to the different slave controller 14A and/or 16A if the controller 12A acts as the slave controller. The controller 12A is configured to control the actuator 38 in response to the second control signal CS2 transmitted from the different master controller 14A if the controller 12A acts as the slave controller. The actuator 38 is configured to move the movable member 36 relative to the base member 34 in response to the second control signal CS2.

The controller 16A is configured to be operated in response to the second control signal CS2 transmitted from the different master controller 14A without transmitting a first control signal CS3 to the different slave controller 12A and/or 14A if the controller 16A acts as the slave controller. The controller 16A is configured to control the actuator 58 in response to the second control signal CS2 transmitted from the different master controller 14A if the controller 16A acts as the slave controller. The actuator 58 is configured to move the movable member 56 relative to the base member 54 in response to the second control signal CS2.

In the present embodiment, the controller 14A is configured to transmit a first or second control signal CS21U to the different slave controller 12A in response to the first operating signal SG1 transmitted from the first operating device 20 if the controller 14A acts as the master controller. The controller 14A is configured to transmit a first or second control signal CS21D to the different slave controller 12A in response to the second operating signal SG2 transmitted from the second operating device 22 if the controller 14A acts as the master controller.

The controller 12A is configured to control the actuator 38 to move the movable member 36 in response to the second control signal CS21U or CS21D if the electrical device 12 acts as the slave electrical device. For example, the controller 12A is configured to control the actuator 38 to move the movable member 36 in the upshifting direction in response to the second control signal CS21U if the electrical device 12 acts as the slave electrical device. The controller 12A is configured to control the actuator 38 to move the movable member 36 in the downshifting direction in response to the second control signal CS21D if the electrical device 12 acts as the slave electrical device.

The controller 14A is configured to transmit a first or second control signal CS23 to the different slave controller 16A in response to the third operating signal SG3 transmitted from the third operating device 24 if the controller 14A acts as the master controller.

The controller 16A is configured to control the actuator 58 to move the movable member 56 in response to the second control signal CS23 if the electrical device 16 acts as the slave electrical device. The controller 16A is configured to control the actuator 58 to keep the movable member 56 in a valve open position for a specific period of time after the controller 16A detects the second control signal CS23 if the electrical device 16 acts as the slave electrical device. Thus, the electrical device 16 allows the user to change the position of the saddle 2B (see e.g., FIG. 1). The controller 16A can be configured to control the actuator 58 to keep the movable member 56 in the valve open position while the controller 16A detects the second control signal CS23 if needed and/or desired.

As seen in FIG. 5, in a case where the electrical device 16 acts as the master electrical device, the controller 16A is configured to be operated in response to the operating signal SG transmitted from the operating device 18. In the present embodiment, the controller 16A is configured to control the actuator 58 to move the movable member 56 in response to the third operating signal SG3 transmitted from the third operating device 24 if the controller 16A acts as the master controller. The controller 16A is configured to control the actuator 58 to keep the movable member 56 in a valve open position for a specific period of time after the controller 16A detects the third operating signal SG3 if the controller 16A acts as the master controller. Thus, the electrical device 16 allows the user to change the position of the saddle 2B (see e.g., FIG. 1). The controller 16A can be configured to control the actuator 58 to keep the movable member 56 in the valve open position while the controller 16A detects the third operating signal SG3 if needed and/or desired.

The controller 16A is configured to transmit the first control signal CS3 to the different slave controller 12A and/or 14A in response to the operating signal SG transmitted from the operating device 18 if the controller 14A acts as the master controller. The controller 16A is configured to transmit the first control signal CS3 to the different slave controller 12A and/or 14A to control the additional actuator 38 and/or 48 of the different electrical device 12 and/or 14 if the controller 16A acts as the master controller.

The controller 12A is configured to be operated in response to the second control signal CS3 transmitted from the different master controller 16A without transmitting the first control signal CS1 to the different slave controller 14A or 16A if the controller 12A acts as the slave controller. The controller 12A is configured to control the actuator 38 in response to the second control signal CS3 transmitted from the different master controller 16A if the controller 12A acts as the slave controller. The actuator 38 is configured to move the movable member 36 relative to the base member 34 in response to the second control signal CS3.

The controller 14A is configured to be operated in response to the second control signal CS3 transmitted from the different master controller 16A without transmitting the first control signal CS2 to the different slave controller 12A or 16A if the controller 14A acts as the slave controller. The controller 14A is configured to control the actuator 48 in response to the second control signal CS3 transmitted from the different master controller 16A if the controller 14A acts as the slave controller. The actuator 48 is configured to move the movable member 46 relative to the base member 44 in response to the second control signal CS3.

In the present embodiment, the controller 16A is configured to transmit a first or second control signal CS31U to the different slave controller 12A in response to the first operating signal SG1 transmitted from the first operating device 20 if the controller 16A acts as the master controller. The controller 16A is configured to transmit a first or second control signal CS31D to the different slave controller 12A in response to the second operating signal SG2 transmitted from the second operating device 22 if the controller 16A acts as the master controller.

The controller 12A is configured to control the actuator 38 to move the movable member 36 in response to the second control signal CS31U or CS31D if the controller 12A acts as the slave controller. For example, the controller 12A is configured to control the actuator 38 to move the movable member 36 in the upshifting direction in response to the second control signal CS31U if the controller 12A acts as the slave controller. The controller 12A is configured to control the actuator 38 to move the movable member 36 in the downshifting direction in response to the second control signal CS31D if the controller 12A acts as the slave controller.

The controller 16A is configured to transmit a first or second control signal CS32 to the different slave controller 14A in response to the substantially simultaneous input of the first and second operating signals SG1 and SG2 transmitted from the first and second operating devices 20 and 22 if the controller 16A acts as the master controller.

The controller 14A is configured to control the actuator 48 to move the movable member 46 in one of an upshifting direction and a downshifting direction in response to the second control signal CS32 if the controller 14A acts as the slave controller. For example, the controller 14A is configured to control the actuator 48 to move the movable member 46 in the upshifting direction in response to the second control signal CS32 in the state where the movable member 46 is in the low-gear position if the controller 14A acts as the slave controller. The controller 14A is configured to control the actuator 48 to move the movable member 46 in the downshifting direction in response to the second control signal CS32 in the state where the movable member 46 is in the low-gear position if the controller 14A acts as the master controller.

As seen in FIGS. 3 to 5, the controller 12A is configured to selectively act, based on the reference information relating to the system 10, as each of the master controller and the slave controller. The controller 14A is configured to selectively act, based on the reference information relating to the system 10, as each of the master controller and the slave controller. The controller 16A is configured to selectively act, based on the reference information relating to the system 10, as each of the master controller and the slave controller.

The reference information includes at least one of a hardware configuration of the system 10, a state of the hardware configuration of the system 10, and an input transmitted from the external device ED. The hardware configuration includes information relating to whether the different master controller is in the system 10. The hardware configuration includes information indicating which of the electrical devices 12, 14, and 16 is the master electrical device and/or which of the electrical devices 12, 14, and 16 is the slave electrical device. The state of the hardware configuration includes a state of the different master controller. The state of the hardware configuration includes information indicating whether the different master controller is in an abnormal state. The input transmitted from the external device ED includes an external user input EU received by the external device ED. The input includes the external user input EU received by the external device ED via application software installed in the external device ED.

As seen in FIG. 3, the external device ED includes an external controller ED1, a user interface ED2, and a display ED3. The user interface ED2 is configured to receive the external user input EU. The user interface ED2 includes a touch screen ED4 provided on the display ED3. The user interface ED2 and the display ED3 are electrically connected to the external controller ED1.

The external controller ED1 includes a processor 60P, a memory 60M, a circuit board 60B, and a system bus 60D. The processor 60P and the memory 60M are electrically mounted on the circuit board 60B. The processor 60P includes a CPU and a memory controller. The memory 60M is electrically connected to the processor 60P. The memory 60M includes a ROM and a RAM. The memory 60M includes storage areas each having an address in the ROM and the RAM. The processor 60P is configured to control the memory 60M to store data in the storage areas of the memory 60M and reads data from the storage areas of the memory 60M. The memory 60M (e.g., the ROM) stores at least one program. The at least one program is read into the processor 60P, and thereby algorithm of the controller ED1 is executed based on the at least one program. For example, the controller ED1 is configured to act as a master controller and to act as a slave controller based on the at least one program. The external controller ED1 can also be referred to as an external control circuit or circuitry ED1.

The external controller ED1 includes a communicator 60C. The communicator 60C is configured to communicate with at least one of the communicators 12C, 14C, 16C, 20C, 22C, and 24C. In the present embodiment, the communicator 60C includes a wireless communicator 60W. The wireless communicator 60W is configured to communicate with at least one of the wireless communicators 12W, 14W, 16W, 20W, 22W, and 24W via a wireless communication channel.

The external controller ED1 has a pairing mode in which the external controller ED1 executes pairing between the external controller ED1 and another controller. The external controller ED1 is configured to wirelessly transmit a pairing signal PS60 in the pairing mode. The pairing signal PS60 includes identifying information indicating the external controller ED1.

For example, the pairing signal PS60 includes an advertising signal PS60A and a scanning response signal PS60C. The controller 60A is configured to wirelessly transmit the advertising signal PS60A to notice existence of the electrical device 60 to the other controller. The advertising signal PS60A of the controller 60A includes the identifying information such as a MAC address of the electrical device 60. The controller 60A is configured to wirelessly transmit the scanning response signal PS60C to respond a scanning request signal such as the scanning request signal PS12B, PS14B, or PS16B transmitted from another controller such as the controller 12A, 14A, or 16A. The scanning response signal PS60C of the controller 60A includes additional identifying information of the electrical device 60. The pairing signal PS60 of the controller 60A is not limited to the above signals.

The external device ED is configured to display the hardware configuration of the system 10 on the display ED3. The external device ED is configured to display that the master electrical device and the slave electrical device in the system 10. The external device ED is configured to allow the user to select the master electrical device and/or the slave electrical device.

As seen in FIGS. 4 and 5, the controller 12A is configured to act as the slave controller if the reference information indicates that the system 10 includes the different master controller 14A or 16A. The controller 12A is configured to act as the master controller if the reference information indicates that the system 10 does not include the different master controller 14A or 16A. The controller 12A is configured to detect, as the reference information, whether the system 10 includes the different master controller 14A or 16A or not. In the present embodiment, the controller 12A is configured to act as the slave controller if the controller 12A detects the different master controller 14A or 16A. The controller 12A is configured to act as the master controller if the controller 12A does not detect the different master controller 14A or 16A.

As seen in FIGS. 3 and 5, the controller 14A is configured to act as the slave controller if the reference information indicates that the system 10 includes the different master controller 12A or 16A. The controller 14A is configured to act as the master controller if the reference information indicates that the system 10 does not include the different master controller 12A or 16A. The controller 14A is configured to detect, as the reference information, whether the system 10 includes the different master controller 12A or 16A or not. In the present embodiment, the controller 14A is configured to act as the slave controller if the controller 14A detects the different master controller 12A or 16A. The controller 14A is configured to act as the master controller if the controller 14A does not detect the different master controller 12A or 16A.

As seen in FIGS. 3 and 4, the controller 16A is configured to act as the slave controller if the reference information indicates that the system 10 includes the different master controller 12A or 14A. The controller 16A is configured to act as the master controller if the reference information indicates that the system 10 does not include the different master controller 12A or 14A. The controller 16A is configured to detect, as the reference information, whether the system 10 includes the different master controller 12A or 14A or not. In the present embodiment, the controller 16A is configured to act as the slave controller if the controller 16A detects the different master controller 12A or 14A. The controller 16A is configured to act as the master controller if the controller 16A does not detect the different master controller 12A or 14A.

As seen in FIG. 2, the controller 12A is configured to communicate with at least one of the different slave controller 14A and/or 16A and the different master controller 14A and/or 16A via a wireless communication channel. The controller 14A is configured to communicate with at least one of the different slave controller 12A and/or 16A and the different master controller 12A and/or 16A via a wireless communication channel. The controller 16A is configured to communicate with at least one of the different slave controller 12A and/or 14A and the different master controller 12A and/or 14A via a wireless communication channel.

As seen in FIG. 3, in a case where the electrical device 12 acts as the master electrical device and the electrical devices 14 and 16 act as the slave electrical device, the controller 12A is configured to communicate with each of the different slave controllers 14A and 16A via the wireless communication channel. The controller 14A is configured to communicate with the different master controller 12A via the wireless communication channel. The controller 16A is configured to communicate with the different master controller 12A via the wireless communication channel.

As seen in FIG. 4, in a case where the electrical device 14 acts as the master electrical device and the electrical devices 12 and 16 act as the slave electrical device, the controller 14A is configured to communicate with each of the different slave controllers 12A and 16A via the wireless communication channel. The controller 12A is configured to communicate with the different master controller 14A via the wireless communication channel. The controller 16A is configured to communicate with the different master controller 14A via the wireless communication channel.

As seen in FIG. 5, in a case where the electrical device 16 acts as the master electrical device and the electrical devices 12 and 14 act as the slave electrical device, the controller 16A is configured to communicate with each of the different slave controllers 12A and 14A via the wireless communication channel. The controller 12A is configured to communicate with the different master controller 16A via the wireless communication channel. The controller 14A is configured to communicate with the different master controller 16A via the wireless communication channel.

As seen in FIGS. 3 to 5, one of the electrical devices 12, 14, and 16 is configured to act as the master controller and remaining electrical devices of the electrical devices 12, 14, and 16 is configured to act as the slave controller if the one of the electrical devices 12, 14, and 16 enters the pairing mode before the remaining electrical devices of the electrical devices 12, 14, and 16 enters the pairing mode. Thus, the reference information includes information indicating, as the hardware configuration of the system 10, which of the electrical devices 12, 14, and 16 is the master electrical device. The reference information includes the master signals MS12, MS14, and MS16 as information indicating the hardware configuration of the system 10.

As seen in FIG. 3, the controller 12A is configured to determine whether another controller such as the controller 14A or 16A wirelessly transmits a master signal such as the master signal MS14 or MS16 during a master determination time MT12 (see e.g., FIG. 6) after the controller 12A enters the pairing mode. The controller 12A is configured to detect a master signal such as the master signal MS14 or MS16 during the master determination time MT12 (see e.g., FIG. 6) after the controller 12A enters the pairing mode.

The controller 12A is configured to act as the master controller if the controller 12A does not detect the master signals MS14 and MS16 during the master determination time MT12 (see e.g., FIG. 6) in the pairing mode. If the controller 12A does not detect the master signals MS14 and MS16 during the master determination time MT12 (see e.g., FIG. 6), the controller 12A is configured to wirelessly transmit the master signal MS12 after an elapse of the master determination time MT12 (see e.g., FIG. 6). The controller 12A is configured to stop transmitting the master signal MS12 if the controller 12A completes the pairing mode.

As seen in FIGS. 4 and 5, the controller 12A is configured to act as the slave controller if the controller 12A detects the master signal MS14 or MS16 transmitted from the different master controller 14A or 16A in the pairing mode. The controller 12A is configured to act as the slave controller if the controller 12A detects the master signal MS14 or MS16 transmitted from the different master controller 14A or 16A during the master determination time MT12 (see e.g., FIGS. 7 and 8) after the controller 12A enters the pairing mode. The controller 12A is configured to identify the controller 14A or 16A as the master controller if the controller 12A detects the master signal MS14 or MS16 during the master determination time MT12 (see e.g., FIGS. 7 and 8). The controller 12A is configured not to wirelessly transmit the master signal MS12 if the controller 12A detects the master signal MS14 or MS16 during the master determination time MT12 (see e.g., FIGS. 7 and 8).

The controller 12A is configured to store the identifying information included in the master signal MS14 or MS16 if the controller 12A detects the master signal MS14 or MS16. The controller 12A is configured to identify the controller 14A or 16A as the slave controller based on the identifying information included in the master signal MS14 or MS16 if the controller 12A detects the master signal MS14 or MS16 after the elapse of the master determination time MT12 (see e.g., FIGS. 7 and 8) in the pairing mode.

The controller 12A is configured to wirelessly transmit a master response signal MS12R at regular intervals if the controller 12A detects the master signal MS14 or MS16 during the slave determination time after the controller 12A detects the master signal MS14 or MS16. The master response signal MS12R includes the identifying information of the electrical device 12 and additional information indicating that the electrical device 12 acts as the slave electrical device.

As seen in FIG. 4, the controller 14A is configured to determine whether another controller such as the controller 12A or 16A wirelessly transmits a master signal such as the master signal MS12 or MS16 during a master determination time MT14 (see e.g., FIG. 7) after the controller 14A enters the pairing mode. The controller 14A is configured to detect a master signal such as the master signal MS12 or MS16 during the master determination time MT14 (see e.g., FIG. 7) after the controller 14A enters the pairing mode.

The controller 14A is configured to act as the master controller if the controller 14A does not detect the master signals MS12 and MS16 during the master determination time MT14 (see e.g., FIG. 7) in the pairing mode. If the controller 14A does not detect the master signals MS12 and MS16 during the master determination time MT14 (see e.g., FIG. 7), the controller 14A is configured to wirelessly transmit the master signal MS14 after an elapse of the master determination time MT14 (see e.g., FIG. 7). The controller 14A is configured to stop transmitting the master signal MS14 if the controller 14A completes the pairing mode.

As seen in FIGS. 3 and 5, the controller 14A is configured to act as the slave controller if the controller 14A detects the master signal MS12 or MS16 transmitted from the different master controller 12A or 16A in the pairing mode. The controller 14A is configured to act as the slave controller if the controller 14A detects the master signal MS12 or MS16 transmitted from the different master controller 12A or 16A during the master determination time MT14 (see e.g., FIGS. 6 and 8) after the controller 14A enters the pairing mode. The controller 14A is configured to identify the controller 12A or 16A as the master controller if the controller 14A detects the master signal MS12 or MS16 during the master determination time MT14 (see e.g., FIGS. 6 and 8). The controller 14A is configured not to wirelessly transmit the master signal MS14 if the controller 14A detects the master signal MS12 or MS16 during the master determination time MT14 (see e.g., FIGS. 6 and 8).

The controller 14A is configured to store the identifying information included in the master signal MS12 or MS16 if the controller 14A detects the master signal MS12 or MS16. The controller 14A is configured to identify the controller 12A or 16A as the slave controller based on the identifying information included in the master signal MS12 or MS16 if the controller 14A detects the master signal MS12 or MS16 after the elapse of the master determination time MT14 (see e.g., FIGS. 6 and 8) in the pairing mode.

The controller 14A is configured to wirelessly transmit a master response signal MS14R at regular intervals if the controller 14A detects the master signal MS12 or MS16 during the slave determination time after the controller 14A detects the master signal MS12 or MS16. The master response signal MS14R includes the identifying information of the electrical device 14 and additional information indicating that the electrical device 14 acts as the slave electrical device.

As seen in FIG. 5, the controller 16A is configured to determine whether another controller such as the controller 12A or 14A wirelessly transmits a master signal such as the master signal MS12 or MS14 during a master determination time MT16 (see e.g., FIG. 8) after the controller 16A enters the pairing mode. The controller 16A is configured to detect a master signal such as the master signal MS12 or MS14 during the master determination time MT16 (see e.g., FIG. 8) after the controller 16A enters the pairing mode.

The controller 16A is configured to act as the master controller if the controller 16A does not detect the master signals MS12 and MS14 during the master determination time MT16 (see e.g., FIG. 8) in the pairing mode. If the controller 16A does not detect the master signals MS12 and MS14 during the master determination time MT16 (see e.g., FIG. 8), the controller 16A is configured to wirelessly transmit the master signal MS16 after an elapse of the master determination time MT16 (see e.g., FIG. 8). The controller 16A is configured to stop transmitting the master signal MS16 if the controller 16A completes the pairing mode.

As seen in FIGS. 3 and 4, the controller 16A is configured to act as the slave controller if the controller 16A detects the master signal MS12 or MS14 transmitted from the different master controller 12A or 14A in the pairing mode. The controller 16A is configured to act as the slave controller if the controller 16A detects the master signal MS12 or MS14 transmitted from the different master controller 12A or 14A during the master determination time MT16 (see e.g., FIGS. 6 and 7) after the controller 16A enters the pairing mode. The controller 16A is configured to identify the controller 12A or 14A as the master controller if the controller 16A detects the master signal MS12 or MS14 during the master determination time MT16 (see e.g., FIGS. 6 and 7). The controller 16A is configured not to wirelessly transmit the master signal MS16 if the controller 16A detects the master signal MS12 or MS14 during the master determination time MT16 (see e.g., FIGS. 6 and 7).

The controller 16A is configured to store the identifying information included in the master signal MS12 or MS14 if the controller 16A detects the master signal MS12 or MS14. The controller 16A is configured to identify the controller 12A or 14A as the slave controller based on the identifying information included in the master signal MS12 or MS14 if the controller 16A detects the master signal MS12 or MS14 after the elapse of the master determination time MT16 (see e.g., FIGS. 6 and 7) in the pairing mode.

The controller 16A is configured to wirelessly transmit a master response signal MS16R at regular intervals if the controller 16A detects the master signal MS12 or MS14 during the slave determination time after the controller 16A detects the master signal MS12 or MS14. The master response signal MS16R includes the identifying information of the electrical device 16 and additional information indicating that the electrical device 16 acts as the slave electrical device.

As seen in FIG. 3, if the controller 12A acts as the master controller, the controller 12A is configured to determine whether another controller such as the controller 14A, 16A, 20A, 22A, or 24A wirelessly transmits a pairing signal such as the pairing signal PS14, PS16, PS20, PS22, or PS24 in the pairing mode. The controller 12A is configured to scan a pairing signal such as the pairing signal PS14, PS16, PS20, PS22, or PS24 in the pairing mode. More specifically, the controller 12A is configured to scan the advertising signal PS14A, PS16A, PS20A, PS22A, and/or PS24A in the pairing mode. The controller 12A is configured to wirelessly transmit the scanning request signal PS12B to the controller 14A, 16A, 20A, 22A, and/or 24A in response to the advertising signal PS14A, PS16A, PS20A, PS22A, and/or PS24A.

As seen in FIGS. 4 and 5, if the controller 12A acts as the slave controller, the controller 12A is configured to wirelessly transmit the pairing signal PS12 in the pairing mode. The controller 12A is configured to wirelessly transmit the advertising signal PS12A at regular intervals in the pairing mode. The controller 12A is configured to scan a scanning request signal such as the scanning request signal PS14B, PS16B, PS20B, PS22B, or PS24B while transmitting the advertising signal PS12A. The controller 12A is configured to wirelessly transmit the scanning response signal PS12C if the controller 12A detects the scanning request signal PS14B, PS16B, PS20B, PS22B, and/or PS24B. Thus, the controller 12A is configured to exchange identifying information between the controller 12A and at least one of the controllers 14A, 16A, 20A, 22A, and/or 24A.

As seen in FIG. 4, if the controller 14A acts as the master controller, the controller 14A is configured to determine whether another controller such as the controller 12A, 16A, 20A, 22A, or 24A wirelessly transmits a pairing signal such as the pairing signal PS12, PS16, PS20, PS22, or PS24 in the pairing mode. The controller 14A is configured to scan a pairing signal such as the pairing signal PS12, PS16, PS20, PS22, or PS24 in the pairing mode. More specifically, the controller 14A is configured to scan the advertising signal PS12A, PS16A, PS20A, PS22A, and/or PS24A in the pairing mode. The controller 14A is configured to wirelessly transmit the scanning request signal PS14B to the controller 12A, 16A, 20A, 22A, and/or 24A in response to the advertising signal PS12A, PS16A, PS20A, PS22A, and/or PS24A.

As seen in FIGS. 3 and 5, if the controller 14A acts as the slave controller, the controller 14A is configured to wirelessly transmit the pairing signal PS14 in the pairing mode. The controller 14A is configured to wirelessly transmit the advertising signal PS14A at regular intervals in the pairing mode. The controller 14A is configured to scan a scanning request signal such as the scanning request signal PS12B, PS16B, PS20B, PS22B, or PS24B while transmitting the advertising signal PS14A. The controller 14A is configured to wirelessly transmit the scanning response signal PS14C if the controller 14A detects the scanning request signal PS12B, PS16B, PS20B, PS22B, and/or PS24B. Thus, the controller 14A is configured to exchange identifying information between the controller 14A and at least one of the controllers 12A, 16A, 20A, 22A, and/or 24A.

As seen in FIG. 5, if the controller 16A acts as the master controller, the controller 16A is configured to determine whether another controller such as the controller 12A, 14A, 20A, 22A, or 24A wirelessly transmits a pairing signal such as the pairing signal PS12, PS14, PS20, PS22, or PS24 in the pairing mode. The controller 16A is configured to scan a pairing signal such as the pairing signal PS12, PS14, PS20, PS22, or PS24 in the pairing mode. More specifically, the controller 16A is configured to scan the advertising signal PS12A, PS14A, PS20A, PS22A, and/or PS24A in the pairing mode. The controller 16A is configured to wirelessly transmit the scanning request signal PS16B to the controller 12A, 14A, 20A, 22A, and/or 24A in response to the advertising signal PS12A, PS14A, PS20A, PS22A, and/or PS24A.

As seen in FIGS. 3 and 4, if the controller 16A acts as the slave controller, the controller 16A is configured to wirelessly transmit the pairing signal PS16 in the pairing mode. The controller 16A is configured to wirelessly transmit the advertising signal PS16A at regular intervals in the pairing mode. The controller 16A is configured to scan a scanning request signal such as the scanning request signal PS12B, PS14B, PS20B, PS22B, or PS24B while transmitting the advertising signal PS16A. The controller 16A is configured to wirelessly transmit the scanning response signal PS16C if the controller 16A detects the scanning request signal PS12B, PS14B, PS20B, PS22B, and/or PS24B. Thus, the controller 16A is configured to exchange identifying information between the controller 16A and at least one of the controllers 12A, 14A, 20A, 22A, and/or 24A.

As seen in FIGS. 3 to 5, the controller 20A is configured to wirelessly transmit the pairing signal PS20 in the pairing mode. The controller 20A is configured to wirelessly transmit the advertising signal PS20A at regular intervals in the pairing mode. The controller 20A is configured to scan a scanning request signal such as the scanning request signal PS12B, PS14B, and PS16B while transmitting the advertising signal PS20A. The controller 20A is configured to wirelessly transmit the scanning response signal PS20C if the controller 20A detects the scanning request signal PS12B, PS14B, or PS16B. Thus, the controller 20A is configured to exchange identifying information between the controller 20A and one of one of the controllers 12A, 14A, and 16A.

As seen in FIGS. 3 to 5, the controller 22A is configured to wirelessly transmit the pairing signal PS22 in the pairing mode. The controller 22A is configured to wirelessly transmit the advertising signal PS22A at regular intervals in the pairing mode. The controller 22A is configured to scan a scanning request signal such as the scanning request signal PS12B, PS14B, and PS16B while transmitting the advertising signal PS22A. The controller 22A is configured to wirelessly transmit the scanning response signal PS22C if the controller 22A detects the scanning request signal PS12B, PS14B, or PS16B. Thus, the controller 22A is configured to exchange identifying information between the controller 22A and one of one of the controllers 12A, 14A, and 16A.

As seen in FIGS. 3 to 5, the controller 24A is configured to wirelessly transmit the pairing signal PS24 in the pairing mode. The controller 24A is configured to wirelessly transmit the advertising signal PS24A at regular intervals in the pairing mode. The controller 24A is configured to scan a scanning request signal such as the scanning request signal PS12B, PS14B, and PS16B while transmitting the advertising signal PS24A. The controller 24A is configured to wirelessly transmit the scanning response signal PS24C if the controller 24A detects the scanning request signal PS12B, PS14B, or PS16B. Thus, the controller 24A is configured to exchange identifying information between the controller 24A and one of one of the controllers 12A, 14A, and 16A.

Figure 6:
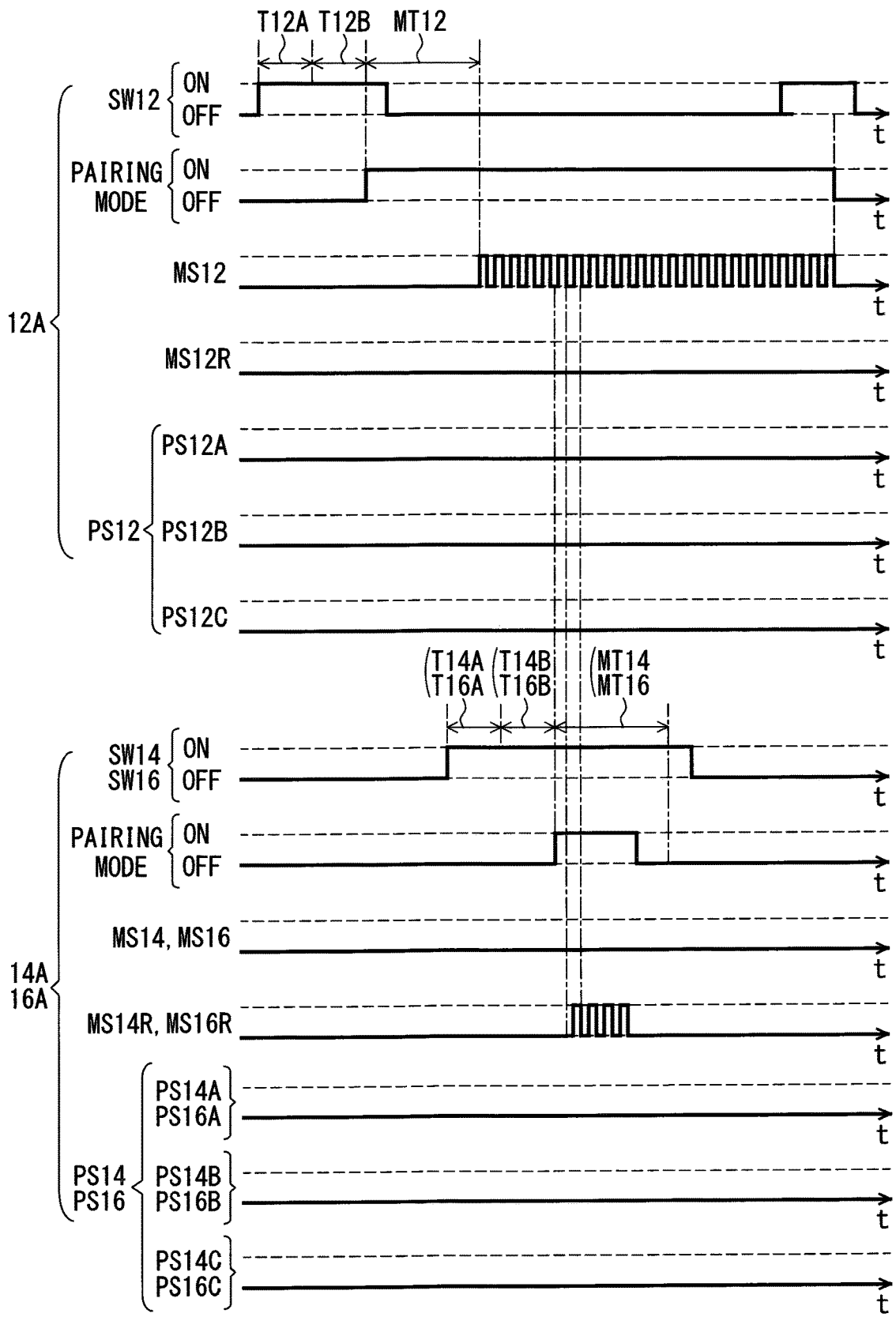
FIG. 6 is a timing chart of a pairing mode of the system illustrated in FIG. 3 among the electrical devices.

FIG. 6 shows a timing chart of pairing executed between the electrical device 12 and each of the electrical devices 14 and 16 in a case where the electrical device 12 acts as the master electrical device and the electrical devices 14 and 16 act as the slave electrical device.

As seen in FIG. 6, if the user selects the electrical device 12 as the master electrical device, the user first turns on the electrical device 12 among the electrical devices 12, 14, and 16. The controller 12A is turned on and enters the pairing mode in response to the user input U12 received by the user interface 12U. Specifically, the controller 12A is turned on and enters the pairing mode in response to a long press of the switch SW12. The controller 12A is turned on if the user keeps pressing the switch SW12 for a first long-press determination time T12A. The informing unit 12F lights if the user keeps pressing the switch SW12 for the first long-press determination time T12A. The controller 12A enters the pairing mode if the user further keeps pressing the switch SW12 for a second long-press determination time T12B after the controller 12A is turned on. When the controller 12A enters the pairing mode, the informing unit 12F blinks at several times and is turned off. The user keeps pressing the switch SW12 until the informing unit 12F finishes lighting and blinking. The user stops pressing the switch SW12 when the user acknowledges the lighting and the blinking of the informing unit 12F since the lighting and the blinking of the informing unit 12F indicates that the controller 12A enters the pairing mode.

The controller 14A is configured to act as the master controller if the reference information indicates that the system 10 does not include the different master controller. Specifically, the controller 12A starts to scan a master signal such as the master signal MS14 or MS16 during the master determination time MT12 after entering the pairing mode. The controller 12A does not detect the master signal MS14 or MS16 during the master determination time MT12 since the electrical devices 14 and 16 are not turned on at this stage. The scanning result indicating that the controller 12A does not detect the master signal MS14 or MS16 for the master determination time MT12 indicates that the system 10 does not include the different master controller. Thus, the electrical device 12 starts to act as the master electrical device, and the controller 12A starts to act as the master controller, if the controller 12A does not detect the master signal MS14 or MS16 during the master determination time MT12.

After the controller 12A starts to act as the master controller, the controller 12A starts to wirelessly transmit, at regular intervals, the master signal MS12 indicating that the electrical device 12 acts as the master electrical device. The controller 12A starts to scan a master response signal such as the master response signal MS14R or MS16R. Furthermore, the controller 12A starts to scan a pairing signal such as the pairing signal PS20, PS22, or PS22 (e.g., an advertising signal such as the advertising signal PS20A, PS22A, or PS22A). The controller 12A completes the pairing mode if the user presses the switch SW12 again.

After the user turns on the electrical device 12, the user turns on another device such as the electrical devices 14 and 16, the first operating device 20, the second operating device 22, and the third operating device 24. The electrical devices 14 and 16 act as the slave electrical device since the electrical device 12 acts as the master electrical device. The first operating device 20, the second operating device 22, and the third operating device 24 act as only the slave electrical device.

The controller 14A is turned on and enters the pairing mode in response to the user input U14 received by the user interface 14U. Specifically, the controller 14A is turned on and enters the pairing mode in response to a long press of the switch SW14. The controller 14A is turned on if the user keeps pressing the switch SW14 for a first long-press determination time T14A. The informing unit 14F lights if the user keeps pressing the switch SW14 for the first long-press determination time T14A. The controller 14A enters the pairing mode if the user further keeps pressing the switch SW14 for a second long-press determination time T14B after the controller 14A is turned on. When the controller 14A enters the pairing mode, the informing unit 14F blinks at several times and is turned off. The user keeps pressing the switch SW14 until the informing unit 14F finishes lighting and blinking. The user stops pressing the switch SW14 when the user acknowledges the lighting and the blinking of the informing unit 14F since the lighting and the blinking of the informing unit 14F indicates that the controller 14A enters the pairing mode.

The controller 14A is configured to act as the slave controller if the reference information indicates that the system 10 includes the different master controller. Specifically, the controller 14A starts to scan a master signal such as the master signal MS12 or MS16 during the master determination time MT14 after entering the pairing mode. The controller 14A detects the master signal MS12 within the master determination time MT14 since the electrical device 12 has entered the pairing mode and has started to wirelessly transmit the master signal MS12 before the electrical device 14 is turned on. The scanning result indicating that the controller 14A detects the master signal MS12 for the master determination time MT14 indicates that the system 10 includes the different master controller. Thus, if the controller 14A detects the master signal MS12, the electrical device 14 starts to act as the slave electrical device, and the controller 12A starts to act as the slave controller. The controller 14A stores the identifying information of the electrical device 12 included in the master signal MS12 and recognizes the electrical device 12 as the master electrical device. The controller 14A does not wirelessly transmit the master signal MS14 after the elapse of the master determination time MT14 if the controller 14A detects the master signal MS12 during the master determination time MT14.

In response to detection of the master signal MS12, the controller 14A wirelessly transmits the master response signal MS14R including the identifying information of the electrical device 14. The controller 12A detects the master response signal MS14R transmitted from the controller 14A. The controller 12A stores the identifying information of the electrical device 14 included in the master signal MS14 and recognizes the electrical device 14 as the slave electrical device. The identifying information is exchanged between the electrical devices 12 and 14 using the master signal MS12 and the master response signal MS14R. Thus, the controller 12A does not use the pairing signal PS12 (the advertising signal PS12A, the pairing request signal PS12B, and the pairing response signal PS12C) to establish a secured wireless communication between the controllers 12A and 14A. The controller 14A does not use the pairing signal PS14 (the advertising signal PS14A, the pairing request signal PS14B, and the pairing response signal PS14C) to establish a secured wireless communication between the controllers 12A and 14A. However, the controller 12A can be configured to be use the pairing signal PS12 to establish a secured wireless communication between the controller 12A and another controller if needed and/or desired. The controller 14A can be configured to be use the pairing signal PS14 to establish a secured wireless communication between the controller 14A and another controller if needed and/or desired. The controller 14A completes the pairing mode after the controller 14A wirelessly transmits the master response signal MS14R.

When the controller 14A completes the pairing mode, the informing unit 14F blinks at several times and is turned off. The user keeps pressing the switch SW14 until the informing unit 14F finishes lighting and blinking. The user stops pressing the switch SW14 when the user acknowledges the lighting and the blinking of the informing unit 14F since the lighting and the blinking of the informing unit 14F indicates that the controller 14A completes the pairing mode.

The controller 16A is turned on and enters the pairing mode in response to the user input U16 received by the user interface 16U. Specifically, the controller 16A is turned on and enters the pairing mode in response to a long press of the switch SW16. The controller 16A is turned on if the user keeps pressing the switch SW16 for a first long-press determination time T16A. The informing unit 16F lights if the user keeps pressing the switch SW16 for the first long-press determination time T16A. The controller 16A enters the pairing mode if the user further keeps pressing the switch SW16 for a second long-press determination time T16B after the controller 16A is turned on. When the controller 16A enters the pairing mode, the informing unit 16F blinks at several times and is turned off. The user keeps pressing the switch SW16 until the informing unit 16F finishes lighting and blinking. The user stops pressing the switch SW16 when the user acknowledges the lighting and the blinking of the informing unit 16F since the lighting and the blinking of the informing unit 16F indicates that the controller 16A enters the pairing mode.

The controller 16A is configured to act as the slave controller if the reference information indicates that the system 10 includes the different master controller. Specifically, the controller 16A starts to scan a master signal such as the master signal MS12 or MS14 during the master determination time MT16 after entering the pairing mode. The controller 16A detects the master signal MS12 within the master determination time MT16 since the electrical device 12 has entered the pairing mode and has started to wirelessly transmit the master signal MS12 before the electrical device 16 is turned on. The scanning result indicating that the controller 16A detects the master signal MS12 for the master determination time MT16 indicates that the system 10 includes the different master controller. Thus, if the controller 16A detects the master signal MS12, the electrical device 16 starts to act as the slave electrical device, and the controller 12A starts to act as the slave controller. The controller 16A stores the identifying information of the electrical device 12 included in the master signal MS12 and recognizes the electrical device 12 as the master electrical device. The controller 16A does not wirelessly transmit the master signal MS16 after the elapse of the master determination time MT16 if the controller 16A detects the master signal MS12 during the master determination time MT16.

In response to detection of the master signal MS12, the controller 16A wirelessly transmits the master response signal MS16R including the identifying information of the electrical device 16. The controller 12A detects the master response signal MS16R transmitted from the controller 16A. The controller 12A stores the identifying information of the electrical device 16 included in the master signal MS16 and recognizes the electrical device 16 as the slave electrical device. The identifying information is exchanged between the electrical devices 12 and 16 using the master signal MS12 and the master response signal MS16R. Thus, the controller 12A does not use the pairing signal PS12 (the advertising signal PS12A, the pairing request signal PS12B, and the pairing response signal PS12C) to establish a secured wireless communication between the controllers 12A and 16A. The controller 16A does not use the pairing signal PS16 (the advertising signal PS16A, the pairing request signal PS16B, and the pairing response signal PS16C) to establish a secured wireless communication between the controllers 12A and 16A. However, the controller 12A can be configured to be use the pairing signal PS12 to establish a secured wireless communication between the controller 12A and another controller if needed and/or desired. The controller 16A can be configured to be use the pairing signal PS16 to establish a secured wireless communication between the controller 16A and another controller if needed and/or desired. The controller 16A completes the pairing mode after the controller 16A wirelessly transmits the master response signal MS16R.

When the controller 16A completes the pairing mode, the informing unit 16F blinks at several times and is turned off. The user keeps pressing the switch SW16 until the informing unit 16F finishes lighting and blinking. The user stops pressing the switch SW16 when the user acknowledges the lighting and the blinking of the informing unit 16F since the lighting and the blinking of the informing unit 16F indicates that the controller 16A completes the pairing mode.

Figure 7:
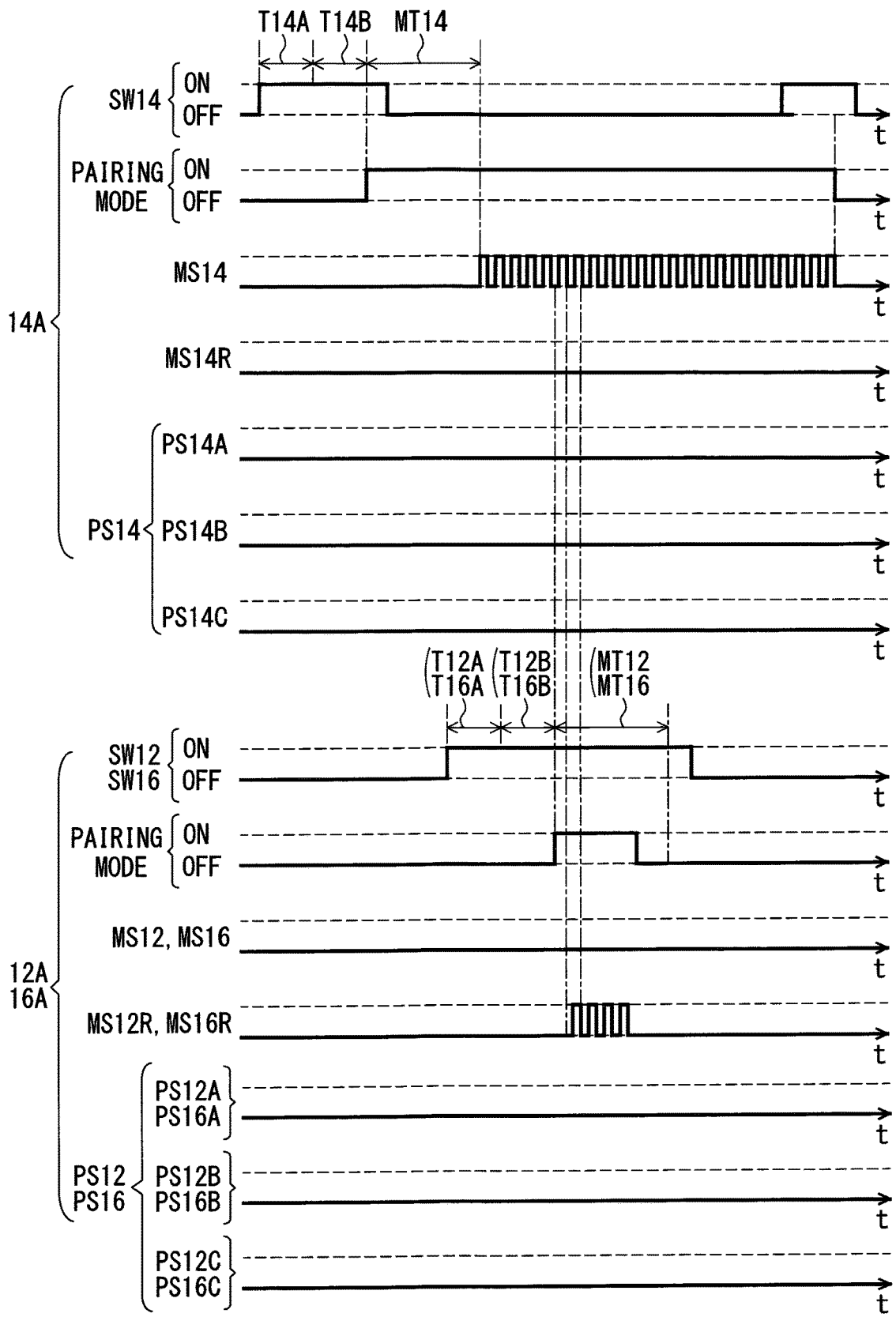
FIG. 7 is a timing chart of a pairing mode of the system illustrated in FIG. 4 among the electrical devices.

FIG. 7 shows a timing chart of pairing executed between the electrical device 14 and each of the electrical devices 12 and 16 in a case where the electrical device 14 acts as the master electrical device and the electrical devices 12 and 16 act as the slave electrical device. The description regarding the pairing executed between the electrical device 12 and each of the electrical devices 14 and 16 can be utilized as the description regarding the pairing executed between the electrical device 14 and each of the electrical devices 12 and 16 by replacing the numeric characters of the reference numerals "12" and "14" with "14" and "12." Thus, the pairing executed between the electrical device 14 and each of the electrical devices 12 and 16 will not be described in detail here for the sake of brevity.

Figure 8:
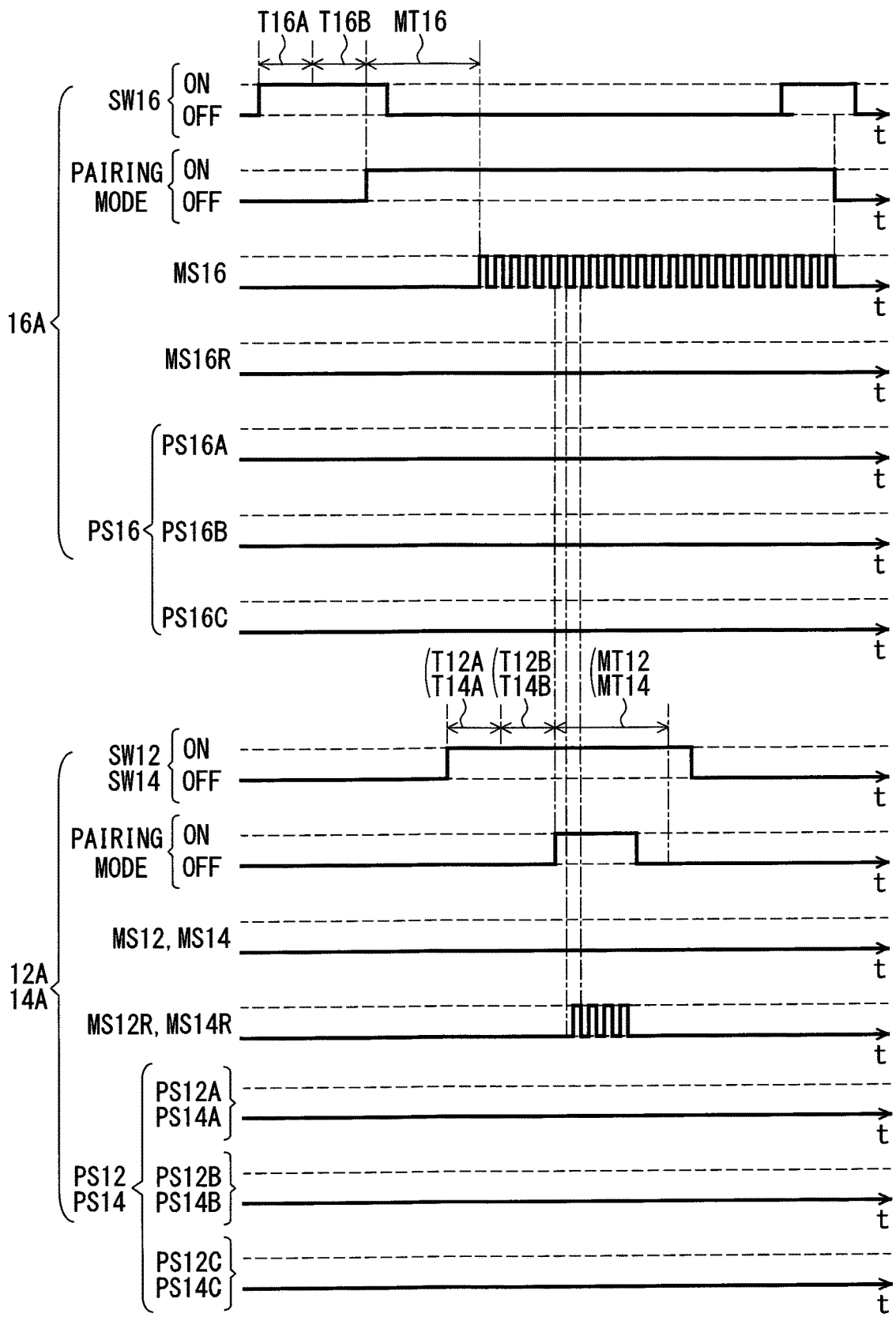
FIG. 8 is a timing chart of a pairing mode of the system illustrated in FIG. 5 among the electrical devices.

FIG. 8 shows a timing chart of pairing executed between the electrical device 16 and each of the electrical devices 12 and 14 in a case where the electrical device 16 acts as the master electrical device and the electrical devices 12 and 14 act as the slave electrical device. The description regarding the pairing executed between the electrical device 12 and each of the electrical devices 16 and 14 can be utilized as the description regarding the pairing executed between the electrical device 16 and each of the electrical devices 12 and 14 by replacing the numeric characters of the reference numerals "12" and "16" with "16" and "12." Thus, the pairing executed between the electrical device 16 and each of the electrical devices 12 and 14 will not be described in detail here for the sake of brevity.

Figure 9:
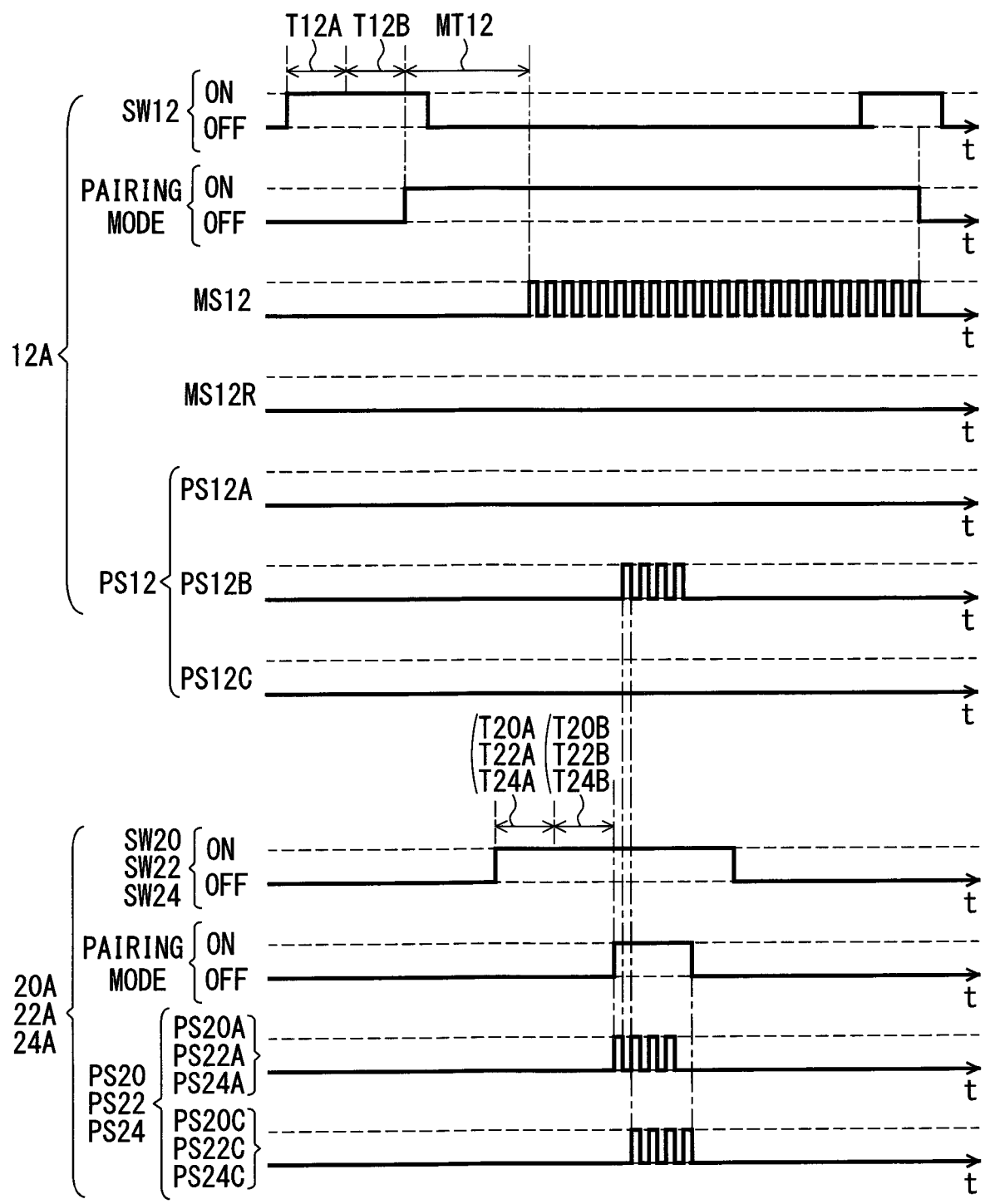
FIG. 9 is a timing chart of a pairing mode of the system illustrated in FIGS. 3 to 5 among the electrical device and an operating device.

FIG. 9 shows a timing chart of pairing executed between the electrical device 12 and each of the first operating device 20, the second operating device 22, and the third operating device 24 in a case where the electrical device 12 acts as the master electrical device.

The controller 20A is turned on and enters the pairing mode in response to the user input U20 received by the user interface 20U. Specifically, the controller 20A is turned on and enters the pairing mode in response to a long press of the switch SW20. The controller 20A is turned on if the user keeps pressing the switch SW20 for a first long-press determination time T20A. The informing unit 20F lights if the user keeps pressing the switch SW20 for the first long-press determination time T20A. The controller 20A enters the pairing mode if the user further keeps pressing the switch SW20 for a second long-press determination time T20B after the controller 20A is turned on. When the controller 20A enters the pairing mode, the informing unit 20F blinks at several times and is turned off. The user keeps pressing the switch SW20 until the informing unit 20F finishes lighting and blinking. The user stops pressing the switch SW20 when the user acknowledges the lighting and the blinking of the informing unit 20F since the lighting and the blinking of the informing unit 20F indicates that the controller 20A enters the pairing mode.

The controller 20A starts to wirelessly transmit the pairing signal PS20 at regular intervals after the controller 20A enters the pairing mode. Specifically, the controller 20A starts to wirelessly transmit the advertising signal PS20A at regular intervals for a predetermined time after the controller 20A enters the pairing mode. The controller 12A stores the identifying information of the first operating device 20 included in the advertising signal PS20A. The controller 12A wirelessly transmits the scanning request signal PS12B at regular intervals for a predetermined time in response to the advertising signal PS20A. The controller 20A stores the identifying information of the electrical device 12 included in the scanning request signal PS12B. The controller 20A wirelessly transmits the scanning response signal PS20C at regular intervals for a predetermined time in response to the scanning request signal PS12B. The controller 12A further stores the identifying information of the first operating device 20 included in the scanning response signal PS20C. Thus, the controllers 12A and 20A establish a secured wireless communication between the controller 12A and 20A. The controller 20A completes the pairing mode after the controller 20A wirelessly transmits the scanning response signal PS20C.

When the controller 20A completes the pairing mode, the informing unit 20F blinks at several times and is turned off. The user keeps pressing the switch SW20 until the informing unit 20F finishes lighting and blinking. The user stops pressing the switch SW20 when the user acknowledges the lighting and the blinking of the informing unit 20F since the lighting and the blinking of the informing unit 20F indicates that the controller 20A completes the pairing mode.

The above description regarding the pairing executed between the electrical device 12 and the first operating device 20 can be utilized as the pairing executed between the electrical device 12 and each of the second operating device 22 and the third operating device 24 by replacing the numerical characters of the reference numerals "20" with "22" or "24." Thus, they will not be described in detail here for the sake of brevity.

In a case where the electrical device 14 acts as the master electrical device and the controller 14A acts as the master controller, the above description regarding the pairing executed between the electrical device 12 and the first operating device 20 can be utilized as the pairing executed between the electrical device 14 and the first operating device 20 by replacing the numerical characters of the reference numerals "12" with "14." The above description regarding the pairing executed between the electrical device 12 and the first operating device 20 can be utilized as the pairing executed between the electrical device 12 and each of the second operating device 22 and the third operating device 24 by replacing the numerical characters of the reference numerals "12" and "20" with "14" and one of "22" and "24." Thus, they will not be described in detail here for the sake of brevity.

In a case where the electrical device 16 acts as the master electrical device and the controller 16A acts as the master controller, the above description regarding the pairing executed between the electrical device 12 and the first operating device 20 can be utilized as the pairing executed between the electrical device 1 #6 and the first operating device 20 by replacing the numerical characters of the reference numerals "12" with "1 #6." The above description regarding the pairing executed between the electrical device 12 and the first operating device 20 can be utilized as the pairing executed between the electrical device 12 and each of the second operating device 22 and the third operating device 24 by replacing the numerical characters of the reference numerals "12" and "20" with "1 #6" and one of "22" and "24." Thus, they will not be described in detail here for the sake of brevity.

The user presses the switch SW12 after the pairing mode of each of the electrical devices 14 and 16 and the first, second, and third operating devices 20, 22, and 24. The controller 12A completes the pairing mode in response to a long press of the switch SW12.

As seen in FIGS. 10 to 15, in the system 10, the slave electrical device is configured to act as the master electrical device on behalf of the original master electrical device if the original master electrical device is in an abnormal state.

In a case where the electrical device 12 acts as the master controller and the electrical devices 14 and 16 act as the slave controller, the electrical devices 14 and 16 determine whether the electrical device 12 is in an abnormal state after the completion of the pairing mode.

In a case where the electrical device 14 acts as the master controller and the electrical devices 12 and 16 act as the slave controller, the electrical devices 12 and 16 determine whether the electrical device 14 is in an abnormal state after the completion of the pairing mode.

In a case where the electrical device 16 acts as the master controller and the electrical devices 12 and 14 act as the slave controller, the electrical devices 12 and 14 determine whether the electrical device 16 is in an abnormal state after the completion of the pairing mode.

The controller 12A is configured to transmit a communication signal NS12 at regular intervals after the controller 12A completes the pairing mode. The communication signal NS12 indicates that the electrical device 12 is in a normal state. The communicator 12C is configured to transmit the communication signal NS12 at regular intervals after the controller 12A completes the pairing mode. The wireless communicator 12W is configured to wirelessly transmit the communication signal NS12 at regular intervals via the wireless communication channel.

The controller 14A is configured to transmit a communication signal NS14 at regular intervals after the controller 14A completes the pairing mode. The communication signal NS14 indicates that the electrical device 14 is in a normal state. The communicator 14C is configured to transmit the communication signal NS14 at regular intervals after the controller 14A completes the pairing mode. The wireless communicator 14W is configured to wirelessly transmit the communication signal NS14 at regular intervals via the wireless communication channel.

The controller 16A is configured to transmit a communication signal NS16 at regular intervals after the controller 16A completes the pairing mode. The communication signal NS16 indicates that the electrical device 16 is in a normal state. The communicator 16C is configured to transmit the communication signal NS16 at regular intervals after the controller 16A completes the pairing mode. The wireless communicator 16W is configured to wirelessly transmit the communication signal NS16 at regular intervals via the wireless communication channel.

The controller 12A is configured to detect the communication signal NS14 or NS16 transmitted from the different master controller 14A or 16A. The communicator 12C is configured to detect the communication signal NS14 or NS16 transmitted from the communicator 14C or 16C. The wireless communicator 12W is configured to detect the communication signal NS14 or NS16 transmitted from the wireless communicator 14W or 16W via the wireless communication channel.

The controller 14A is configured to detect the communication signal NS12 or NS16 transmitted from the different master controller 12A or 16A. The communicator 14C is configured to detect the communication signal NS12 or NS16 transmitted from the communicator 12C or 16C. The wireless communicator 14W is configured to detect the communication signal NS12 or NS16 transmitted from the wireless communicator 12W or 16W via the wireless communication channel.

The controller 16A is configured to detect the communication signal NS12 or NS14 transmitted from the different master controller 12A or 14A. The communicator 16C is configured to detect the communication signal NS12 or NS14 transmitted from the communicator 12C or 14C. The wireless communicator 16W is configured to detect the communication signal NS12 or NS14 transmitted from the wireless communicator 12W or 14W via the wireless communication channel.

Figure 10:
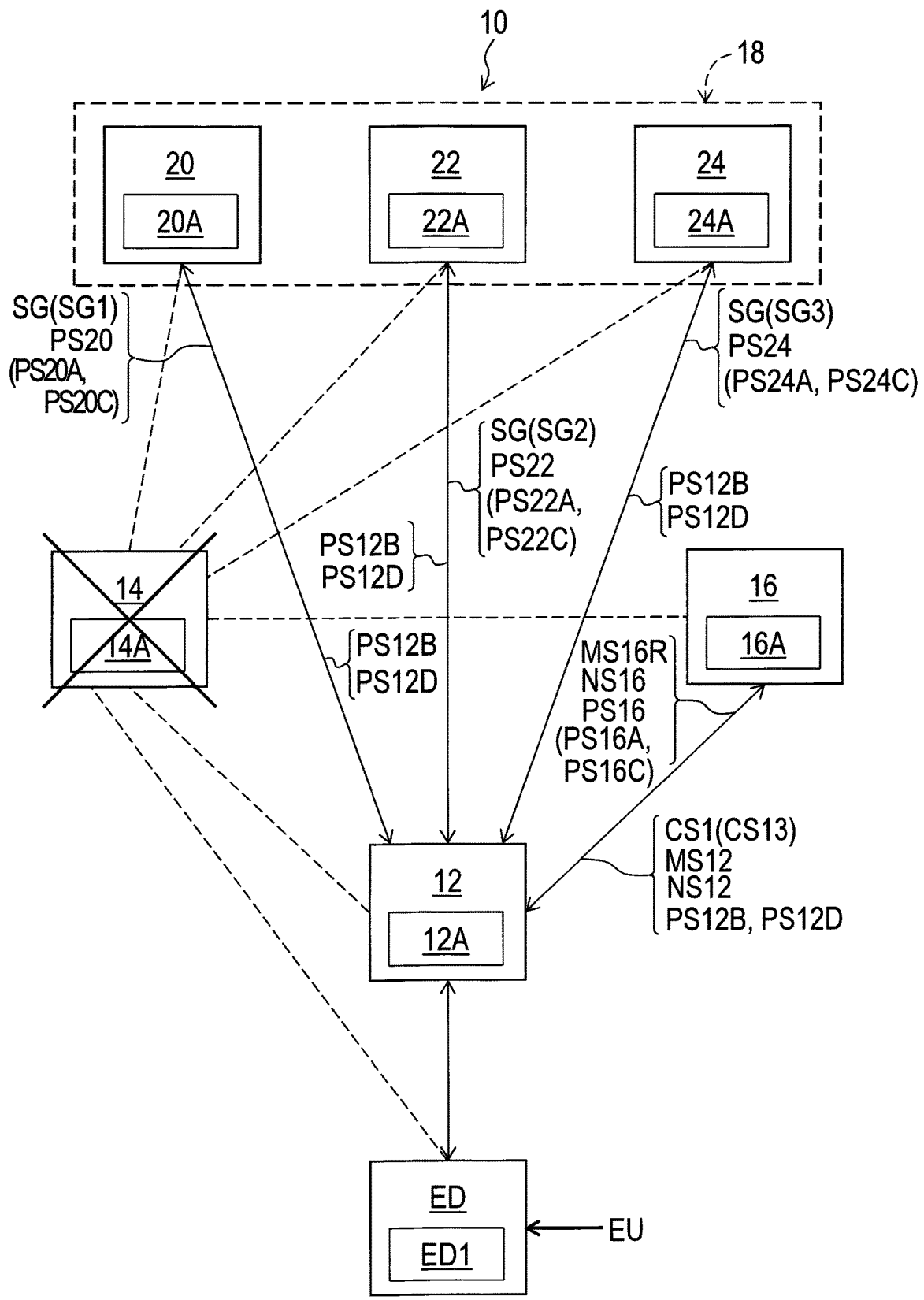
FIG. 10 is a schematic block diagram of the system illustrated in FIG. 4 in a case where the master electrical device is in abnormal state and one of the slave electrical devices acts as the master electrical device.
Figure 11:
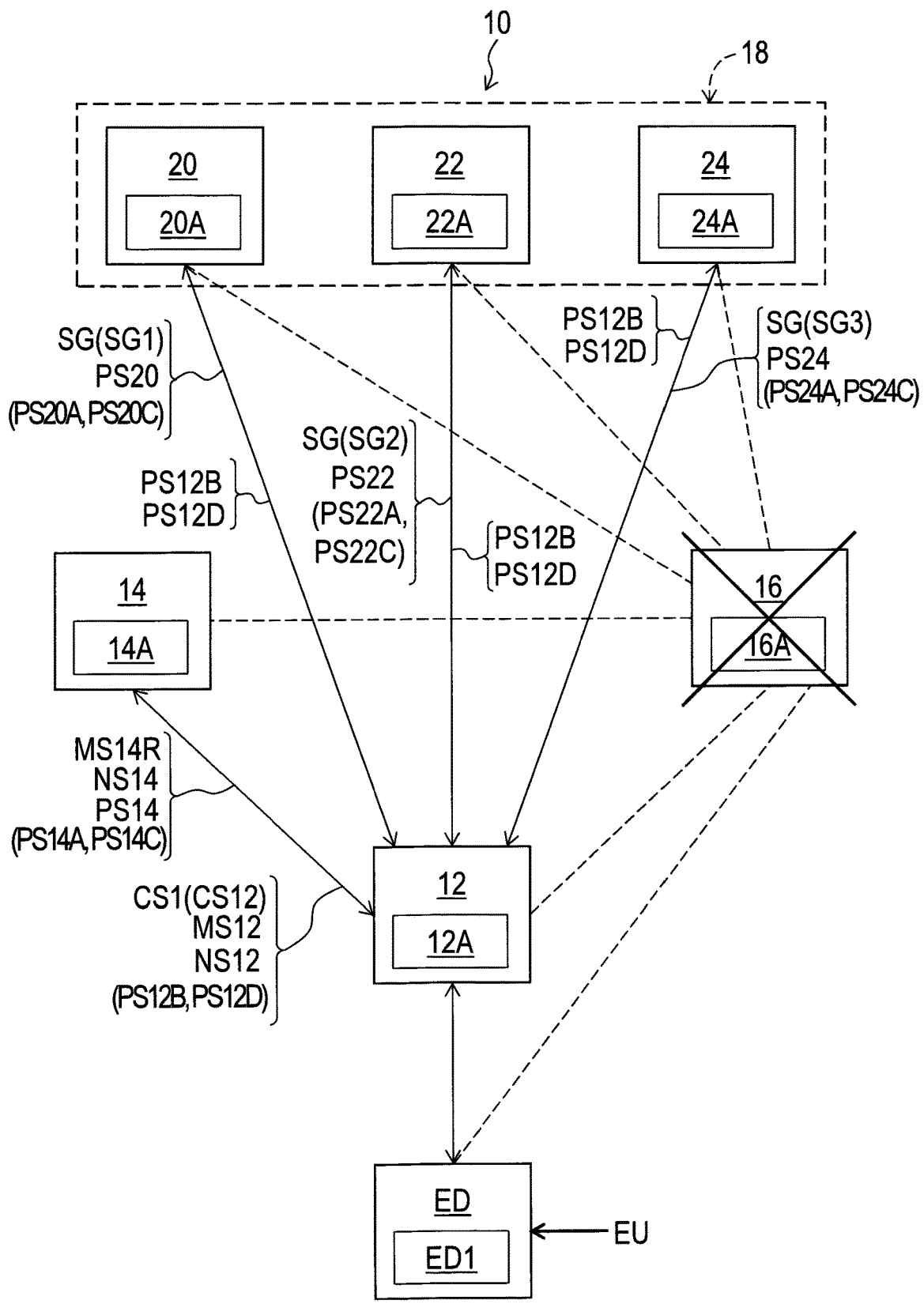
FIG. 11 is a schematic block diagram of the system illustrated in FIG. 5 in a case where the master electrical device is in abnormal state and another of the slave electrical devices acts as the master electrical device.

As seen in FIGS. 10 and 11, the controller 12A is configured to act as the master controller on behalf of the different master controller 14A or 16A if the reference information indicates that the different master controller 14A or 16A is in an abnormal state. The abnormal state includes at least one of a failure of the different master controller 14A or 16A and unresponsiveness of the different master controller 14A or 16A.

The controller 12A is configured to conclude that the different master controller 14A or 16A is not in the abnormal state if the controller 12A detects the communication signal NS14 or NS16 within a state determination time. The controller 12A is configured to conclude that the different master controller 14A or 16A is in the abnormal state if the controller 12A does not detect the communication signal NS14 or NS16 within the state determination time. The detection result indicating that the controller 12A does not detect the communication signal NS14 or NS16 indicates unresponsiveness of the different master controller 14A or 16A.

As seen in FIG. 10, in a case where the controller 14A acts as the master controller and each of the controllers 12A and 16A acts as the slave controller, the controller 12A is configured to act as the master controller on behalf of the controller 14A if the reference information indicates that the controller 14A is in the abnormal state. The controller 12A is configured to act as the master controller on behalf of the controller 14A if the controller 12A does not detect the communication signal NS14 within the state determination time.

As seen in FIG. 11, in a case where the controller 16A acts as the master controller and each of the controllers 12A and 14A acts as the slave controller, the controller 12A is configured to act as the master controller on behalf of the controller 16A if the reference information indicates that the controller 16A is in the abnormal state. The controller 12A is configured to act as the master controller on behalf of the controller 16A if the controller 12A does not detect the communication signal NS16 within the state determination time.

As seen in FIG. 10, the controller 12A is configured to enter the pairing mode if the reference information indicates that the different master controller 14A is in the abnormal state. The controller 12A is configured to wirelessly transmit a pairing request signal PS12D if the reference information indicates that the different master controller 14A is in the abnormal state. Each of the controllers 16A, 20A, 22A, and 24A is configured to wirelessly transmit the pairing signal PS16, PS20, PS22, or PS24 in response to the pairing request signal PS12D. The controller 12A is configured to execute the pairing between the controller 12A and each of the controllers 16A, 20A, 22A, and 24A as with the pairing executed between the controller 12A and each of the controllers 20A, 22A, and 24A as shown in FIG. 9. The controller 12A can be configured to wirelessly transmit the master signal MS12 to execute the pairing between the controllers 12A and 16A as with the pairing shown in FIG. 6.

As seen in FIG. 11, the controller 12A is configured to enter the pairing mode if the reference information indicates that the different master controller 16A is in the abnormal state. The controller 12A is configured to wirelessly transmit the pairing request signal PS12D if the reference information indicates that the different master controller 16A is in the abnormal state. Each of the controllers 14A, 20A, 22A, and 24A is configured to wirelessly transmit the pairing signal PS14, PS20, PS22, or PS24 in response to the pairing request signal PS12D. The controller 12A is configured to execute the pairing between the controller 12A and each of the controllers 14A, 20A, 22A, and 24A as with the pairing executed between the controller 12A and each of the controllers 20A, 22A, and 24A as shown in FIG. 9. The controller 12A can be configured to wirelessly transmit the master signal MS12 to execute the pairing between the controllers 12A and 14A as with the pairing shown in FIG. 6.

Figure 12:
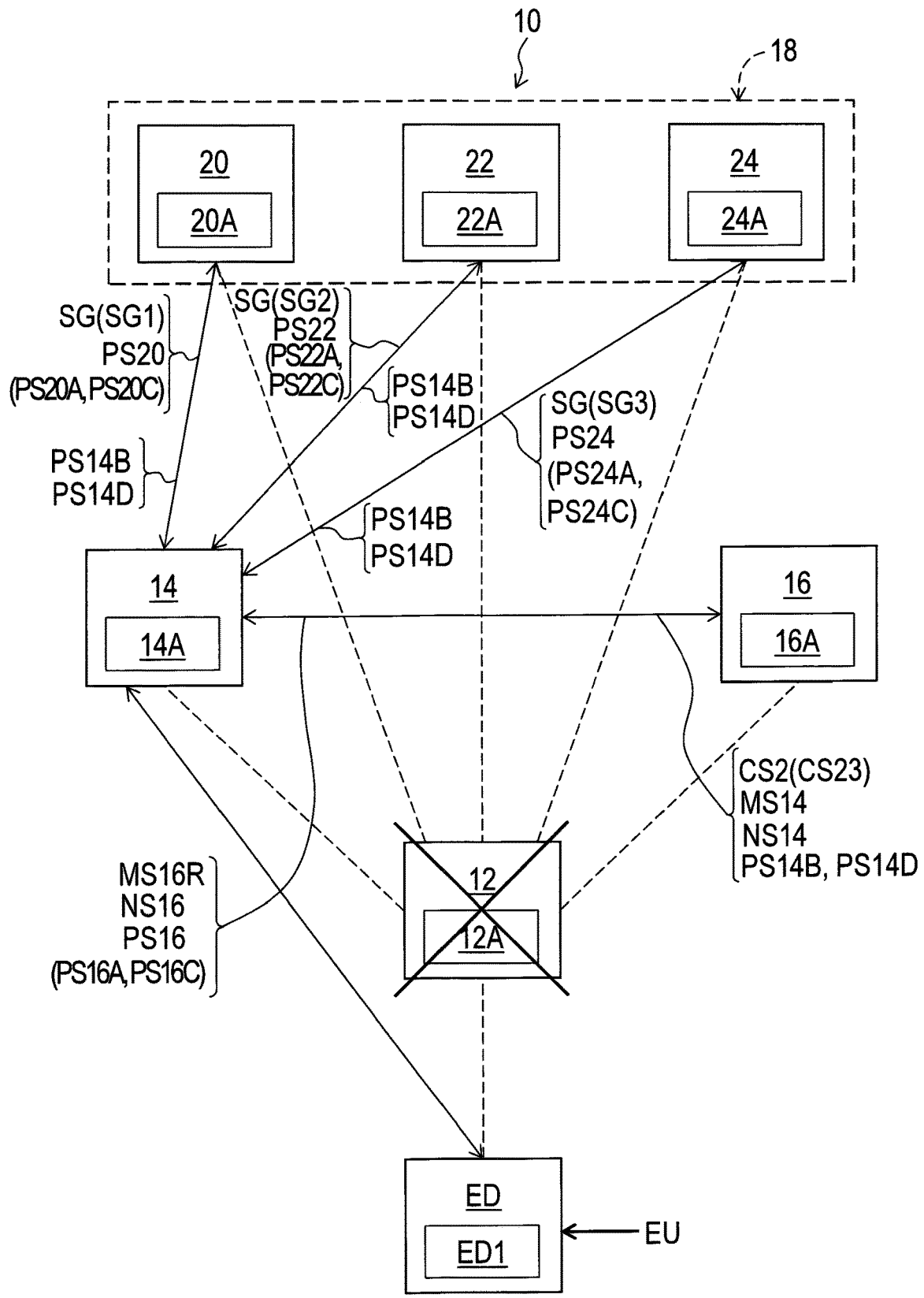
FIG. 12 is a schematic block diagram of the system illustrated in FIG. 3 in a case where the master electrical device is in abnormal state and one of the slave electrical devices acts as the master electrical device.
Figure 13:
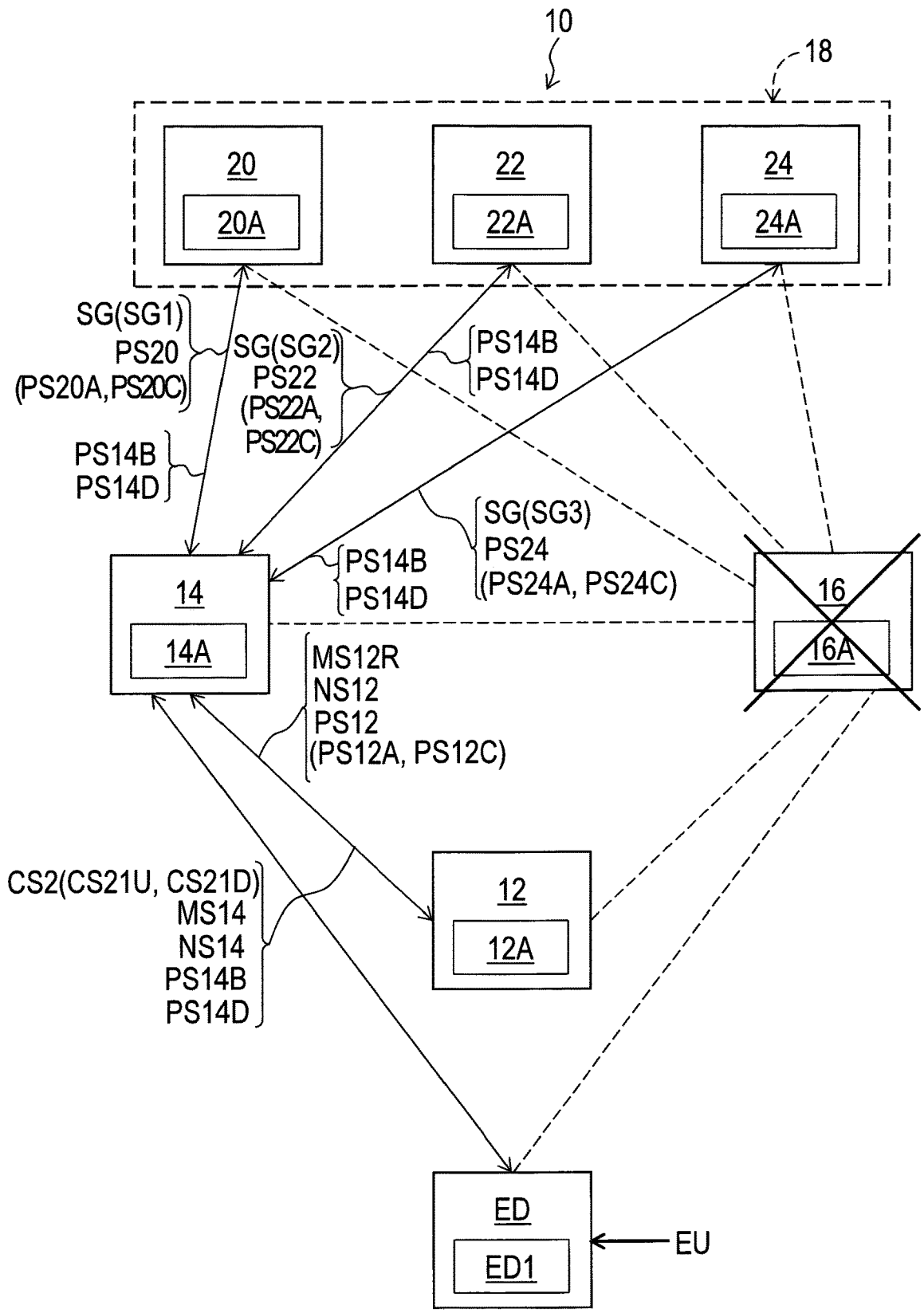
FIG. 13 is a schematic block diagram of the system illustrated in FIG. 5 in a case where the master electrical device is in abnormal state and another of the slave electrical devices acts as the master electrical device.

As seen in FIGS. 12 and 13, the controller 14A is configured to act as the master controller on behalf of the different master controller 12A or 16A if the reference information indicates that the different master controller 12A or 16A is in an abnormal state. The abnormal state includes at least one of a failure of the different master controller 12A or 16A and unresponsiveness of the different master controller 12A or 16A.

The controller 14A is configured to conclude that the different master controller 12A or 16A is not in the abnormal state if the controller 14A detects the communication signal NS12 or NS16 within a state determination time. The controller 14A is configured to conclude that the different master controller 12A or 16A is in the abnormal state if the controller 14A does not detect the communication signal NS12 or NS16 within the state determination time. The detection result indicating that the controller 14A does not detect the communication signal NS12 or NS16 indicates unresponsiveness of the different master controller 12A or 16A.

As seen in FIG. 12, in a case where the controller 12A acts as the master controller and each of the controllers 14A and 16A acts as the slave controller, the controller 14A is configured to act as the master controller on behalf of the controller 12A if the reference information indicates that the controller 12A is in the abnormal state. The controller 14A is configured to act as the master controller on behalf of the controller 12A if the controller 14A does not detect the communication signal NS12 within the state determination time.

As seen in FIG. 13, in a case where the controller 16A acts as the master controller and each of the controllers 12A and 14A acts as the slave controller, the controller 14A is configured to act as the master controller on behalf of the controller 16A if the reference information indicates that the controller 16A is in the abnormal state. The controller 14A is configured to act as the master controller on behalf of the controller 16A if the controller 14A does not detect the communication signal NS16 within the state determination time.

As seen in FIG. 12, the controller 14A is configured to enter the pairing mode if the reference information indicates that the different master controller 12A is in the abnormal state. The controller 14A is configured to wirelessly transmit a pairing request signal PS14D if the reference information indicates that the different master controller 12A is in the abnormal state. Each of the controllers 16A, 20A, 22A, and 24A is configured to wirelessly transmit the pairing signal PS16, PS20, PS22, or PS24 in response to the pairing request signal PS14D. The controller 14A is configured to execute the pairing between the controller 14A and each of the controllers 16A, 20A, 22A, and 24A as with the pairing executed between the controller 14A and each of the controllers 20A, 22A, and 24A as shown in FIG. 9. The controller 14A can be configured to wirelessly transmit the master signal MS14 to execute the pairing between the controllers 14A and 16A as with the pairing shown in FIG. 7.

As seen in FIG. 13, the controller 14A is configured to enter the pairing mode if the reference information indicates that the different master controller 16A is in the abnormal state. The controller 14A is configured to wirelessly transmit the pairing request signal PS14D if the reference information indicates that the different master controller 16A is in the abnormal state. Each of the controllers 12A, 20A, 22A, and 24A is configured to wirelessly transmit the pairing signal PS12, PS20, PS22, or PS24 in response to the pairing request signal PS14D. The controller 14A is configured to execute the pairing between the controller 14A and each of the controllers 12A, 20A, 22A, and 24A as with the pairing executed between the controller 14A and each of the controllers 20A, 22A, and 24A as shown in FIG. 9. The controller 14A can be configured to wirelessly transmit the master signal MS14 to execute the pairing between the controllers 14A and 12A as with the pairing shown in FIG. 7.

Figure 14:
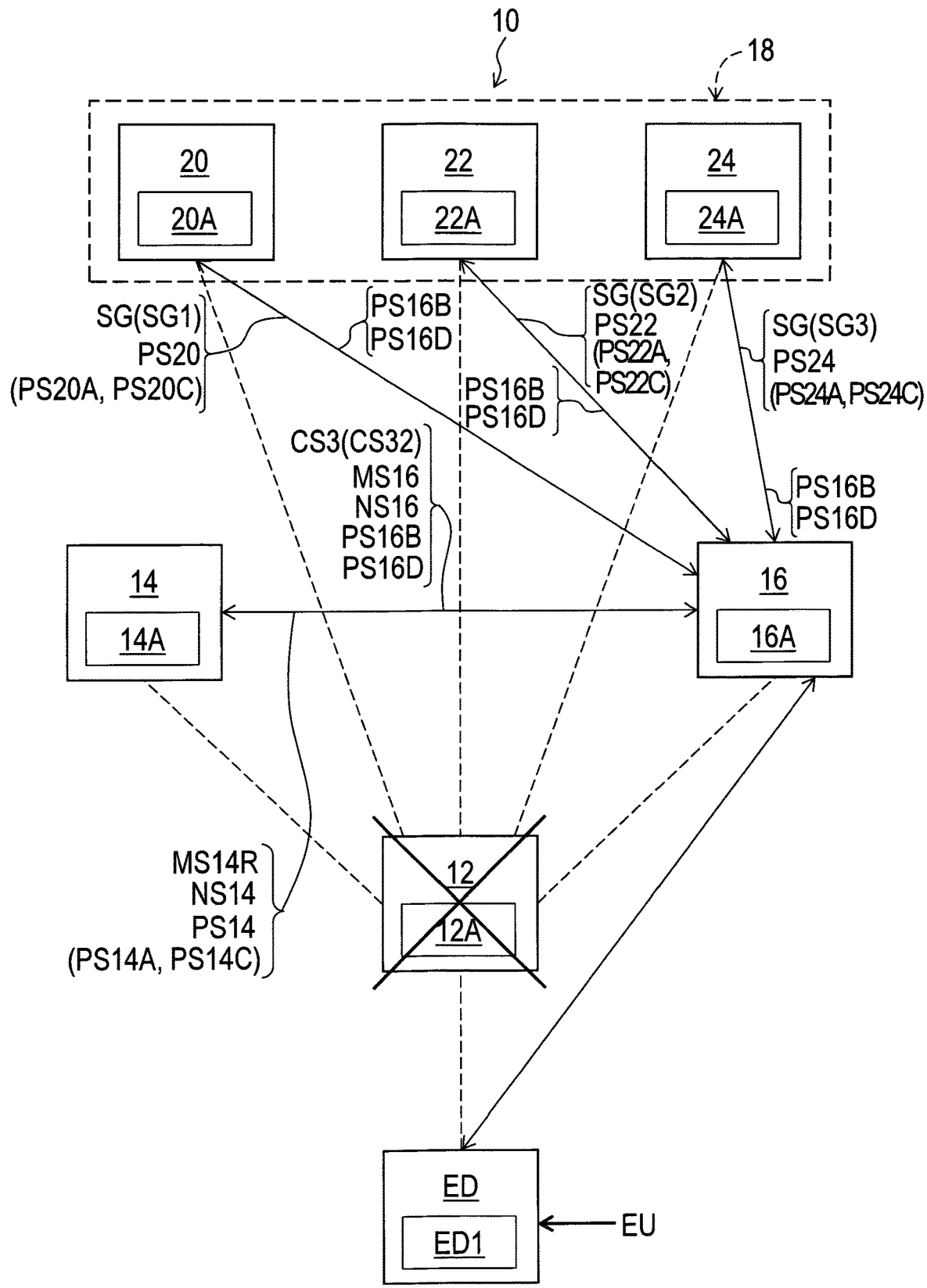
FIG. 14 is a schematic block diagram of the system illustrated in FIG. 3 in a case where the master electrical device is in abnormal state and one of the slave electrical devices acts as the master electrical device.
Figure 15:
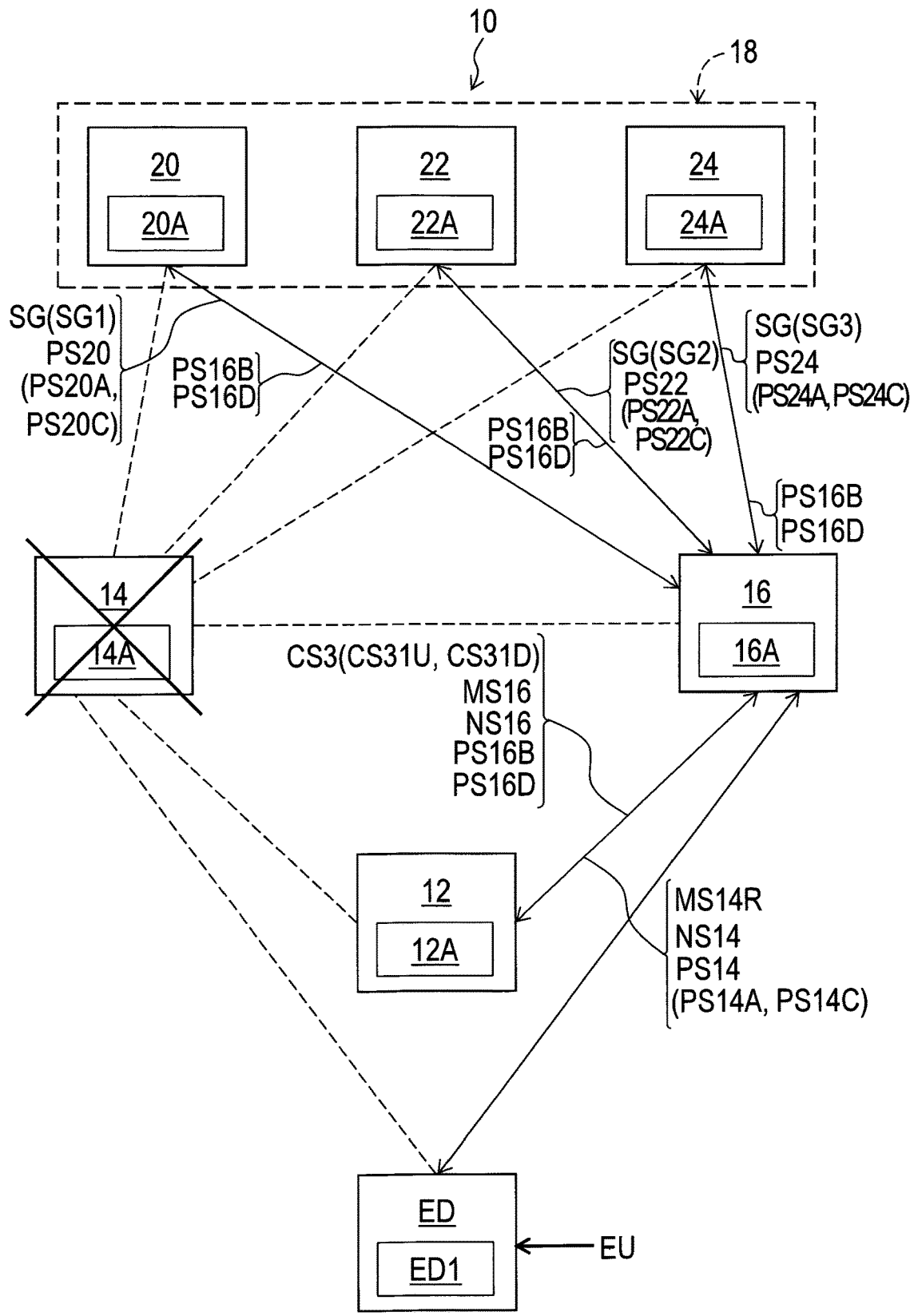
FIG. 15 is a schematic block diagram of the system illustrated in FIG. 4 in a case where the master electrical device is in abnormal state and another of the slave electrical devices acts as the master electrical device.

As seen in FIGS. 14 and 15, the controller 16A is configured to act as the master controller on behalf of the different master controller 12A or 14A if the reference information indicates that the different master controller 12A or 14A is in an abnormal state. The abnormal state includes at least one of a failure of the different master controller 12A or 14A and unresponsiveness of the different master controller 12A or 14A.

The controller 16A is configured to conclude that the different master controller 12A or 14A is not in the abnormal state if the controller 16A detects the communication signal NS12 or NS14 within a state determination time. The controller 16A is configured to conclude that the different master controller 12A or 14A is in the abnormal state if the controller 16A does not detect the communication signal NS12 or NS14 within the state determination time. The detection result indicating that the controller 16A does not detect the communication signal NS12 or NS14 indicates unresponsiveness of the different master controller 12A or 14A.

As seen in FIG. 14, in a case where the controller 12A acts as the master controller and each of the controllers 14A and 16A acts as the slave controller, the controller 16A is configured to act as the master controller on behalf of the controller 12A if the reference information indicates that the controller 12A is in the abnormal state. The controller 16A is configured to act as the master controller on behalf of the controller 12A if the controller 16A does not detect the communication signal NS12 within the state determination time.

As seen in FIG. 15, in a case where the controller 14A acts as the master controller and each of the controllers 12A and 16A acts as the slave controller, the controller 16A is configured to act as the master controller on behalf of the controller 14A if the reference information indicates that the controller 14A is in the abnormal state. The controller 16A is configured to act as the master controller on behalf of the controller 14A if the controller 16A does not detect the communication signal NS14 within the state determination time.

As seen in FIG. 14, the controller 16A is configured to enter the pairing mode if the reference information indicates that the different master controller 12A is in the abnormal state. The controller 16A is configured to wirelessly transmit a pairing request signal PS16D if the reference information indicates that the different master controller 12A is in the abnormal state. Each of the controllers 14A, 20A, 22A, and 24A is configured to wirelessly transmit the pairing signal PS14, PS20, PS22, or PS24 in response to the pairing request signal PS16D. The controller 16A is configured to execute the pairing between the controller 16A and each of the controllers 14A, 20A, 22A, and 24A as with the pairing executed between the controller 16A and each of the controllers 20A, 22A, and 24A as shown in FIG. 9.

As seen in FIG. 15, the controller 16A is configured to enter the pairing mode if the reference information indicates that the different master controller 14A is in the abnormal state. The controller 16A is configured to wirelessly transmit a pairing request signal PS16D if the reference information indicates that the different master controller 14A is in the abnormal state. Each of the controllers 12A, 20A, 22A, and 24A is configured to wirelessly transmit the pairing signal PS12, PS20, PS22, or PS24 in response to the pairing request signal PS16D. The controller 16A is configured to execute the pairing between the controller 16A and each of the controllers 12A, 20A, 22A, and 24A as with the pairing executed between the controller 16A and each of the controllers 20A, 22A, and 24A as shown in FIG. 9.

The controller 12A can be configured to transmit a failure signal indicating a failure of the electrical device 12. The controller 14A can be configured to transmit a failure signal indicating a failure of the electrical device 14. The controller 16A can be configured to transmit a failure signal indicating a failure of the electrical device 16.

The controller 12A can be configured to detect the failure signal transmitted from the controller 14A and/or 16A. The controller 14A can be configured to detect the failure signal transmitted from the controller 12A and/or 16A. The controller 16A can be configured to detect the failure signal transmitted from the controller 12A and/or 14A.

The controller 12A can be configured to act as the master controller on behalf of the different master controller 14A or 16A if the controller 12A detects the failure signal transmitted from the controller 14A or 16A. The controller 14A can be configured to act as the master controller on behalf of the different master controller 12A or 16A if the controller 14A detects the failure signal transmitted from the controller 12A or 16A. The controller 16A can be configured to act as the master controller on behalf of the different master controller 12A or 14A if the controller 16A detects the failure signal transmitted from the controller 12A or 14A.

The controller 12A is configured to store priority information in the memory 12M. The controller 14A is configured to store the priority information in the memory 14M. The controller 16A is configured to store the priority information in the memory 16M. The priority information indicates a priority order among the electrical devices 12, 14, and 16.

As seen in FIG. 12, in a case where the priority information gives priority to the electrical device 12, the electrical device 14, and the electrical device 16 in this order, the controller 14A is configured to act as the master controller on behalf of the controller 12A if the reference information indicates that the controller 12A is in the abnormal state when the controller 12A acts as the master controller. The controller 16A is configured to act as the slave controller and not to act as the master controller on behalf of the controller 12A if the reference information indicates that the controller 12A is in the abnormal state when the controller 12A acts as the master controller.

As seen in FIG. 14, in a case where the priority information gives priority to the electrical device 12, the electrical device 16, and the electrical device 14 in this order, the controller 16A is configured to act as the master controller on behalf of the controller 12A if the reference information indicates that the controller 12A is in the abnormal state when the controller 12A acts as the master controller. The controller 14A is configured to act as the slave controller and not to act as the master controller on behalf of the controller 12A if the reference information indicates that the controller 12A is in the abnormal state when the controller 12A acts as the master controller.

As seen in FIG. 10, in a case where the priority information gives priority to the electrical device 14, the electrical device 12, and the electrical device 16 in this order, the controller 12A is configured to act as the master controller on behalf of the controller 14A if the reference information indicates that the controller 14A is in the abnormal state when the controller 14A acts as the master controller. The controller 16A is configured to act as the slave controller and not to act as the master controller on behalf of the controller 14A if the reference information indicates that the controller 14A is in the abnormal state when the controller 14A acts as the master controller.

As seen in FIG. 15, in a case where the priority information gives priority to the electrical device 14, the electrical device 16, and the electrical device 12 in this order, the controller 16A is configured to act as the master controller on behalf of the controller 14A if the reference information indicates that the controller 14A is in the abnormal state when the controller 14A acts as the master controller. The controller 12A is configured to act as the slave controller and not to act as the master controller on behalf of the controller 14A if the reference information indicates that the controller 14A is in the abnormal state when the controller 14A acts as the master controller.

As seen in FIG. 11, in a case where the priority information gives priority to the electrical device 16, the electrical device 12, and the electrical device 14 in this order, the controller 12A is configured to act as the master controller on behalf of the controller 16A if the reference information indicates that the controller 16A is in the abnormal state when the controller 16A acts as the master controller. The controller 14A is configured to act as the slave controller and not to act as the master controller on behalf of the controller 16A if the reference information indicates that the controller 16A is in the abnormal state when the controller 16A acts as the master controller.

As seen in FIG. 13, in a case where the priority information gives priority to the electrical device 16, the electrical device 14, and the electrical device 12 in this order, the controller 14A is configured to act as the master controller on behalf of the controller 16A if the reference information indicates that the controller 16A is in the abnormal state when the controller 16A acts as the master controller. The controller 12A is configured to act as the slave controller and not to act as the master controller on behalf of the controller 16A if the reference information indicates that the controller 16A is in the abnormal state when the controller 16A acts as the master controller.

As seen in FIG. 3, the controller 12A is configured to act as the master controller if the reference information indicates at least one of that the master controller 12A is selected by the user, that the slave controller 12A is not selected by the user, and that the different slave controller 14A or 16A is selected by the user. In the present embodiment, the controller 12A is configured to act as the master controller if the reference information indicates that the master controller 12A is selected by the user. However, the controller 12A can be configured to act as the master controller if the reference information indicates at least one of that the master controller 12A is selected by the user, that the slave controller 12A is not selected by the user, and that the different slave controller 14A or 16A is selected by the user if needed and/or desired.

In a case where the reference information indicates at least one of that the master controller 12A is selected by the user, that the slave controller 12A is not selected by the user, and that the different slave controller 14A or 16A is selected by the user, the controller 12A executes the pairing between the controller 12A and each of the controllers 14A, 16A, 20A, 22A, and 24A as with the pairing executed between the controller 12A and each of the controllers 20A, 22A, and 24A as shown in FIG. 9. In this case, the controllers 12A, 14A, and 16A are configured not to use the master signals MS12, MS14, and MS16 in the pairing mode.

As seen in FIGS. 4 and 5, the controller 12A is configured to act as the slave controller if the reference information indicates at least one of that the slave controller 12A is selected by the user, that the master controller 12A is not selected by the user, and that the different master controller 14A or 16A is selected by the user. In the present embodiment, the controller 12A is configured to act as the slave controller if the reference information indicates the different master controller 14A or 16A is selected by the user. However, the controller 12A can be configured to act as the slave controller if at least one of that the slave controller 12A is selected by the user, that the master controller 12A is not selected by the user, and that the different master controller 14A or 16A is selected by the user if needed and/or desired.

In a case where the reference information indicates at least one of that the slave controller 12A is selected by the user, that the master controller 12A is not selected by the user, and that the different master controller 14A or 16A is selected by the user, the controller 12A executes the pairing between the controller 12A and one of the controllers 14A and 16A as with the pairing executed between the controller 12A and each of the controllers 20A, 22A, and 24A as shown in FIG. 9. In this case, the controllers 12A, 14A, and 16A are configured not to use the master signals MS12, MS14, and MS16 in the pairing mode.

As seen in FIG. 4, the controller 14A is configured to act as the master controller if the reference information indicates at least one of that the master controller 14A is selected by the user, that the slave controller 14A is not selected by the user, and that the different slave controller 12A or 16A is selected by the user. In the present embodiment, the controller 14A is configured to act as the master controller if the reference information indicates that the master controller 14A is selected by the user. However, the controller 14A can be configured to act as the master controller if the reference information indicates at least one of that the master controller 14A is selected by the user, that the slave controller 14A is not selected by the user, and that the different slave controller 12A or 16A is selected by the user if needed and/or desired.

In a case where the reference information indicates at least one of that the master controller 14A is selected by the user, that the slave controller 14A is not selected by the user, and that the different slave controller 12A or 16A is selected by the user, the controller 14A executes the pairing between the controller 14A and each of the controllers 12A, 16A, 20A, 22A, and 24A as with the pairing executed between the controller 14A and each of the controllers 20A, 22A, and 24A as shown in FIG. 9. In this case, the controllers 12A, 14A, and 16A are configured not to use the master signals MS12, MS14, and MS16 in the pairing mode.

As seen in FIGS. 3 and 5, the controller 14A is configured to act as the slave controller if the reference information indicates at least one of that the slave controller 14A is selected by the user, that the master controller 14A is not selected by the user, and that the different master controller 12A or 16A is selected by the user. In the present embodiment, the controller 14A is configured to act as the slave controller if the reference information indicates the different master controller 12A or 16A is selected by the user. However, the controller 14A can be configured to act as the slave controller if at least one of that the slave controller 14A is selected by the user, that the master controller 14A is not selected by the user, and that the different master controller 12A or 16A is selected by the user if needed and/or desired.

In a case where the reference information indicates at least one of that the slave controller 14A is selected by the user, that the master controller 14A is not selected by the user, and that the different master controller 12A or 16A is selected by the user, the controller 14A executes the pairing between the controller 14A and one of the controllers 12A and 16A as with the pairing executed between the controller 14A and each of the controllers 20A, 22A, and 24A as shown in FIG. 9. In this case, the controllers 12A, 14A, and 16A are configured not to use the master signals MS12, MS14, and MS16 in the pairing mode.

As seen in FIG. 5, the controller 16A is configured to act as the master controller if the reference information indicates at least one of that the master controller 16A is selected by the user, that the slave controller 16A is not selected by the user, and that the different slave controller 12A or 14A is selected by the user. In the present embodiment, the controller 16A is configured to act as the master controller if the reference information indicates that the master controller 16A is selected by the user. However, the controller 16A can be configured to act as the master controller if the reference information indicates at least one of that the master controller 16A is selected by the user, that the slave controller 16A is not selected by the user, and that the different slave controller 12A or 14A is selected by the user if needed and/or desired.

In a case where the reference information indicates at least one of that the master controller 16A is selected by the user, that the slave controller 16A is not selected by the user, and that the different slave controller 12A or 14A is selected by the user, the controller 16A executes the pairing between the controller 16A and each of the controllers 12A, 14A, 20A, 22A, and 24A as with the pairing executed between the controller 16A and each of the controllers 20A, 22A, and 24A as shown in FIG. 9. In this case, the controllers 12A, 14A, and 16A are configured not to use the master signals MS12, MS14, and MS16 in the pairing mode.

As seen in FIGS. 3 and 4, the controller 16A is configured to act as the slave controller if the reference information indicates at least one of that the slave controller 16A is selected by the user, that the master controller 16A is not selected by the user, and that the different master controller 12A or 14A is selected by the user. In the present embodiment, the controller 16A is configured to act as the slave controller if the reference information indicates the different master controller 12A or 14A is selected by the user. However, the controller 16A can be configured to act as the slave controller if at least one of that the slave controller 16A is selected by the user, that the master controller 16A is not selected by the user, and that the different master controller 12A or 14A is selected by the user if needed and/or desired.

In a case where the reference information indicates at least one of that the slave controller 16A is selected by the user, that the master controller 16A is not selected by the user, and that the different master controller 12A or 14A is selected by the user, the controller 16A executes the pairing between the controller 16A and one of the controllers 12A and 14A as with the pairing executed between the controller 16A and each of the controllers 20A, 22A, and 24A as shown in FIG. 9. In this case, the controllers 12A, 14A, and 16A are configured not to use the master signals MS12, MS14, and MS16 in the pairing mode.

Figure 16:
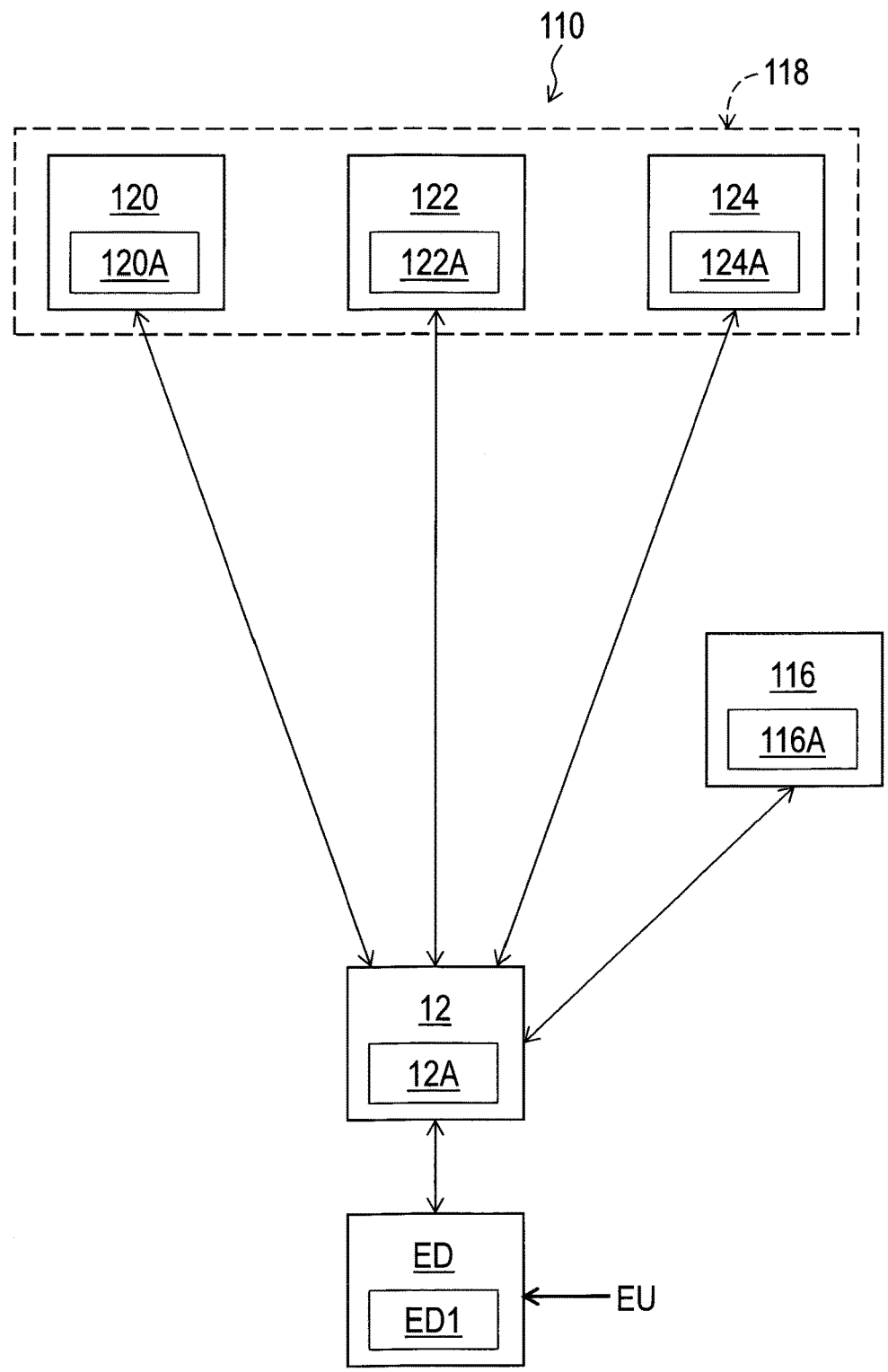
FIG. 16 is a schematic block diagram of a first different system different from the system illustrated in FIG. 2 in a case where the electrical device applies to the first different system.

As seen in FIG. 16, at least one of the electrical devices 12, 14, and 16 can be used in a system 110 different from the system 10. For example, the system 110 includes the electrical device 12, an electrical device 116, and an operating device 118. For example, the system 110 is used for a mountain bike. The electrical device 116 has substantially the same structure as the structure of the electrical device 16 and includes an adjustable seatpost. The operating device 118 has substantially the same structure as the structure of the operating device 18. The operating device 118 includes a first operating device 120, a second operating device 122, and a third operating device 124. The first operating device 120 has substantially the same structure as the structure of the first operating device 20. The second operating device 122 has substantially the same structure as the structure of the second operating device 22. The third operating device 124 has substantially the same structure as the structure of the third operating device 24. A front derailleur such as the electrical device 14 is omitted from the system 110.

The electrical device 116 includes a controller 116A. The first operating device 120 includes a controller 120A. The second operating device 122 includes a controller 122A. The third operating device 124 includes a controller 124A. The controller 116A has substantially the same structure as the structure of the controller 16A of the electrical device 16. The controller 120A has substantially the same structure as the structure of the controller 20A of the first operating device 20. The controller 122A has substantially the same structure as the structure of the controller 22A of the second operating device 22. The controller 124A has substantially the same structure as the structure of the controller 24A of the third operating device 24.

The controller 12A is configured to selectively act, based on reference information relating to the system 110, as each of the master controller and the slave controller. The controller 116A is configured to selectively act, based on reference information relating to the system 110, as each of the master controller and the slave controller. The reference information includes at least one of a hardware configuration of the system 110, a state of the hardware configuration of the system 110, and the input transmitted from the external device ED. The pairing and control executed between the electrical device 12, the electrical device 116, the first operating device 120, the second operating device 122, and the third operating device 124 are the same as the pairing and control executed between the electrical device 12, the electrical device 16, the first operating device 20, the second operating device 22, and the third operating device 24. Thus, the electrical device 12 is configured to act as the master electrical device or the slave electrical device in the system 110 different from the system 10 based on the reference information relating to the system 110.

Figure 17:
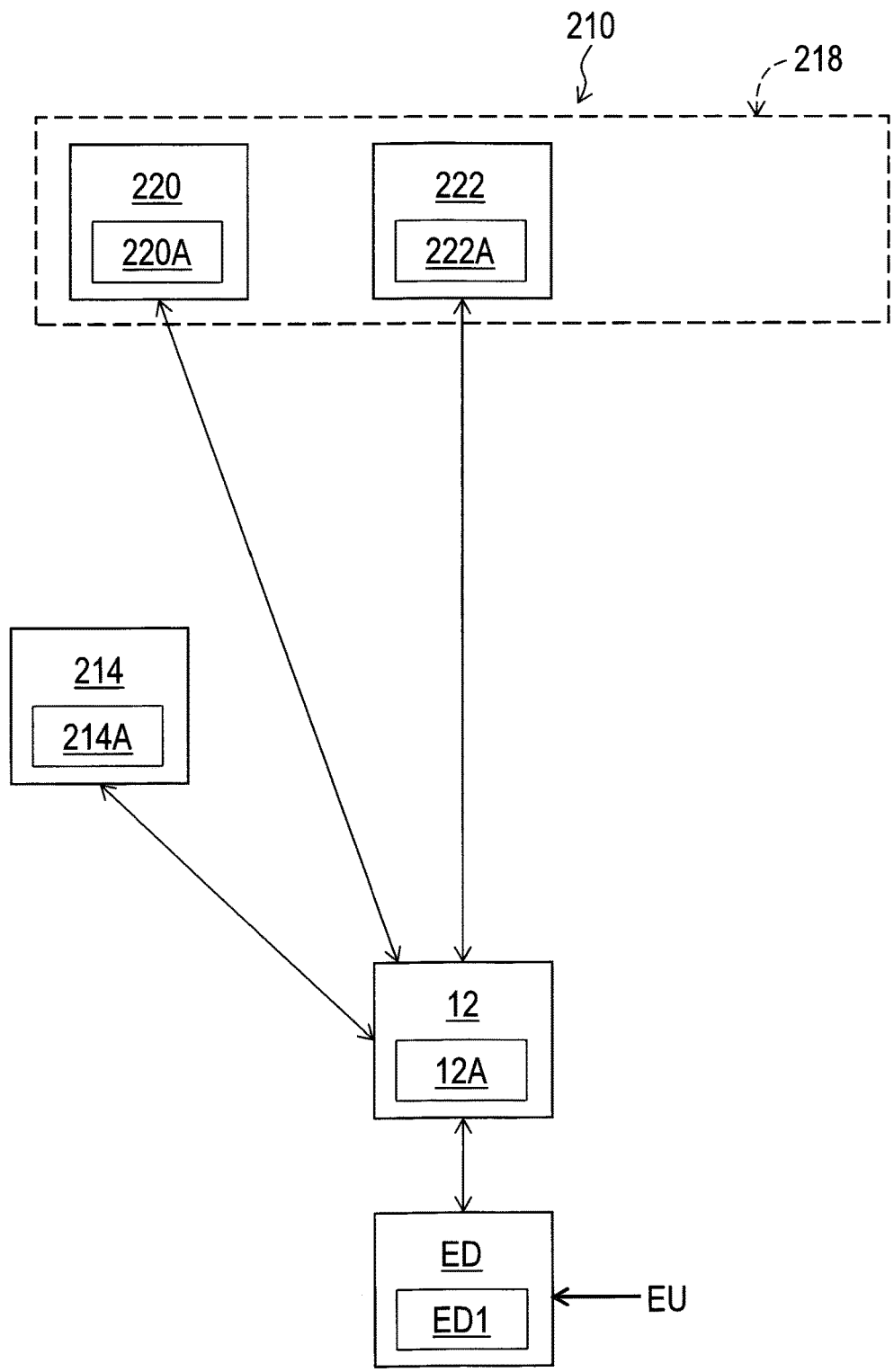
FIG. 17 is a schematic block diagram of a second different system different from the system illustrated in FIG. 2 in a case where the electrical device applies to the second different system.

Similarly, as seen in FIG. 17, at least one of the electrical devices 12, 14, and 16 can be used in a system 210 different from the systems 10 and 110. For example, the system 210 includes the electrical device 12, an electrical device 214, and an operating device 218. For example, the system 210 is used for a road bike. The electrical device 214 has substantially the same structure as the structure of the electrical device 14 and includes a front derailleur. The operating device 218 has substantially the same structure as the structure of the operating device 18. The operating device 218 includes a first operating device 220 and a second operating device 222. The first operating device 220 has substantially the same structure as the structure of the first operating device 20. The second operating device 222 has substantially the same structure as the structure of the second operating device 22. An adjustable seatpost such as the electrical device 16 or 116 is omitted from the system 210. The third operating devices 24 and 124 are omitted from the operating device 218 of the system 210.

The electrical device 214 includes a controller 214A. The first operating device 220 includes a controller 220A. The second operating device 222 includes a controller 222A. The third operating device 124 includes a controller 124A. The controller 214A has substantially the same structure as the structure of the controller 14A of the electrical device 14. The controller 220A has substantially the same structure as the structure of the controller 20A of the first operating device 20. The controller 222A has substantially the same structure as the structure of the controller 22A of the second operating device 22.

The controller 12A is configured to selectively act, based on reference information relating to the system 210, as each of the master controller and the slave controller. The controller 214A is configured to selectively act, based on reference information relating to the system 210, as each of the master controller and the slave controller. The reference information includes at least one of a hardware configuration of the system 210, a state of the hardware configuration of the system 210, and the input transmitted from the external device ED. The pairing and control executed between the electrical device 12, the electrical device 214, the first operating device 220, the second operating device 222, and the third operating device 124 are the same as the pairing and control executed between the electrical device 12, the electrical device 14, the first operating device 20, the second operating device 22, and the third operating device 24. Thus, the electrical device 20 is configured to act as the master electrical device or the slave electrical device in the system 210 different from the system 10 based on the reference information relating to the system 210.

In the system 10, the controller 12A is configured to communicate with at least one of the different slave controller 14A and/or 16A and the different master controller 14A and/or 16A via a wireless communication channel. The controller 14A is configured to communicate with at least one of the different slave controller 12A and/or 16A and the different master controller 12A and/or 16A via a wireless communication channel. The controller 16A is configured to communicate with at least one of the different slave controller 12A and/or 14A and the different master controller 12A and/or 14A via a wireless communication channel.

Figure 18:
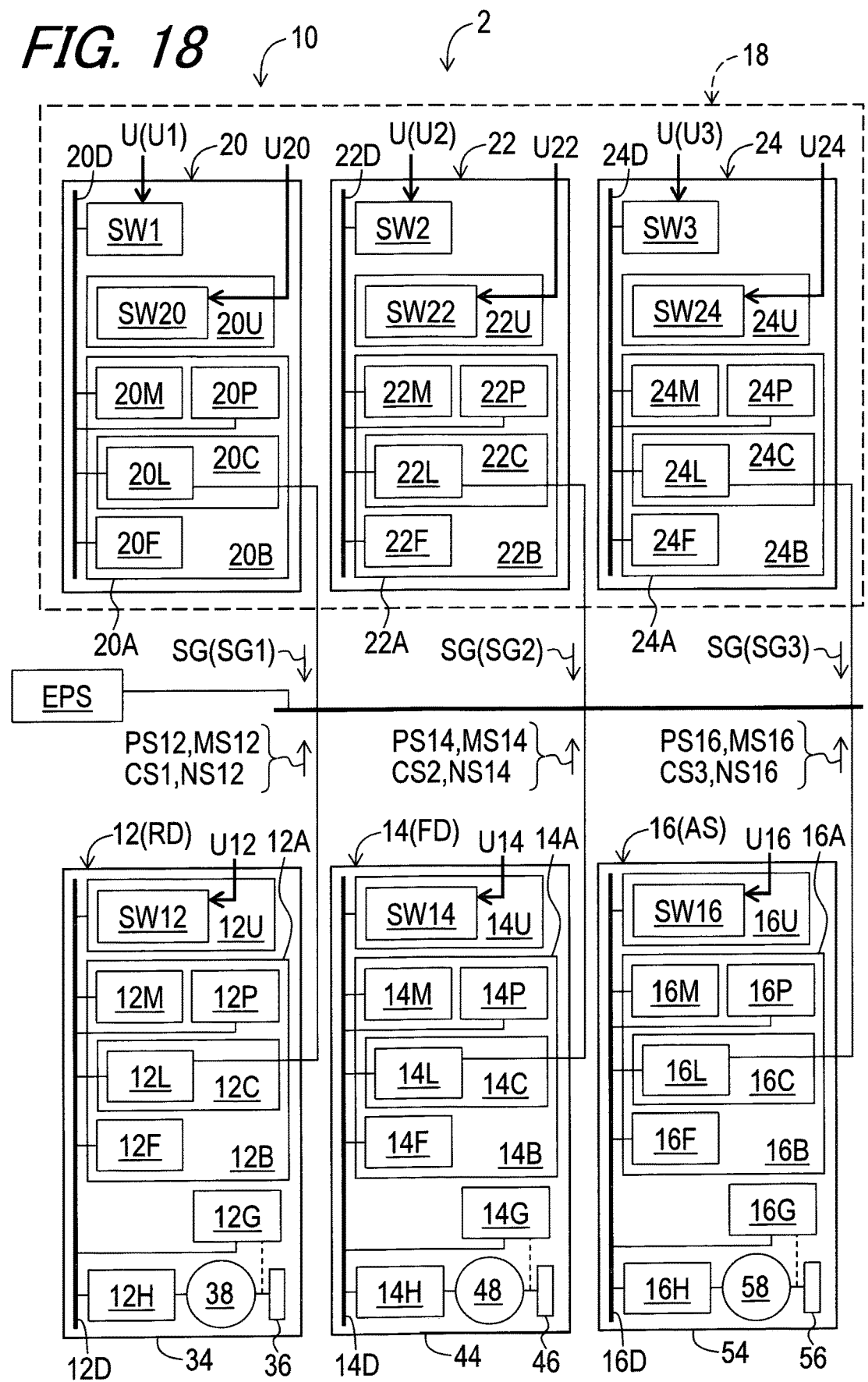
FIG. 18 is a schematic block diagram of a system of the human-powered vehicle in accordance with a modification (wired communication).

As seen in FIG. 18, however, the controller 12A can be configured to communicate with at least one of the different slave controller 14A and/or 16A and the different master controller 14A and/or 16A via a wired communication channel. The controller 14A can be configured to communicate with at least one of the different slave controller 12A and/or 16A and the different master controller 12A and/or 16A via a wired communication channel. The controller 16A can be configured to communicate with at least one of the different slave controller 12A and/or 14A and the different master controller 12A and/or 14A via a wired communication channel.

In such embodiments, the system 10 includes a wired communication structure WS. The electrical devices 12, 14, and 16 and the first, second, and third operating devices 20, 22, and 24 are electrically connected to each other via the wired communication structure WS. The controller 12A is configured to communicate with at least one of the different slave controller 14A and/or 16A and the different master controller 14A and/or 16A via the wired communication structure WS. The controller 14A can be configured to communicate with at least one of the different slave controller 12A and/or 16A and the different master controller 12A and/or 16A via the wired communication structure WS. The controller 16A can be configured to communicate with at least one of the different slave controller 12A and/or 14A and the different master controller 12A and/or 14A via the wired communication structure WS. The wired communication structure WS includes at least one electric cable.

The system 10 includes an electric power source EPS. The electric power source EPS is configured to be electrically connected to the electrical devices 12, 14, and 16 and the first, second, and third operating devices 20, 22, and 24 via the wired communication structure WS. The electric power source EPS is configured to supply electricity to the electrical devices 12, 14, and 16 and the first, second, and third operating devices 20, 22, and 24 via the wired communication structure WS. The electric power sources 12E, 14E, 16E, 20E, 22E, and 24E are omitted from the electrical devices 12, 14, and 16 and the first, second, and third operating devices 20, 22, and 24.

Examples of the electric power source EPS include a battery and a capacitor. The electric power source EPS is mounted to the vehicle body 2A (see e.g., FIG. 1) of the human-powered vehicle 2. However, the electric power source EPS can be mounted to other parts of the human-powered vehicle 2

The controllers 12A, 14A, 16A, 20A, 22A, and 24A communicate with each other via the wired communication structure WS using power line communication (PLC) technology. More specifically, each of the electric cables of the wired communication structure WS includes a ground line and a voltage line that are detachably connected to a serial bus that is formed by communication interfaces. The controllers 12A, 14A, 16A, 20A, 22A, and 24A can all communicate with each other through the voltage line using the PLC technology.

The PLC technology is used for communicating between electric components. The PLC carries data on a conductor that is also used simultaneously for electric power transmission or electric power distribution to the electric components. In the modification, electricity is supplied from the electric power source PS to the electrical devices 12, 14, and 16 and the first, second, and third operating devices 20, 22, and 24 via the wired communication structure WS. Furthermore, the controllers 12A, 14A, 16A, 20A, 22A, and 24A can receive information signals from each other through the wired communication structure WS using the PLC.

The PLC uses unique identifying information such as a unique identifier that is assigned to each of the electrical devices 12, 14, and 16 and the first, second, and third operating devices 20, 22, and 24. Each of the controllers 12A, 14A, 16A, 20A, 22A, and 24A is configured to store the identifying information. Based on the identifying information, each of the controllers 12A, 14A, 16A, 20A, 22A, and 24A is configured to recognize, based on the identifying information, information signals which are necessary for itself among information signals transmitted via the wired communication structure WS. For example, the controller 12A is configured to recognize information signals transmitted from the controllers 12A, 14A, 16A, 20A, 22A, and 24A with the wired communication structure WS. Instead of using the PLC technology, however, separate signal wires can be provided for transmitting data in addition to the ground wire and the voltage wire if needed and/or desired.

The communicator 12C includes a wired communicator 12L configured to establish a wired communication such as the PLC. The wired communicator 12L is electrically mounted on the circuit board 12B. The wired communicator 12L is electrically connected to the circuit board 12B and the system bus 12D. The wired communicator 12L is configured to be electrically connected to the wired communication structure WS. The wired communicator 12L is configured to separate input signals to a power source voltage and control signals. The wired communicator 12L is configured to regulate the power source voltage to a level at which the controller 12A can properly operate. The wired communicator 12L is further configured to superimpose output signals such as the first or second control signal CS1, the pairing signal PS12, the master signal MS12, and the communication signal NS12 on the power source voltage applied to the wired communication structure WS from the electric power source EPS.

The communicator 14C includes a wired communicator 14L configured to establish a wired communication such as the PLC. The communicator 16C includes a wired communicator 16L configured to establish a wired communication such as the PLC. The communicator 20C includes a wired communicator 20L configured to establish a wired communication such as the PLC. The communicator 22C includes a wired communicator 22L configured to establish a wired communication such as the PLC. The communicator 24C includes a wired communicator 24L configured to establish a wired communication such as the PLC. Each of the wired communicators 14L, 16L, 20L, 22L, and 24L has the same structure as the structure of the wired communicator 12L. Thus, they will not be described in detail here for the sake of brevity.

As with the pairing shown in FIGS. 6 to 9, in a case where the controllers 12A, 14A, 16A, 20A, 22A, and 24A communicate with each other via the wired communication channel, the controller 12A can have a pairing mode in which the controller 12A executes pairing between the controller 12A and one of the different slave controller 14A and/or 16A and the different master controller 14A and/or 16A. The controller 14A can have a pairing mode in which the controller 14A executes pairing between the controller 14A and one of the different slave controller 12A and/or 16A and the different master controller 12A and/or 16A. The controller 16A can have a pairing mode in which the controller 16A executes pairing between the controller 16A and one of the different slave controller 12A and/or 14A and the different master controller 12A and/or 14A. The controls shown in FIGS. 10 to 17 can be applied to the system 10 depicted in FIG. 18. However, other pairing procedures can be applied to the controllers 12A, 14A, 16A, 20A, 22A, and 24A in the case where the controllers 12A, 14A, 16A, 20A, 22A, and 24A communicate with each other via the wired communication channel.

Figure 19:
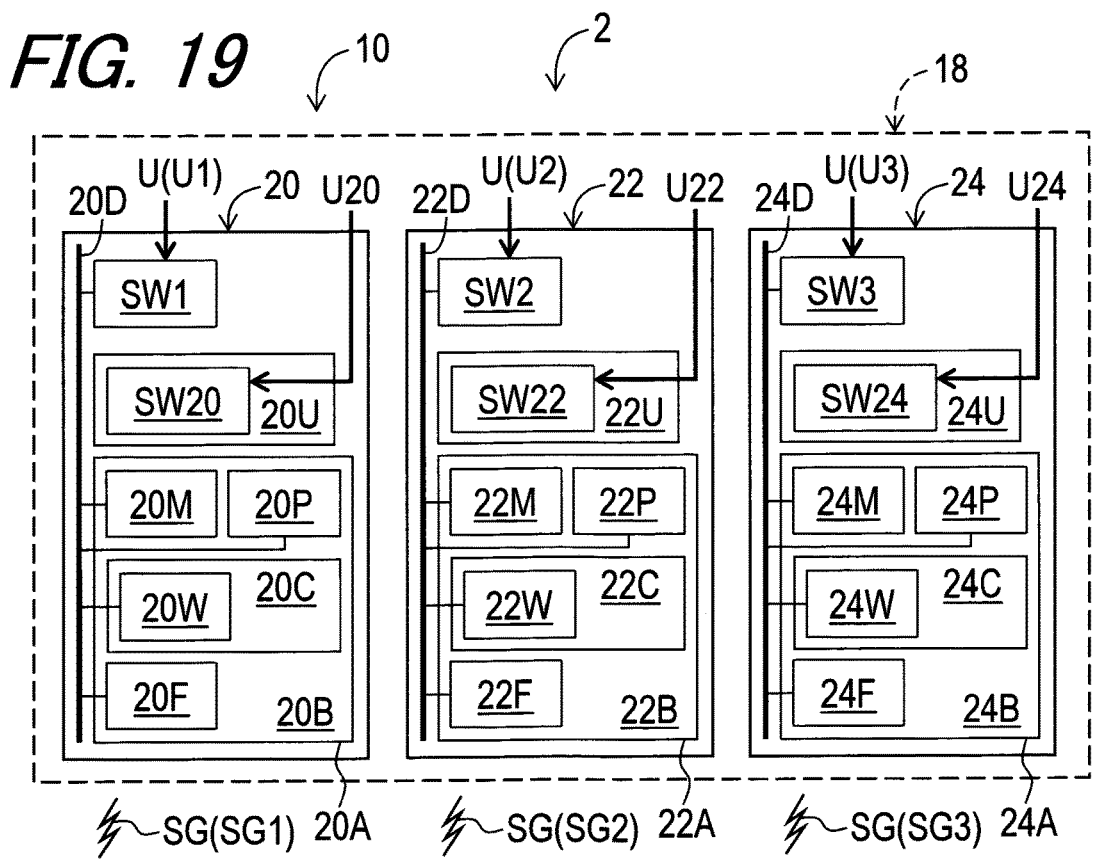
FIG. 19 is a schematic block diagram of a system of the human-powered vehicle in accordance with a modification (wireless communication and wired communication).
Figure 19:
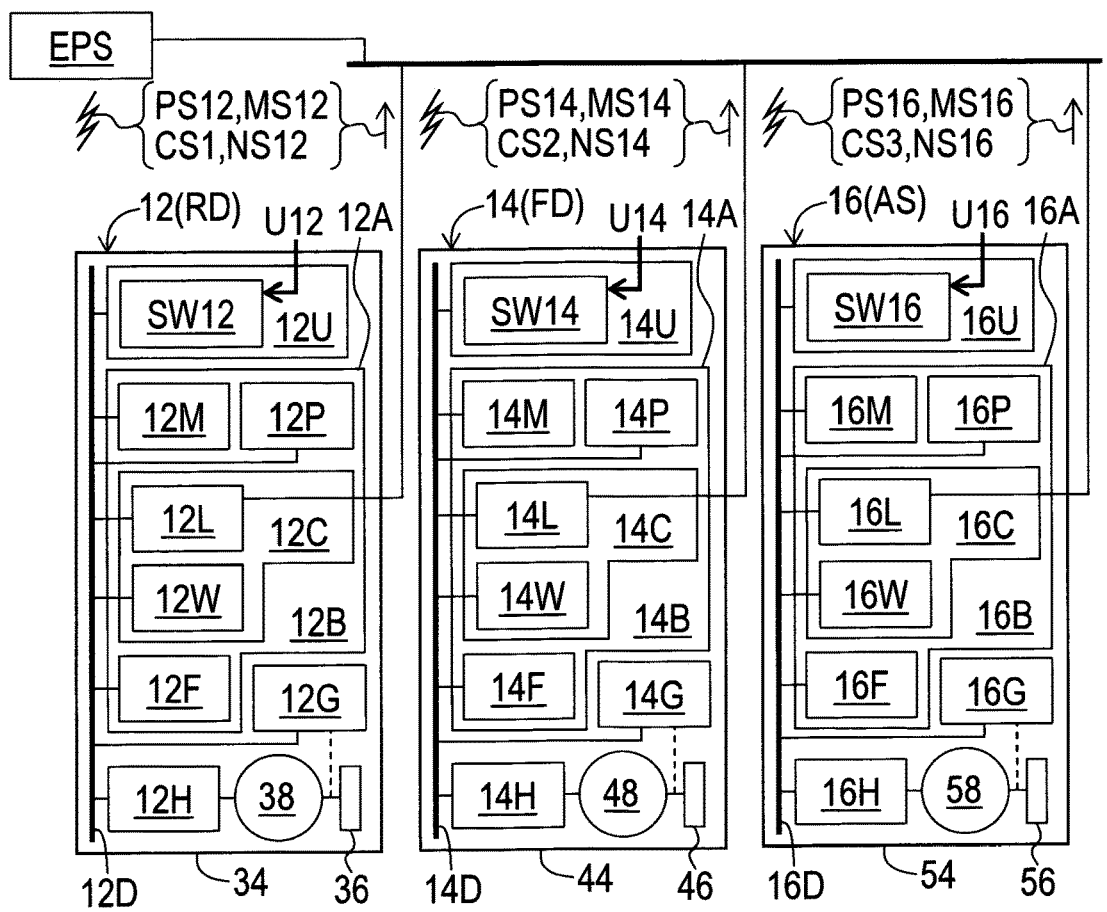

The system 10 can be configured to use both the wireless communication and the wired communication. In the system 10 depicted in FIG. 19, for example, the communicator 12C of the controller 12A includes the wireless communicator 12W and the wired communicator 12L. The communicator 14C of the controller 14A includes the wireless communicator 14W and the wired communicator 14L. The communicator 16C of the controller 16A includes the wireless communicator 16W and the wired communicator 16L. The communicator 20C of the controller 20A includes the wireless communicator 20W. The communicator 22C of the controller 22A includes the wireless communicator 22W. The communicator 24C of the controller 24A includes the wireless communicator 24W.

In a case where the electrical device 12 acts as the master electrical device, the controller 12A is configured to communicate with the different slave controller 14A and 16A via the wired communication channel and is configured to communicate with each of the controllers 20A, 22A, and 24A via the wireless communication channel. In a case where the electrical device 14 acts as the master electrical device, the controller 14A is configured to communicate with the different slave controller 12A and 16A via the wired communication channel and is configured to communicate with each of the controllers 20A, 22A, and 24A via the wireless communication channel. In a case where the electrical device 16 acts as the master electrical device, the controller 16A is configured to communicate with the different slave controller 12A and 14A via the wired communication channel and is configured to communicate with each of the controllers 20A, 22A, and 24A via the wireless communication channel.

As with the pairing shown in FIGS. 6 to 9, in a case where the controllers 12A, 14A, and 16A communicate with each other via the wired communication channel, the controller 12A can have a pairing mode in which the controller 12A executes pairing between the controller 12A and one of the different slave controller 14A and/or 16A and the different master controller 14A and/or 16A. The controller 14A can have a pairing mode in which the controller 14A executes pairing between the controller 14A and one of the different slave controller 12A and/or 16A and the different master controller 12A and/or 16A. The controller 16A can have a pairing mode in which the controller 16A executes pairing between the controller 16A and one of the different slave controller 12A and/or 14A and the different master controller 12A and/or 14A. The controls shown in FIGS. 10 to 17 and described in the modification illustrated in FIG. 18 can be applied to the system 10 depicted in FIG. 19. However, other pairing procedures can be applied to the controllers 12A, 14A, and 16A in the case where the controllers 12A, 14A, and 16A communicate with each other via the wired communication channel.

As with the pairing shown in FIGS. 6 to 9, in a case where one of the controllers 12A, 14A, and 16A communicate with each of the controllers 20A, 22A, and 24A via the wireless communication channel, the controller 12A can have a pairing mode in which the controller 12A executes pairing between the controller 12A and one of the controller 20A, 22A, and 24A. The controller 14A can have a pairing mode in which the controller 14A executes pairing between the controller 14A and one of the controller 20A, 22A, and 24A. The controller 16A can have a pairing mode in which the controller 16A executes pairing between the controller 16A and one of the controller 20A, 22A, and 24A. The controls shown in FIGS. 10 to 17 and described in the modification illustrated in FIG. 18 can be applied to the system 10 depicted in FIG. 19. However, other pairing procedures can be applied to the controllers 12A, 14A, and 16A in the case where one of the controllers 12A, 14A, and 16A communicate with each of the controller 20A, 22A, and 24A via the wired communication channel.

In the present application, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have," "include" and their derivatives.

The terms "member," "section," "portion," "part," "element," "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element," and the term "second element" itself does not imply an existence of "first element."

The term "pair of," as used herein, can encompass the configuration in which the pair of elements have different shapes or structures from each other in addition to the configuration in which the pair of elements have the same shapes or structures as each other.

The terms "a" (or "an"), "one or more" and "at least one" can be used interchangeably herein.

The phrase "at least one of" as used in this disclosure means "one or more" of a desired choice. For one example, the phrase "at least one of" as used in this disclosure means "only one single choice" or "both of two choices" if the number of its choices is two. For other example, the phrase "at least one of" as used in this disclosure means "only one single choice" or "any combination of equal to or more than two choices" if the number of its choices is equal to or more than three. For instance, the phrase "at least one of A and B" encompasses (1) A alone, (2), B alone, and (3) both A and B. The phrase "at least one of A, B, and C" encompasses (1) A alone, (2), B alone, (3) C alone, (4) both A and B, (5) both B and C, (6) both A and C, and (7) all A, B, and C. In other words, the phrase "at least one of A and B" does not mean "at least one of A and at least one of B" in this disclosure.

Finally, terms of degree such as "substantially," "about" and "approximately" as used herein mean a reasonable amount of deviation of the modified term such that the end result is not significantly changed. All of numerical values described in the present application can be construed as including the terms such as "substantially," "about" and "approximately."

Obviously, numerous modifications and variations of the present invention are possible in light of the above teachings. It is therefore to be understood that within the scope of the appended claims, the invention may be practiced otherwise than as specifically described herein.

What is claimed is:

1. An electrical device for a system of a human-powered vehicle, the electrical device comprising:
   a controller configured to selectively act, based on reference information relating to the system, as each of
      a master controller configured to transmit a first control signal to a different slave controller of a different electrical device of the system, the different slave controller being configured to be operated in response to the first control signal, and
      a slave controller configured to be operated in response to a second control signal transmitted from a different master controller of a different electrical device of the system,
   wherein
   the controller is configured to communicate with at least one of the different slave controller and the different master controller via a wireless communication channel,
   the master controller is configured to directly wirelessly transmit the first control signal to the different slave controller, and
   the slave controller is configured to directly wirelessly receive the second control signal from the different master controller;
   wherein the controller is one of:
   a rear derailleur controller configured to control an actuator of a rear derailleur of the human-powered vehicle;
   a front derailleur controller configured to control an actuator of a front derailleur of the human-powered vehicle; and
   an adjustable seatpost controller configured to control an actuator of an adjustable seatpost of the human-powered vehicle;
   wherein the rear derailleur controller, the front derailleur controller, and the adjustable seatpost controller can each selectively act as the master controller or as the slave controller.

2. The electrical device according to claim 1, wherein the reference information includes at least one of
   a hardware configuration of the system,
   a state of the hardware configuration of the system, and
   an input transmitted from an external device.

3. The electrical device according to claim 2, wherein the external device includes a display and the external device is configured to display a hardware configuration of the system on the display.

4. The electrical device according to claim 1, wherein the controller is configured to act as the slave controller if the reference information indicates that the system includes the different master controller, and
   the controller is configured to act as the master controller if the reference information indicates that the system does not include the different master controller.

5. The electrical device according to claim 1, wherein the controller is configured to detect, as the reference information, whether the system includes the different master controller or not.

6. The electrical device according to claim 1, wherein the controller is configured to act as the slave controller if the reference information indicates at least one of that the slave controller is selected by a user, that the master controller is not selected by the user, and that the different master controller is selected by the user, and
   the controller is configured to act as the master controller if the reference information indicates at least one of that the master controller is selected by the user, that the slave controller is not selected by the user, and that the different slave controller is selected by the user.

7. The electrical device according to claim 1, wherein the controller is configured to communicate with at least one of the different slave controller and the different master controller via a wired communication channel.

8. The electrical device according to claim 1, wherein the controller includes a user interface configured to receive a user input,
   the controller has a pairing mode in which the controller executes pairing between the controller and one of the different slave controller and the different master controller, and
   the controller is configured to enter the pairing mode in response to the user input received by the user interface.

9. The electrical device according to claim 8, wherein the controller is configured to act as the slave controller if the controller detects a master signal transmitted directly from the different master controller in the pairing mode during a master determination time that begins when the controller enters the pairing mode, and
   the controller is configured to act as the master controller and to transmit a master signal to each electrical device of the system if the controller does not detect the master signal transmitted directly from the different master controller in the pairing mode during the master determination time.

10. The electrical device according to claim 1, wherein the controller is configured to transmit the first control signal to the different slave controller in response to an operating signal transmitted from an operating device if the controller acts as the master controller.

11. The electrical device according to claim 10, wherein the controller is configured to be operated in response to the second control signal transmitted from the different master controller without transmitting the first control signal to the different slave controller if the controller acts as the slave controller.

12. The electrical device according to claim 1, wherein the controller is configured to act as the master controller on behalf of the different master controller if the reference information indicates that the different master controller is in an abnormal state.

13. The electrical device according to claim 12, wherein the abnormal state includes at least one of a failure of the different master controller and unresponsiveness of the different master controller.

14. The electrical device according to claim 13, wherein the controller is configured to detect a communication signal transmitted from the different master controller,
   the controller is configured to conclude that the different master controller is not in the abnormal state if the controller detects the communication signal within a state determination time, and the controller is configured to conclude that the different master controller is in the abnormal state if the controller does not detect the communication signal within the state determination time.

15. The electrical device according to claim 1, wherein the controller is configured to transmit the first control signal to the different slave controller to control an additional actuator of the different electrical device if the controller acts as the master controller.

16. The electrical device according to claim 1, further comprising
an actuator configured to generate actuating force, wherein
the controller is configured to control the actuator in response to the second control signal transmitted from the different master controller if the controller acts as the slave controller.

17. The electrical device according to claim 16, further comprising:
a base member; and
a movable member movable relative to the base member, wherein
the actuator is configured to move the movable member relative to the base member in response to the second control signal.

18. A system for a human-powered vehicle, the system comprising:
the electrical device according to claim 1; and
at least one of
a slave electrical device including the different slave controller, and
a master electrical device including the different master controller.

19. The system according to claim 18, wherein
the at least one of the slave electrical device and the master electrical device includes
an additional base member,
an additional movable member movable relative to the additional base member, and
an additional actuator configured to move the additional movable member relative to the additional base member.

20. A bicycle system comprising:
an electrical device comprising:
a controller configured to selectively act, based on reference information relating to the bicycle system, as each of
a master controller configured to transmit a first control signal to a different slave controller of a different electrical device of the bicycle system, the different slave controller being configured to be operated in response to the first control signal, and
a slave controller configured to be operated in response to a second control signal transmitted from a different master controller of a different electrical device of the bicycle system;
a slave electrical device including the different slave controller; and
a master electrical device including the different master controller, wherein
the controller is configured to communicate with at least one of the different slave controller and the different master controller via a wireless communication channel,
the master controller is configured to directly wirelessly transmit the first control signal to the different slave controller, and
the slave controller is configured to directly wirelessly receive the second control signal from the different master controller;
wherein the controller is one of:
a rear derailleur controller configured to control an actuator of a rear derailleur of the bicycle system;
a front derailleur controller configured to control an actuator of a front derailleur of the bicycle system; and
an adjustable seatpost controller configured to control an actuator of an adjustable seatpost of the bicycle system;
wherein the rear derailleur controller, the front derailleur controller, and the adjustable seatpost controller can each selectively act as the master controller or as the slave controller.

21. The bicycle system according to claim 20, wherein
the controller is configured to act as the slave controller if the controller detects a master signal transmitted directly from the different master controller in a pairing mode during a master determination time that begins when the controller enters the pairing mode, and
the controller is configured to act as the master controller and to transmit a master signal to each electrical device of the system if the controller does not detect the master signal transmitted directly from the different master controller in the pairing mode during the master determination time.

* * * * *